(12) United States Patent
Peterson et al.

(10) Patent No.: US 12,442,553 B2
(45) Date of Patent: Oct. 14, 2025

(54) CRITICAL ENVIRONMENT FEEDFORWARD-FEEDBACK CONTROL SYSTEM WITH ROOM PRESSURE AND TEMPERATURE CONTROL

(71) Applicant: Tyco Fire & Security GmbH, Neuhausen am Rheinfall (CH)

(72) Inventors: Jack A. Peterson, Brookfield, WI (US); Kirk H. Drees, Cedarburg, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 545 days.

(21) Appl. No.: 17/709,252

(22) Filed: Mar. 30, 2022

(65) Prior Publication Data

US 2023/0314030 A1 Oct. 5, 2023

(51) Int. Cl.
*F24F 11/63* (2018.01)
*F24F 11/46* (2018.01)
(Continued)

(52) U.S. Cl.
CPC .............. *F24F 11/63* (2018.01); *F24F 11/46* (2018.01); *F24F 11/74* (2018.01);
(Continued)

(58) Field of Classification Search
CPC ................................................... F24F 2110/40
See application file for complete search history.

(56) References Cited

U.S. PATENT DOCUMENTS 5,822,740 A * 10/1998 Haissig .............. G05B 13/0275
706/5
6,095,426 A * 8/2000 Ahmed .................... F24F 11/62
236/78 D
(Continued)

FOREIGN PATENT DOCUMENTS

CA 2957726 A1 3/2016
CA 3043996 A1 2/2018
(Continued)

OTHER PUBLICATIONS

Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
(Continued)

*Primary Examiner* — Nathan L Laughlin
(74) *Attorney, Agent, or Firm* — Foley & Lardner LLP

(57) ABSTRACT

A feedforward-feedback controller for integrated temperature and pressure control of a building space includes one or more processing circuits. The one or more processing circuits are configured to generate a supply air flow rate setpoint using a combined feedforward-feedback control process that (i) proactively compensates for a feedforward air flow disturbance in the building space and (ii) reactively compensates for a feedback air pressure error in the building space, generate a supply air temperature setpoint using a predictive temperature model that predicts the supply air temperature setpoint required to achieve a zone temperature setpoint for the building space when supply air is provided
(Continued)

to the building space at the supply air flow rate setpoint and the supply air temperature setpoint, and operate building equipment to provide the supply air to the building space at the supply air flow rate setpoint and the supply air temperature setpoint.

20 Claims, 24 Drawing Sheets

(51) Int. Cl.
  *F24F 11/74* (2018.01)
  *F24F 110/10* (2018.01)
  *F24F 110/30* (2018.01)
  *F24F 110/40* (2018.01)

(52) U.S. Cl.
  CPC ....... *F24F 2110/10* (2018.01); *F24F 2110/30* (2018.01); *F24F 2110/40* (2018.01)

(56) References Cited

U.S. PATENT DOCUMENTS

| | | | |
|---|---|---|---|
| 9,447,985 | B2 | 9/2016 | Johnson |
| 10,401,843 | B2 | 9/2019 | House et al. |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 10,928,089 | B2 | 2/2021 | Gamroth et al. |
| 11,099,526 | B2 | 8/2021 | Wenzel et al. |
| 11,156,978 | B2 | 10/2021 | Johnson et al. |
| 11,274,842 | B2 | 3/2022 | Gamroth et al. |
| 2009/0120380 | A1* | 5/2009 | Chian ............... F24H 15/223 236/20 R |
| 2019/0353384 | A1* | 11/2019 | Laughman ......... G05D 23/1919 |
| 2020/0240666 | A1* | 7/2020 | Gamroth ............... F24F 11/63 |
| 2021/0010701 | A1 | 1/2021 | Nesler et al. |
| 2021/0011443 | A1 | 1/2021 | McNamara et al. |
| 2021/0068312 | A1* | 3/2021 | Tobiassen ........... H01M 10/663 |
| 2021/0207839 | A1 | 7/2021 | Drees et al. |
| 2022/0344937 | A1* | 10/2022 | Hu .................... G05B 13/0265 |

FOREIGN PATENT DOCUMENTS

| | | |
|---|---|---|
| EP | 3 186 687 A4 | 7/2017 |
| EP | 3 497 377 A1 | 6/2019 |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid

(56) References Cited

OTHER PUBLICATIONS

State, LLC, Url: http://coolinglogic.com/documents/16102106_White_Paper_High_Resolution_Protected.pdf, Sep. 24, 2016 (51 pages).

Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

U.S. Appl. No. 17/558,909, filed Dec. 22, 2021, Gamroth et al.

U.S. Appl. No. 63/047,119, filed Jul. 1, 2020, Drees et al.

\* cited by examiner

CRITICAL ENVIRONMENT FEEDFORWARD-FEEDBACK CONTROL SYSTEM WITH ROOM PRESSURE AND TEMPERATURE CONTROL

BACKGROUND

The present disclosure relates generally to control systems for an HVAC system. More particularly, the present disclosure relates to a feedforward-feedback control for an HVAC system.

In some control systems, particularly for buildings that serve as a laboratory or hospital, pressure and temperature of controlled spaces must be held within tight tolerances to ensure occupant comfort and usability of the space. Due to thermodynamic relationships between temperature and pressure, controlling either of the temperature and pressure often impacts the other characteristic of the space. This is further exacerbated when large disturbances impact one or both of the characteristics of the space (e.g., large pressure disturbances associated with fume hoods being operated in the space). Conventional control systems are often unable to accurately and consistently maintain the temperature and pressure of a space.

Feedforward control and feedback control are two classes of control strategies that can dynamically reduce or eliminate the effects of both known (e.g., controlled, measured, predictable, etc.) and/or unknown (e.g., random, unpredictable, etc.) disturbance in a control system.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure relates to a feedforward-feedback controller for integrated temperature and pressure control of a building space. The controller includes one or more processing circuits that are configured to: generate a supply air flow rate setpoint using a combined feedforward-feedback control process that (i) proactively compensates for a feedforward air flow disturbance in the building space and (ii) reactively compensates for a feedback air pressure error in the building space; generate a supply air temperature setpoint using a predictive temperature model that predicts the supply air temperature setpoint required to achieve a zone temperature setpoint for the building space when supply air is provided to the building space at the supply air flow rate setpoint and the supply air temperature setpoint; and operate building equipment to provide the supply air to the building space at the supply air flow rate setpoint and the supply air temperature setpoint.

In some embodiments, the one or more processing circuits are configured to determine whether the building equipment are capable of achieving the supply air temperature setpoint and, in response to a determination that the building equipment are not capable of achieving the supply air temperature setpoint: modify the supply air temperature setpoint to generate a modified supply air temperature setpoint that the building equipment are capable of achieving; and modify the supply air flow rate setpoint using the modified supply air temperature setpoint.

In some embodiments, generating the supply air flow rate setpoint includes: determining a feedforward air flow rate required to proactively compensate for the feedforward air flow disturbance in the building space; determining a feedback air flow rate required to reactively compensate for the feedback air pressure error in the building space; and combining the feedforward air flow rate and the feedback air flow rate to determine a net air flow rate predicted to achieve a pressure setpoint for the building space.

In some embodiments, generating the supply air temperature setpoint includes: determining a feedback air temperature error in the building space; determining a heat flow rate estimated to correct the feedback air temperature error; and using the predictive temperature model to determine the supply air temperature setpoint that achieves the heat flow rate when the supply air is provided to the building space at the supply air flow rate setpoint and the supply air temperature setpoint.

In some embodiments, the one or more processing circuits are configured to: determine an exhaust air flow rate setpoint indicating a flow rate at which air is to be exhausted from the building space by the building equipment to achieve a pressure setpoint for the building space, wherein a difference between the supply air flow rate setpoint and the exhaust air flow rate setpoint defines a net air flow rate setpoint; and increase or decrease both the supply air flow rate setpoint and the exhaust air flow rate setpoint by equivalent amounts to achieve the zone temperature setpoint for the building space without affecting the net air flow rate setpoint.

In some embodiments, the one or more processing circuits are configured to: determine one or more flow rate setpoints associated with exhaust devices separate from the building equipment that cause air to be removed from the building space; and determine the feedforward air flow disturbance based on the one or more flow rate setpoints associated with the exhaust devices.

In some embodiments, generating the supply air flow rate setpoint includes: determining whether the supply air flow rate setpoint exceeds a supply air flow rate limit representing a flow rate limit of the building equipment; and based on a determination that the supply air flow rate setpoint does not exceed the supply air flow rate limit, using the supply air flow rate limit as the supply air flow rate setpoint.

In some embodiments, the one or more processing circuits are configured to: determine a feedback air temperature error in the building space; determine a heat flow rate estimated to correct the feedback air temperature error; determine a feedforward heat flow disturbance; combine the heat flow rate and the feedforward heat flow disturbance to proactively compensate for the feedforward heat flow disturbance; and use the predictive temperature model to determine the supply air temperature setpoint that achieves the heat flow rate when the supply air is provided to the building space at the supply air flow rate setpoint and the supply air temperature setpoint.

Another implementation of the present disclosure relates to a method for integrated temperature and pressure control of a building space. The method includes: generating a supply air flow rate setpoint using a combined feedforward-feedback control process that (i) proactively compensates for a feedforward air flow disturbance in the building space and (ii) reactively compensates for a feedback air pressure error in the building space; generating a supply air temperature setpoint using a predictive temperature model that predicts the supply air temperature setpoint required to achieve a zone temperature setpoint for the building space when supply air is provided to the building space at the supply air flow rate setpoint and the supply air temperature setpoint; and operating building equipment to provide the supply air to the building space at the supply air flow rate setpoint and the supply air temperature setpoint.

In some embodiments, the method includes: determining whether the building equipment are capable of achieving the supply air temperature setpoint; and responsive to a determination that the building equipment are not capable of achieving the supply air temperature setpoint: modifying the supply air temperature setpoint to generate a modified supply air temperature setpoint that the building equipment are capable of achieving; and modifying the supply air flow rate setpoint using the modified supply air temperature setpoint.

In some embodiments, generating the supply air flow rate setpoint includes: determining a feedforward air flow rate required to proactively compensate for the feedforward air flow disturbance in the building space; determining a feedback air flow rate required to reactively compensate for the feedback air pressure error in the building space; and combining the feedforward air flow rate and the feedback air flow rate to determine a net air flow rate predicted to achieve a pressure setpoint for the building space.

In some embodiments, generating the supply air temperature setpoint includes: determining a feedback air temperature error in the building space; determining a heat flow rate estimated to correct the feedback air temperature error; and using the predictive temperature model to determine the supply air temperature setpoint that achieves the heat flow rate when the supply air is provided to the building space at the supply air flow rate setpoint and the supply air temperature setpoint.

In some embodiments, the method includes: determining an exhaust air flow rate setpoint indicating a flow rate at which air is to be exhausted from the building space by the building equipment to achieve a pressure setpoint for the building space, wherein a difference between the supply air flow rate setpoint and the exhaust air flow rate setpoint defines a net air flow rate setpoint; and increasing or decreasing both the supply air flow rate setpoint and the exhaust air flow rate setpoint by equivalent amounts to achieve the zone temperature setpoint for the building space without affecting the net air flow rate setpoint.

In some embodiments, the method includes: determining one or more flow rate setpoints associated with exhaust devices separate from the building equipment that cause air to be removed from the building space; and determining the feedforward air flow disturbance based on the one or more flow rate setpoints associated with the exhaust devices.

In some embodiments, generating the supply air flow rate setpoint includes: determining whether the supply air flow rate setpoint exceeds a supply air flow rate limit representing a flow rate limit of the building equipment; and based on a determination that the supply air flow rate setpoint does not exceed the supply air flow rate limit, using the supply air flow rate limit as the supply air flow rate setpoint.

In some embodiments, the method includes: determining a feedback air temperature error in the building space; determining a heat flow rate estimated to correct the feedback air temperature error; determining a feedforward heat flow disturbance; combining the heat flow rate and the feedforward heat flow disturbance to proactively compensate for the feedforward heat flow disturbance; and using the predictive temperature model to determine the supply air temperature setpoint that achieves the heat flow rate when the supply air is provided to the building space at the supply air flow rate setpoint and the supply air temperature setpoint.

Another implementation of the present disclosure relates to a feedforward-feedback controller for integrated two-characteristic control of a building space. The controller includes one or more processing circuits configured to: generate a first supply air setpoint using a combined feedforward-feedback control process that (i) proactively compensates for a feedforward air flow disturbance in the building space and (ii) reactively compensates for a feedback error of a second characteristic in the building space; generate a second supply air setpoint using a predictive model that predicts the supply air setpoint required to achieve a zone characteristic setpoint for the building space when supply air is provided to the building space at the first supply air setpoint and the second supply air setpoint; and operate building equipment to provide the supply air to the building space at the first supply air setpoint and the second supply air setpoint.

In some embodiments, the first supply air setpoint is a supply air flow rate setpoint and the second supply air setpoint is a supply air temperature setpoint.

In some embodiments, the one or more processing circuits are configured to determine whether the building equipment are capable of achieving the supply air setpoint and, in response to a determination that the building equipment are not capable of achieving the supply air setpoint: modify the supply air setpoint to generate a modified supply air setpoint that the building equipment are capable of achieving; and modify the supply air setpoint using the modified supply air setpoint.

In some embodiments, generating the supply air setpoint includes: determining a feedback second characteristic error in the building space; determining a heat flow rate estimated to correct the feedback second characteristic error; and using the predictive model to determine the supply air setpoint that achieves the heat flow rate when the supply air is provided to the building space at the first supply air setpoint and the second supply air setpoint.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

Objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
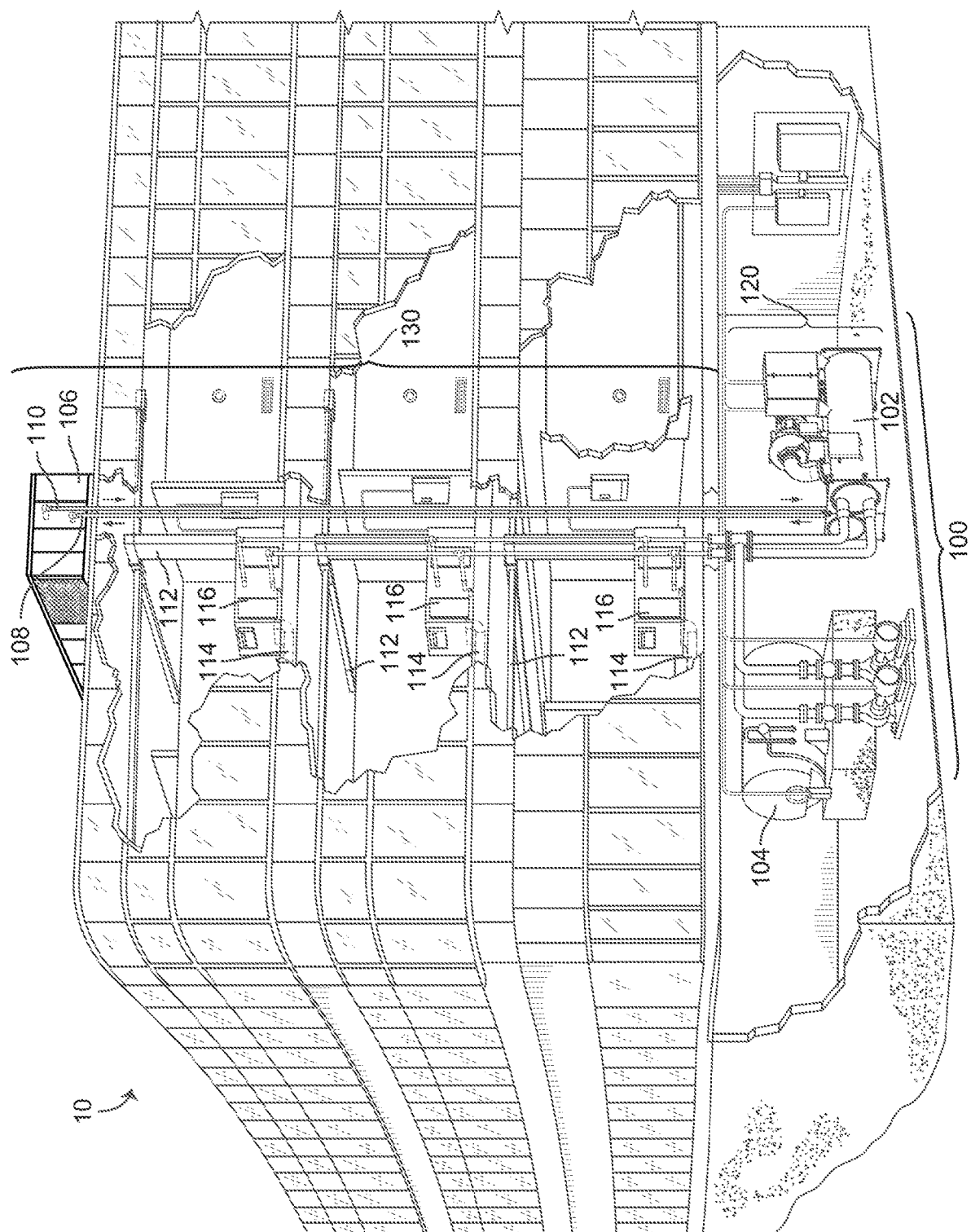
FIG. 1 is a drawing of a building equipped with a HVAC system, according to some embodiments.

Referring generally to the FIGURES, systems and methods for trend analysis and data management for a BMS are shown, according to some embodiments. More specifically, the system and methods described herein can be implemented to monitor parameters of areas within a building or other facility (e.g., a laboratory, a hospital), in order to monitor and control characteristics of the space (e.g., temperature, pressure, humidity, etc.). As described herein, the parameters or characteristics of the space generally include at least temperature and pressure (TP) of a room, area, zone, or building.

In some embodiments, the systems and methods described herein may be applied to rooms or spaces within a hospital, laboratory, or another industrial building where TP must be monitored and maintained. Regulations for TP management may include standards set by governmental or non-governmental entities, including safety standardizing organizations and building administrators. Checks for compliance of TP may be checked randomly or on a set routine or schedule and can affect the ability of the building to continue operation (e.g., an out of compliance hospital may be inhibited from providing patient care).

The systems and methods described herein may continually monitor TP measurements from any number of rooms or areas within a building (e.g., a hospital, a laboratory, a commercial office space, etc.). The TP data may be used to generate trend data that indicated TP measurements for a room or area over time. In some embodiments, the trend data may be analyzed using a predictive model to predict future non-compliance issues. Additionally, in some embodiments, TP data from one or more sensors can be compared to TP setpoint to determine compliance with the TP setpoint.

The systems and methods described herein may provide for efficient and adaptive operation of a building control system for operating conditioned spaces of a building. The systems and methods described herein may require fewer computational resources than certain building control systems. For example, the systems and methods described herein do not utilize a state machine, and are capable of providing integrated temperature control, including heating and cooling, and/or pressure control. Additionally, the systems and methods described herein can be implemented to control of a wide variety of building control systems while requiring minimal software adjustments (e.g., setting values based on the particular HVAC equipment to be controlled). Systems and methods of the present disclosure relate to controlling two or more characteristics of a space, for example, temperature and pressure (TP) within a room of a building, using feedforward-feedback control.

With continued general reference to the FIGURES, systems and methods are disclosed that improve comfortability for building occupants while maintaining appropriate levels of temperature and pressure. In some embodiments, hospitals, laboratories, and storage facilities may need to conform to certain design criteria (e.g., American Society of Heating, Refrigerating and Air-Conditioning Engineers (ASHRAE) standard 170-2017, etc.) with regards to their HVAC systems to minimize infection, maintain staff comfort, and facilitate safe handling and storage of dangerous materials. These design criteria may require one or more building zones to maintain temperature and pressure (TP) within a certain range or ranges. There exists a need to maintain TP within these ranges while simultaneously providing comfortability to the building occupants, energy efficiency, and optimization in the HVAC system.

Building HVAC Systems and Building Management Systems

Figure 2:
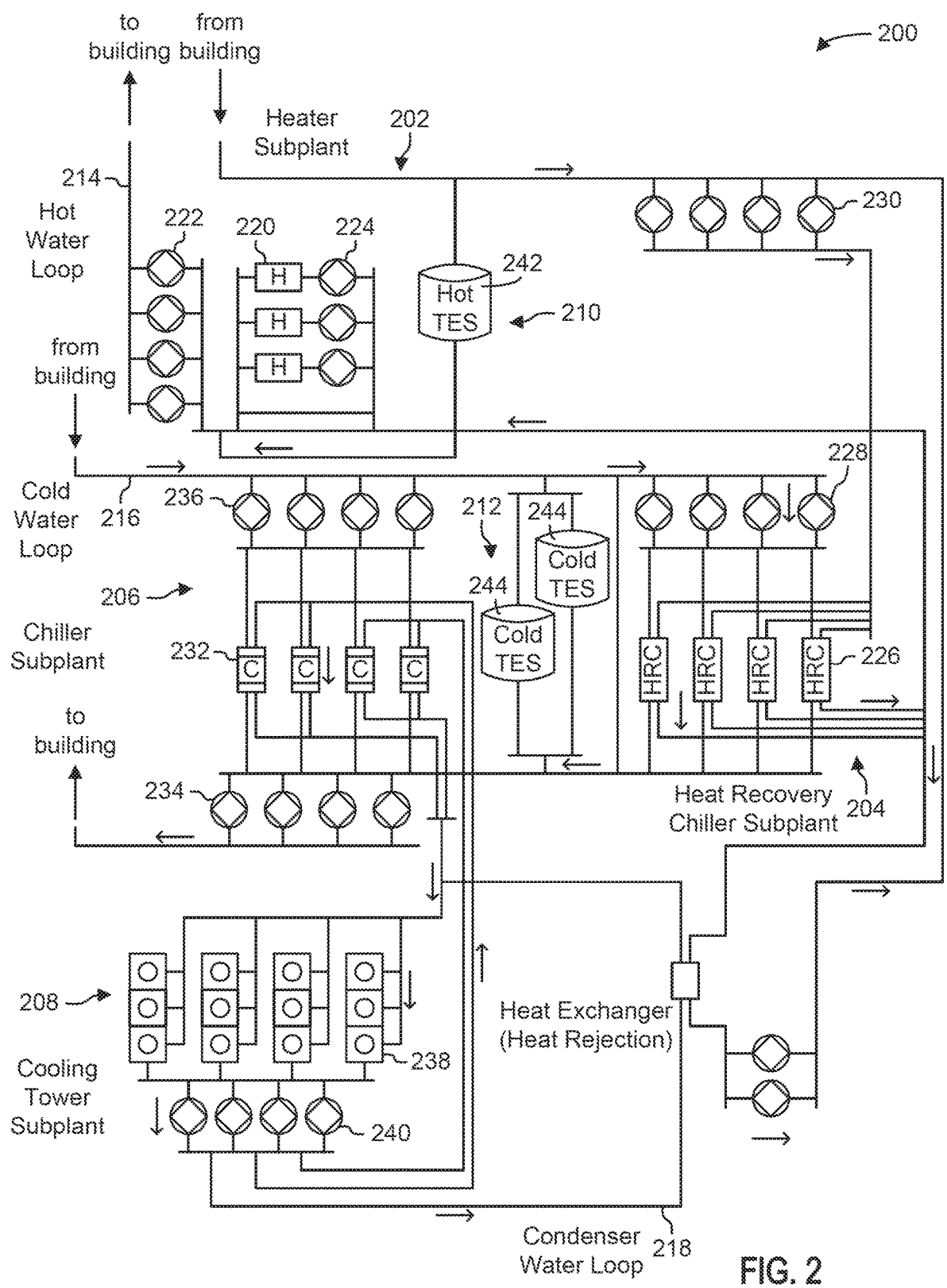
FIG. 2 is a block diagram of a waterside system which can be used to serve the building of FIG. 1, according to some embodiments.
Figure 3:
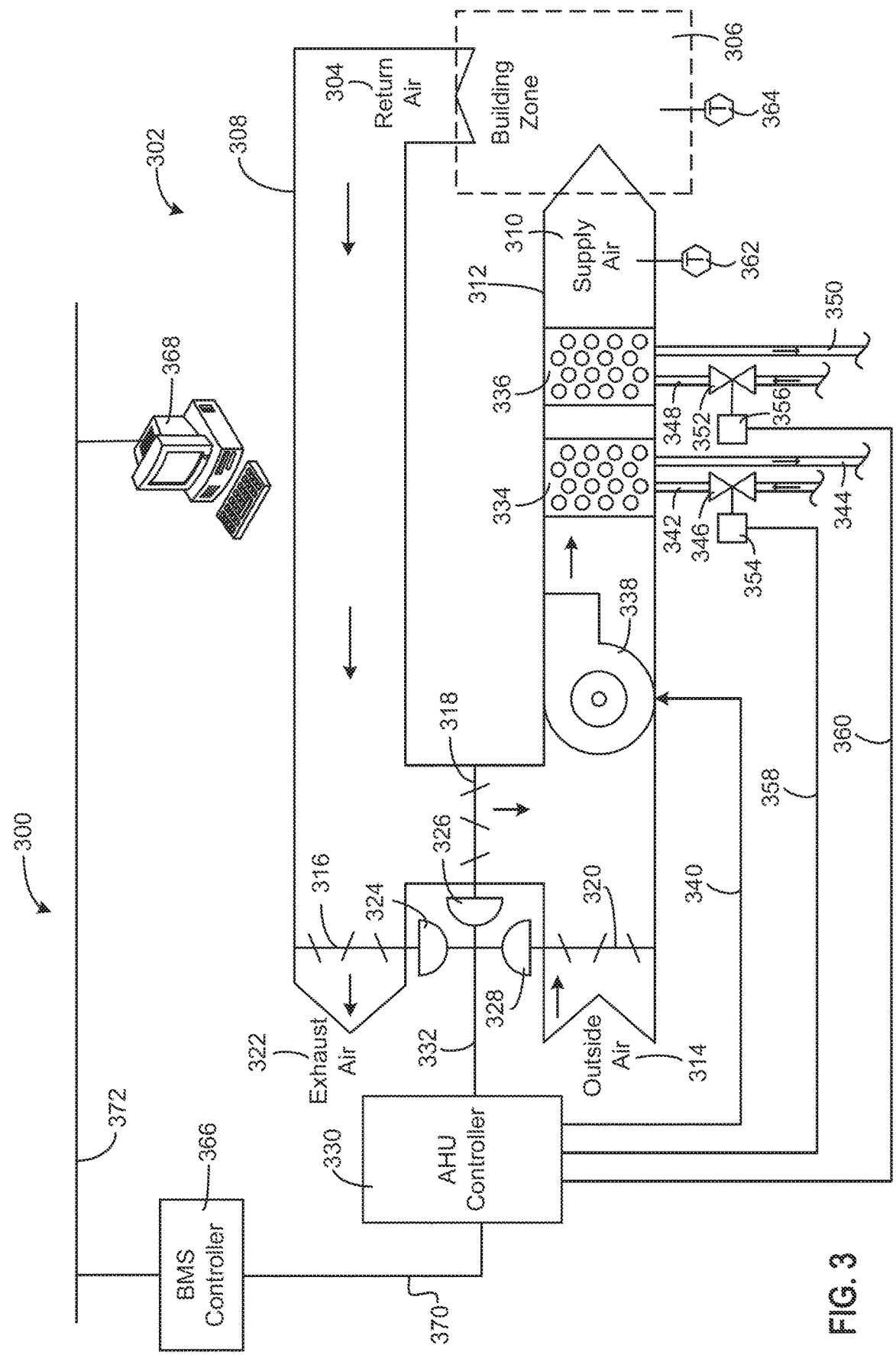
FIG. 3 is a block diagram of a waterside system which can be used to serve the building of FIG. 1, according to some embodiments.
Figure 4:
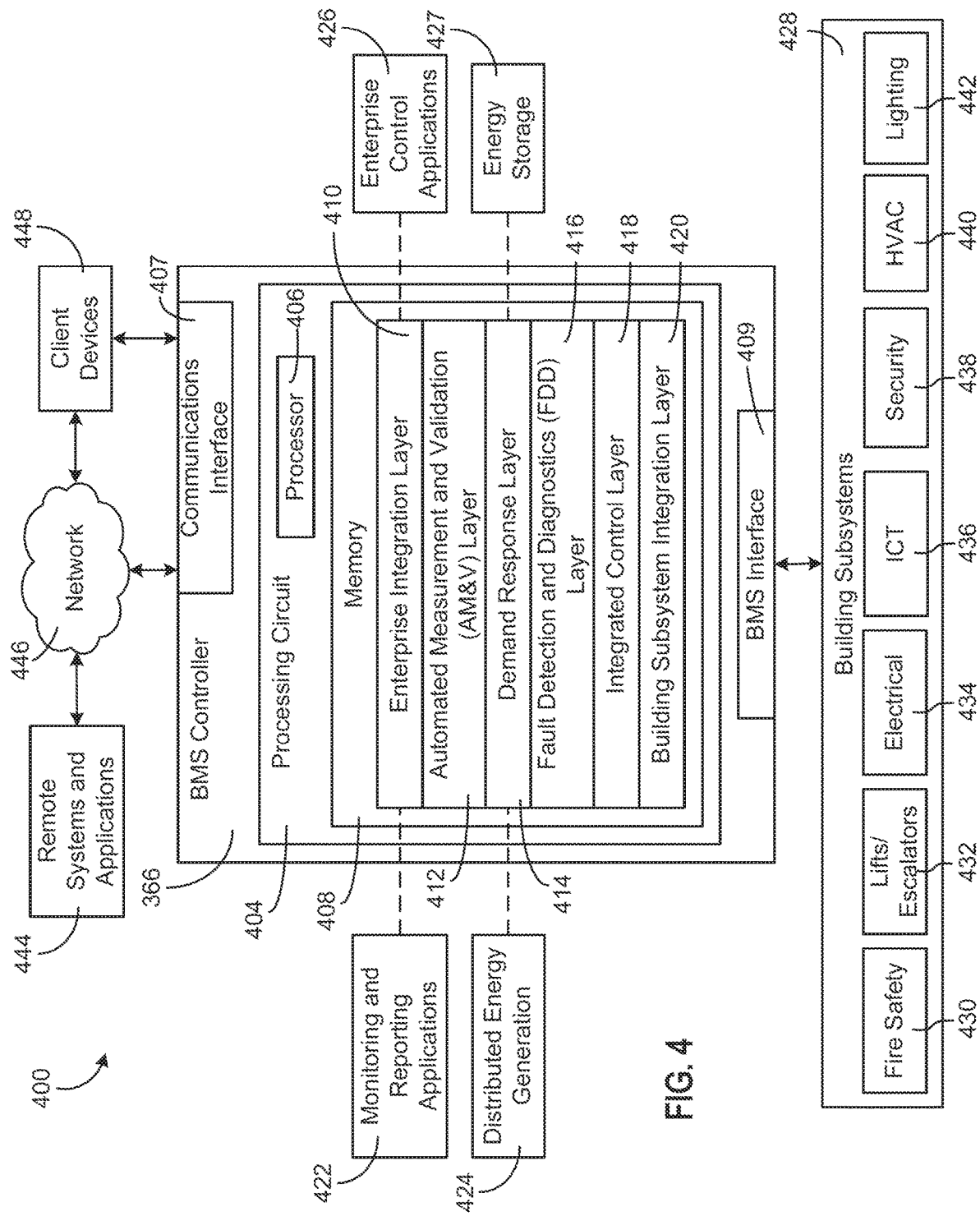
FIG. 4 is a block diagram of a building management system (BMS) which can be used to monitor and control the building of FIG. 1, according to some embodiments.
Figure 5:
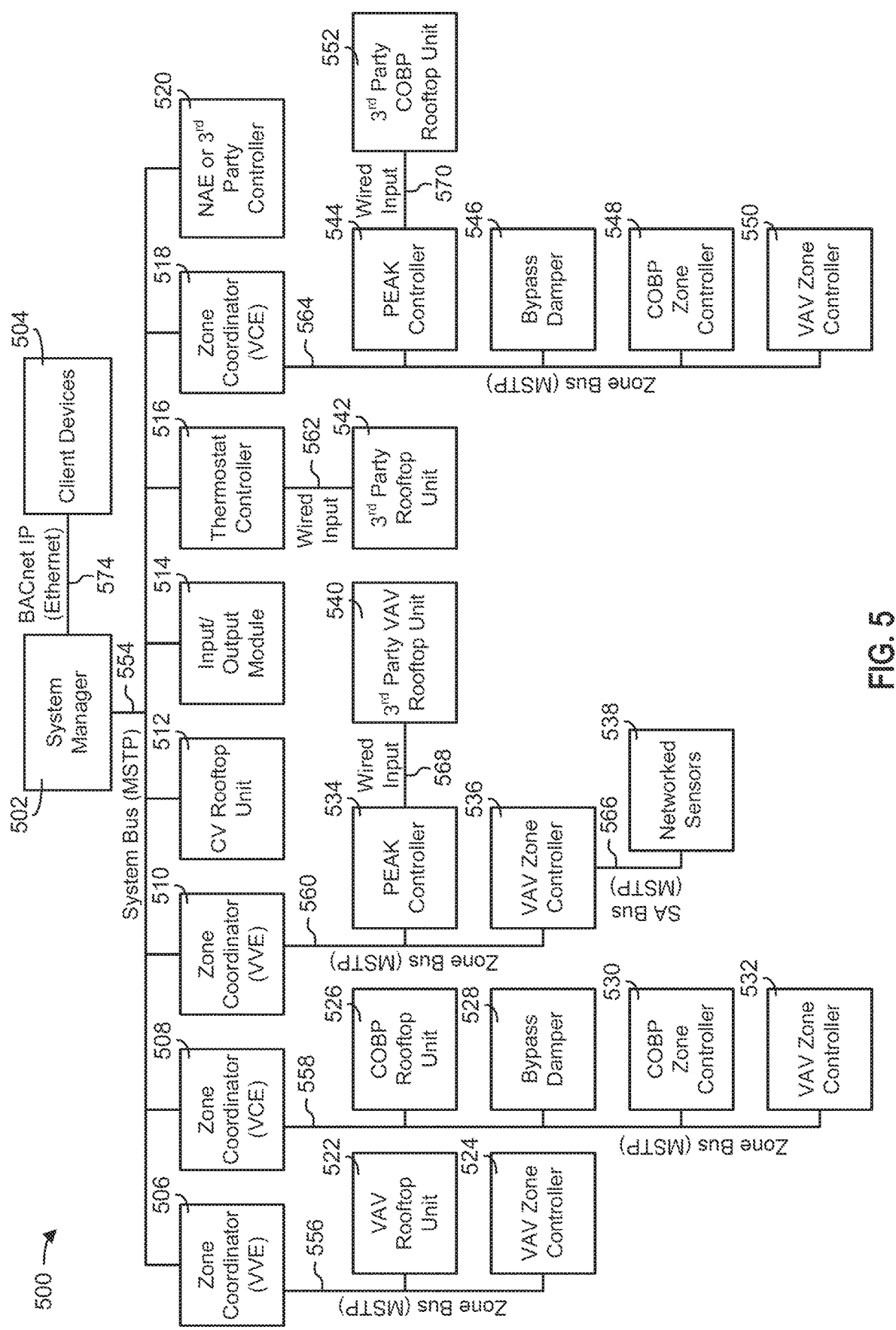
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

The BMS can include a thermostat 107 for controlling HVAC equipment in responses to temperature, humidity, air quality or other conditions. The thermostat 107 can be a smart thermostat with a user interface and internet and network connectivity. The thermostat 107 can include an occupancy sensor and can be in communication with a camera, such as an infrared or heat camera. The camera can provide thermal images or visual images for determining skin temperatures, changes in skin color, perspiration determination, or movement. The thermostat 107 can also include an air quality sensor for determining concentrations of carbon dioxide or other contaminants. The thermostat 107 can be used in a system configured to use feed forward and feedback loops to implement the operations described in U.S. Patent Application Ser. No. 63/047,119 incorporated herein by reference.

In some embodiments, the thermostat 107 is in communication with or includes one or more of a variety of sensors (e.g., air quality, temperature, humidity, air quality, proximity, light, vibration, motion, optical, audio, occupancy, power, security, etc.) configured to sense a variable state or condition of the environment in which the thermostat 107 is installed. In an exemplary embodiment, the thermostat 107 is equipped with a monitoring device (e.g., a camera, a microphone, etc.) for monitoring physical disturbances in the environment where the thermostat 107 is installed. The camera may be a CMOS sensor, charge coupled device (CCD) sensor, or any other type of image sensor configured to monitor the environment. In some embodiments, the camera may be an infrared camera configured to detect infrared energy and convert it into a thermal image.

The sensors can include an air quality sensor (e.g., particulates, pathogen, carbon monoxide, carbon dioxide, allergens, smoke, etc.), a motion or occupancy sensor (e.g., a passive infrared sensor), a proximity sensor (e.g., a thermopile to detect the presence of a human and/or NFC, RFID, Bluetooth, sensors to detect the presence of a mobile device, etc.), an infrared sensor, a light sensor, a vibration sensor, or any other type of sensor configured to measure a variable state or condition of the environment in which the thermostat 107 is installed. The air quality sensor is configured to determine air quality (e.g., an amount of VOCs, CO, CO2, etc.) in some embodiments.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and building subsystems 428 and can be implemented using servers (e.g., cloud-based platform) or one or more thermostats (e.g., thermostat 107 FIG. 1)). Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration layer 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable setpoint adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Data Management

Figure 6:
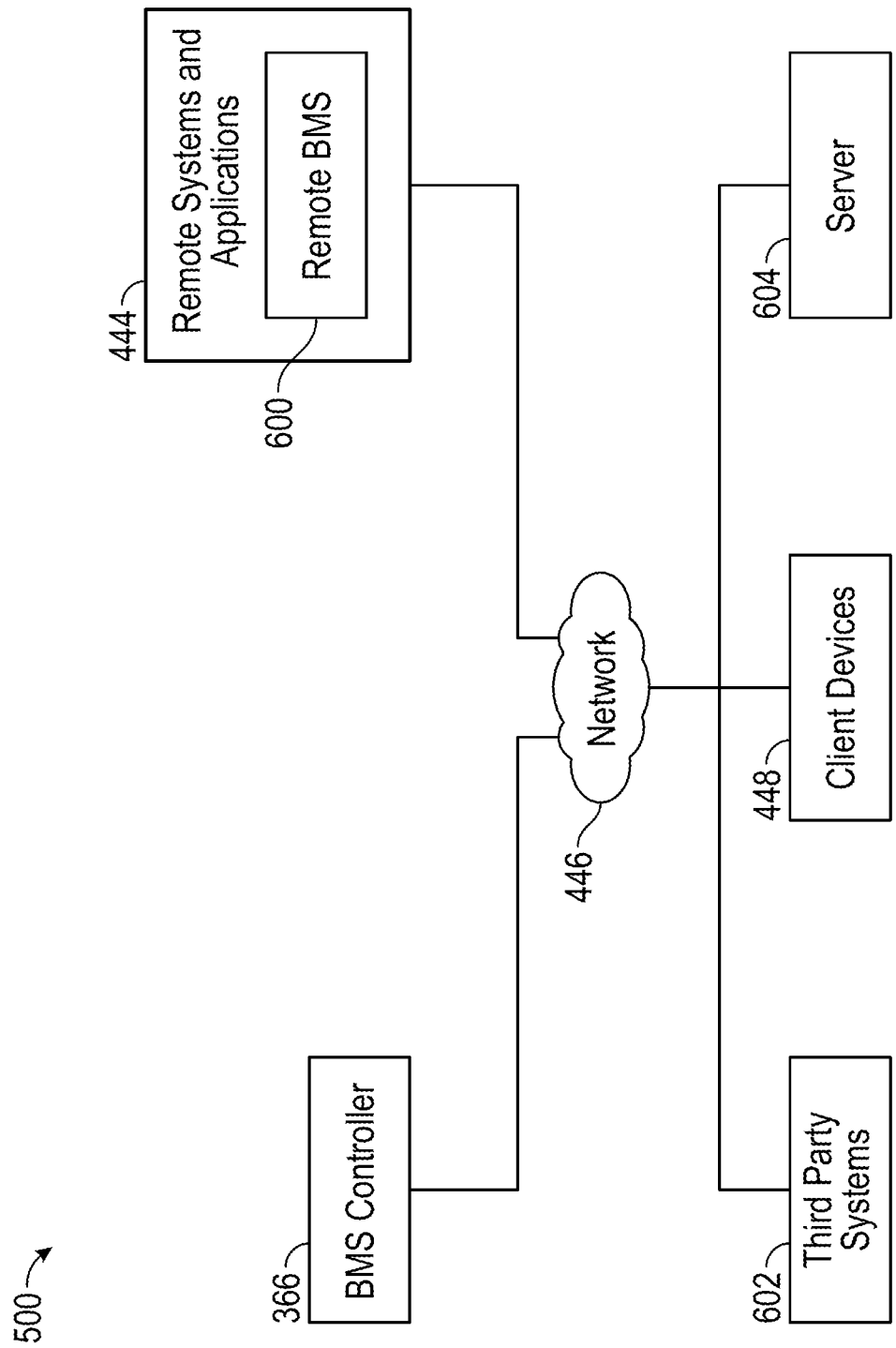
FIG. 6 is a block diagram of another BMS which can be used to monitor and control the building of FIG. 1, according to some embodiments.

As shown in FIG. 6, a block diagram of a data management system 500 for the BMS 400 and one or more remote system or applications 444 is shown, according to some embodiments. As shown, the system 500 centers around the network 446, as briefly described above. The network 446 can be any sort of local or wide-area network (e.g., LAN, WAN, WLAN, MAN, CAN, etc.) that allows the components of the system 500 to exchange information (i.e., data). In some embodiments, the network 446 is an internal network or intranet (e.g., an internal BMS network). In other embodiments, the network 446 the Internet or other similar external network. In some such embodiments, components of the system 500 may communicate via the network 446 using a virtual private network (VPN) or other similar connection.

As also described above, the BMS controller 366 and one or more remote systems and applications 444 may be communicably coupled via the network 446. In the example of the system 500 shown in FIG. 6, the remote systems and applications 444 can include at least one remote BMS or BMS controller, shown as a remote BMS 600, although it will be appreciated that the BMS controller 366 can interface with any number of external or remote systems. Accordingly, the network 446 allows the BMS controller 366 to exchange data with the remote BMS 600. In embodiments, the remote BMS 600 is a secondary BMS or BMS controller for a building that is also served by the BMS 400, or the remote BMS 600 is a BMS or BMS controller for another building managed by a single entity. For example, the remote BMS 600 may be a BMS for a second building of a campus or facility, or may be a BMS for a building at a location that is remote from the building served by BMS 400. In these examples, both the BMS controller 366 and the remote BMS 600 can be accessed or "linked" by a single entity, such as a facility or site manager or management system.

Also communicably coupled to the BMS controller 366 and/or the remote BMS 600 via the network 446 are third party systems 602. The third party systems 602 can include any remote and/or external systems that are not necessarily part of the BMS 400. In other words, the third party systems 602 are generally systems that are hosted, maintained, or otherwise operated by computing devices and/or users outside of an organization associated with the BMS 400 (e.g., the BMS controller 366 and the remote systems and applications 444).

In one example, the third party systems 602 may include an external website, server, or system associated with a utilities provider (e.g., to provide electricity, water, etc.). In this example, the utility provider's system may exchange data relating to utility rates, usage, etc. In another example, such as when the system 500 and/or the BMS 400 are implemented in a hospital, the third party systems 602 can include external data services to allow for communication between a network of hospitals and the regulating bodies. Accordingly, as described in greater detail below, the third party systems 602 can access operational data via the network 446 to perform compliance checks. It will be appreciated that in other embodiments, the third party systems 602 include any other systems that are not operated by the same organization as the BMS 400.

The system 500 is also shown to include client devices 448. As described above, the client devices 448 can include one or more individual client or user devices (e.g., client device 368). The client devices 448 generally allow a user to interact with the BMS controller 366 and/or the remote systems and applications 444. The client devices 448 can include one or more devices such as tablets, computers, smart phones, access points, interactive wall panels, augmented reality devices, smart watches, virtual reality devices, glasses, commercial human machine interfaces, etc., that provide an interface for a user.

In some embodiments, one or more large scale memory devices in the form of servers 604 are also communicably coupled to the network 446. The servers 604 can be implemented in a variety of ways. For example, the servers 604 may include one or more network devices such as a network engine or a controller similar to the BMS controller 366. The servers 604 may also be workstations, personal computers, or another type of device similar to the client device 368 discussed above with server software installed thereon. The servers 604 may also be implemented using one or more on-premises server computers and/or one or more remote cloud-based server computers. In this sense, the servers 604 may be distributed across a variety of physical hardware devices.

Figure 7:
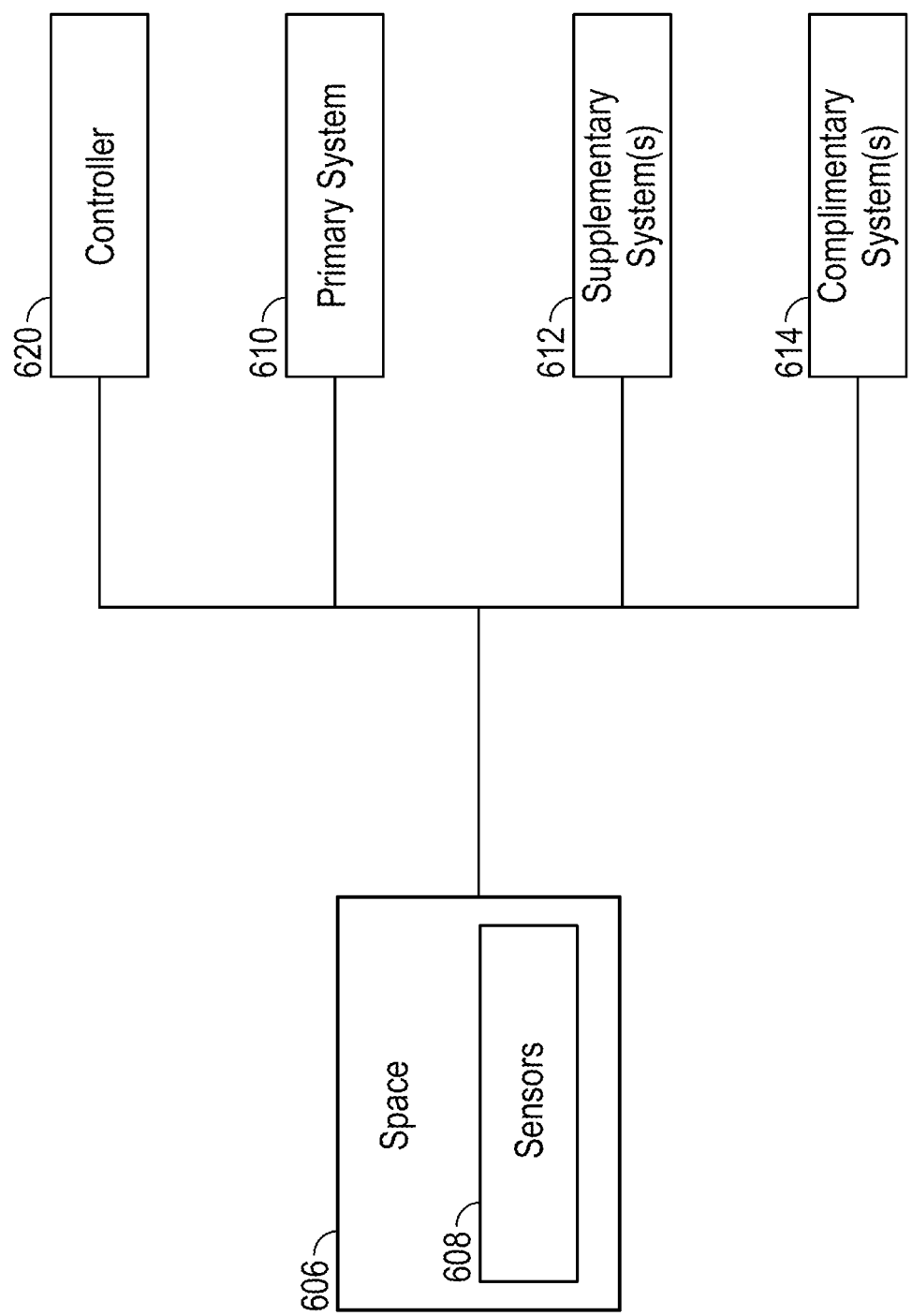
FIG. 7 is a block diagram of a portion of the building of FIG. 1, according to some embodiments.

Referring now to FIG. 7, a block diagram of a space 606 (e.g., room, zone, floor, etc.), including a sensor array 608 is shown, according to some embodiments. The space 606 is generally any defined area within a building that is fitted with one or more sensors for measuring parameters within the space 606. Accordingly, the space 606 may be any room of a building that is served by the BMS 400. In this regard, the space 606 may also include one or more building devices associated with any of the building subsystems 428, such as fire safety devices, HVAC devices, lighting devices, etc. In some embodiments, the space 606 can be any space for which temperature, pressure, and humidity (TPH) performance or compliance is desirable. In some embodiments, the space 606 is an operating room, a patient room, or a common area of a hospital. In some embodiments, the space 606 is a clean room for an industrial, food processing, or pharmaceutical process. In some embodiments, the space 606 is a laboratory and/or includes one or more high flow air exhaust devices (e.g., fume hoods).

The sensors 608 can include any number of sensors for measuring any of a variety of parameters associated with the space 606 and/or the building subsystem devices associated with the space 606. The sensors 608 can include, for example, humidity sensors, temperature sensors, pressure sensors, and other sensors. In some embodiments, the sensors 608 includes fire/smoke alarms, door sensors, occupancy sensors, thermal cameras, air quality sensors, and/or other sensors that measure factors indicative of an environment within the space 606. In some embodiment, such as when the space 606 is an operating room or a patient room in a hospital, the sensors 608 includes any sensors that are necessary to ensure patient comfort and safety, and to monitor/maintain an environment that meets compliance standards for hospitals. In some embodiments, such as when the space 606 is in a laboratory or clean room environment, the sensors 608 includes any sensors that are necessary to ensure adequate occupant safety. In general, the sensors 608 includes sensors configured to measure at least a temperature and a pressure of the space 606.

As shown in FIG. 7, a primary system 610 and a supplementary system 612 are communicably coupled to the sensors 608. In this manner, the primary system 610 and/or the supplementary system 612 may receive sensor data from the sensors 608. In general, the primary system 610 and/or the supplementary system 612 are structured to control an environment within the space 606. Accordingly, the primary system 610 and/or the supplementary system 612 can include at least a portion of any of the building subsystems 428 described above. The primary system 610 and/or the supplementary system 612 may be configured to affect at least a temperature, pressure, and humidity of the space 606. In other words, the primary system 610 and/or the supplementary system 612 can affect or control the environment within the space 606.

In some embodiments, the primary system 610 includes HVAC equipment (e.g., of the HVAC subsystem 440) capable of affecting the environment of the space 606 (e.g., by controlling or adjusting the temperature, pressure, and humidity). For example, the primary system 610 can include at least the waterside system 120 and/or the airside system 130 discussed above. In some embodiments, the primary system 610 is a single component (e.g., a heater, a chiller, an AHU, a pump, etc.), while in other embodiments, the primary system 610 can include any number of devices (e.g., one or more devices of the HVAC subsystem 440, described above) or systems (e.g., the HVAC system servicing a group of rooms collectively).

The supplementary system 612 is generally an additional (e.g., backup) system that supplements or replaces the primary system 610. In this regard, the supplementary system 612 can include one or more devices that are functionally similar to, or identical to, the devices of the primary system 610. For example, if the primary system 610 includes an AHU (e.g., the AHU 106) and one or more chillers (e.g., the chiller 102), then supplementary system may also include a similarly sized AHU and chillers.

In some embodiments, one or more complementary systems 614 are also associated with the space 606, and thereby coupled to the sensors 608. The complementary systems 608 can generally include any additional subsystems (e.g., of the building subsystems 428) or building devices that are not included in the primary system 610 or the supplementary system 612. In some embodiments, the complementary systems 608 include any subsystems or devices that are not associated with controlling or monitoring the environment within the space 606, and more specifically the temperature, pressure, and/or humidity of the space 606. For example, the complementary systems 610 can include a fire suppression system, a security system, a utility system (e.g., electricity, gas, etc.), and/or any another system related to the operation of the space 606.

Pressure and Temperature Critical Environment Control

Figure 8:
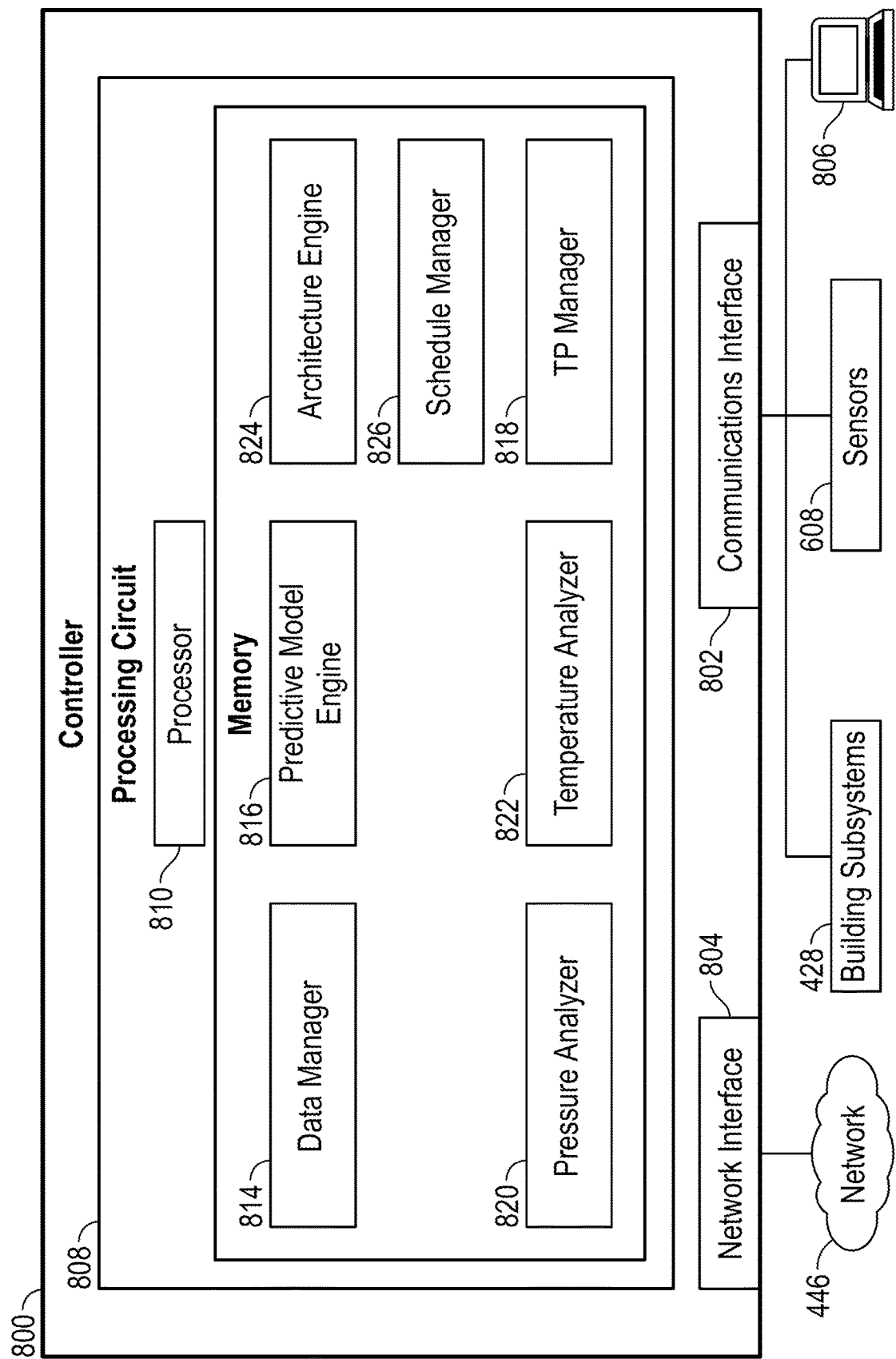
FIG. 8 is a block diagram of a controller which can be used to monitor and control the building of FIG. 1, according to some embodiments.

As shown in FIG. 8, a controller 800 is generally structured for smart building control, according to some embodiments. More specifically, the controller 800 may be structured to monitor and/or control one or more characteristics (e.g., pressure, temperature, humidity, etc.) of one or more areas (e.g., rooms) within a building (e.g., a hospital, a laboratory, etc.) in order to adjust climate control devices (e.g., HVAC equipment) accordingly. In some cases, the climate or environment (e.g., at least pressure and temperature) of an area or room within a building may be affected by other, adjacent areas. For example, adjacent rooms may affect the temperature, pressure of one another, and opening and closing doors to a room can change the temperature and pressure within the room or an adjacent area (e.g., a hallway). Additionally, ventilation devices, such as fume hoods, can significantly impact the pressure and temperature of a space and/or adjacent areas. Accordingly, the controller 800 described herein may be configured to analyze sensor data to predict and/or monitor temperature and/or pressure (TP) changes and adjust equipment operations accordingly.

The controller 800 may be structured to receive data from various sensors and subsystems of the building 10 and/or the BMS 400 or 500, and may analyze the data monitor and/or adjust the temperature and pressure of different areas with the building 10. As described in more detail below, the controller 800 may even be at least partially implemented within the BMS 400 or the BMS 500. The controller 800 may provide automated or semi-automated control over the climate within areas of a building in order to maintain a setpoint (e.g., a pressure setpoint, a temperature setpoint), or set of setpoint values (e.g., a pressure setpoint and a temperature setpoint). Unlike certain other systems, the controller 800 may be interfaced with various building subsystems (e.g., the building subsystems 428) in addition to an HVAC subsystem (e.g., the HVAC 440). This may lead to increased accuracy in increased energy efficiency, and increasingly accurate TP control systems.

The controller 800 is shown to include a communications interface 802 for exchanging data with a wide variety of external systems, devices, or components. In other words, the communications interface 802 may be configured to facilitate the exchange (i.e., sending and receiving) of data between the controller 800 and one or more other components. In some embodiments, the communications interface 802 provides an interface between the controller 800 any of the components of the BMS 400 or the BMS 500 described above. In this regard, the communications interface 802 can include a BACnet interface in addition to other types of communications interfaces (e.g., Modbus, LonWorks, DeviceNet, XML, etc.). For example, the controller 800 is shown to communicate with the building subsystems 428 via a communications interface 802. In some embodiments, the communications interface 802 may be configured to exchange data via the network 446 and may include appropriate interfaces for communicating on the network 446. For example, the communications interface 802 may include a wired and/or wireless interface for connecting the controller 800 to the Internet, or to an intranet. In other embodiments, as shown in FIG. 8, the controller 800 includes a network interface 804 configured to facilitate the exchange of data between the controller 800 and the network 446.

As mentioned, the controller 800 is shown to be communicably coupled to any of the building subsystems 428, as described above. In this regard, the controller 800 may receive data regarding one or more parameters of the various building subsystems, analyze or process the data, and control one or more of the building subsystems 428 based on the data. In some embodiments, the controller 800 may be integrated with at least the security subsystem 438 and the HVAC subsystem 440. In this regard, the controller 800 may receive data from sensors and/or access control devices of the security subsystem 438, and may control various devices of the HVAC subsystem 440. In embodiments, the controller 800 may be coupled to the building subsystems 428 either directly (e.g., through a wired connection) or indirectly (e.g., via the network 446).

In some embodiments, the communications interface 802 also facilitates communication between the controller 800 and one or more sensors 608. The sensors 608 can include any number of sensors for measuring any of a variety of parameters associated with an area (e.g., a space) within a building and/or the building subsystem devices associated with the area (e.g., HVAC equipment). The sensors 608 can include, for example, humidity sensors, temperature sensors, pressure sensors, and other sensors. More generally, the sensors 608 can include any sensors that measure factors indicative of an environment within an area of a building.

As shown, the communications interface 802 also facilitates communication between the controller 800 and at least one user device 806. The user device 806 may be any electronic device that allows a user to interact with the controller 800 through a user interface. Examples of user devices include, but are not limited to, mobile phones, electronic tablets, laptops, desktop computers, workstations, and other types of electronic devices. The user device 806 may be similar to the client device 368 and/or the client devices 448, as described above. The user device 806 may display graphical user interfaces or other data on a display, thereby enabling a user to easily view data and interact with the controller 800.

In some embodiments, the controller 800 may also store and/or retrieve data from one or more external system (e.g., servers, computers, databases, etc.). In such embodiments, the controller 800 may communicate with any external systems via network interface 804, and thereby via network 446. The external systems many include the remote systems and applications 444, described above, for example. In some embodiments, at least one of the remote systems and applications 444 is an external database. The external database can be implemented in a variety of ways. For example, the external databases may include one or more memory devices or remote storage devices. The external databases may also include workstations, personal computers, servers, etc., and may include one or more on-premises server computers/databases and/or one or more cloud-based databases. In this sense, the external databases may be distributed across a variety of physical hardware devices.

Still referring to FIG. 8, the controller 800 includes a processing circuit 808, which further includes a processor 810 and memory 812. It will be appreciated that these components can be implemented using a variety of different types and quantities of processors and memory. The processing circuit 808 can be communicably connected to the communications interface 802 and/or the network interface 804 such that processing circuit 808 and the components thereof can send and receive data via the communications interface 802 and/or the network interface 804. The processor 810 can be implemented as a general purpose processor, an application specific integrated circuit (ASIC), one or more field programmable gate arrays (FPGAs), a group of processing components, or other suitable electronic processing components.

The memory 812 (e.g., memory, memory unit, storage device, etc.) can include one or more devices (e.g., RAM, ROM, Flash memory, hard disk storage, etc.) for storing data and/or computer code for completing or facilitating the processes, layers and modules described in the present application. The memory 812 can be or include volatile memory or non-volatile memory. The memory 812 can include database components, object code components, script components, or any other type of information structure for supporting the activities and information structures described in the present application. According to an example embodiment, the memory 812 is communicably connected to the processor 810 via the processing circuit 808 and includes computer code for executing (e.g., by the processing circuit 808 and/or the processor 810) one or more processes described herein.

In some embodiments, the controller 800 is implemented within a single computer (e.g., one server, one housing, etc.). In other embodiments the controller 800 can be distributed across multiple servers or computers (e.g., that can exist in distributed locations). In some embodiments, the controller 800 is embodied in the BMS 400 or the BMS 500 as described above, and accordingly, the processing circuit 808, the processor 810, and/or the memory 812 may be similar to or the same as the processing circuit 404, the processor 406 and/or the memory 408 as described above. Additionally, in such embodiments, the components of the memory 812, described below, may be embodied in the BMS 400. In other embodiments, the controller 800 is a stand-alone device or component not embodied in the BMS 400 or the BMS 500, and therefore includes its own dedicated processing circuit 808, processor 810, and/or memory 812. In yet other embodiments, the controller 800 is embodied as a portion of the BMS 400 or the BMS 500, a differently arranged BMS, or a building automation system (BAS), and accordingly may share a processing circuit, processor, and/or memory with any of these other BMSs or BASs.

The memory 812 is shown to include a data manager 814. The data manager 814 may be configured to receive and/or preprocess signals or data from the building subsystems 428 and/or the sensors 608. In some embodiments, the data manager 814 receives at least TP data from the sensors 608 and directs the TP sensor data to other components of memory 812. As briefly described above, the temperature and pressure data can be any sort of sensor data or signal relating to temperature, pressure, and/or humidity of an area, and measured by one or more sensors of the sensors 608. In some embodiments, the data manager 814 preprocesses the TP data, or any of the other data described below, such as by reformatting the data, modifying the data to remove outliers, reducing noise in signals, etc. It will be appreciated that the data manager 814 may implement any suitable preprocessing based on the type and format of received data.

In some embodiments, the data manager 814 also receives data from the building subsystem 428, and more specifically from the HVAC subsystem 440 and the security subsystem 438. Data from the HVAC subsystem 440 may include, for example, operational data or parameters relating to any HVAC equipment within a building (e.g., the building 10). As another example, the HVAC data may include operational states, power consumption values, sensor measurements, operating schedules, or any other data associated with the operation of HVAC equipment. For example, the HVAC data may include a state or condition of a fume hood, vent, and/or exhaust, available in the building. The data received from the security subsystem 438 generally includes access control data, such as door sensor data. The door sensor data indicates a state (e.g., open or closed) of doors throughout a building. In some embodiments, door sensor data may be received directly from access control devices, such as door sensors, and the data manager 814 is accordingly coupled to the access control devices rather than an entire security subsystems.

In some embodiments, the data manager 814 is also configured to manage data storage and retrieval (i.e., data management). The data manager 814 may be configured to store received data in an internal database (e.g., a partition within memory 812), for example. In some embodiments, the internal database may be a separate memory device that is internal to the controller 800 and/or the BMS 400. In some embodiments, the data manager 814 may transmit data to one or more of the external databases, as previously described, via network interface 804. In this regard, the data manager 814 may also retrieve data from either an internal database or external database for additional processing or analysis.

The memory 812 is also shown to include a predictive model engine 816. The predictive model engine 816 is generally configured to generate, train, and/or execute a predictive model for predicting TP for an area or areas of a building. The predictive model can be any suitable type of neural network, machine learning model, or other artificial intelligence system. In some embodiments, the predictive model may include a model based predictive engine based on previous data, decision trees, and other algorithms. The predictive model is generally selected or designed for a specific installation or building. For example, an artificial intelligence system may be structured to learn the specific TP dynamics of a hospital area (e.g., patient rooms, operating rooms, commons paces, etc.) or other controlled environment. The predictive model engine 816 may also be configured to continuously update the predictive model based on real-time senor data. In some embodiments, the predictive model is dynamically modified using a reinforcement learning schema to improve the accuracy of trend data predictions over time.

In some embodiments, sensor data relating to TP for a first area and any adjacent areas, along with door sensor data indicating a state (e.g., open or closed) of doors within the first area or adjacent areas, is used to execute the predictive model. Accordingly, the predictive model engine 816 may receive TP data from the sensors 608 and door sensor data from the security subsystem 438 via data manager 814. The predictive model may then be executed using the sensor and door data to generate a prediction of future TP within a target room (e.g., the first room). In this manner, the predictive model may take into account the impact of opening and closing of doors to the space or room, which is known to effect the TP of a space. Additionally, the predictive model may indicate the impact of rooms or spaces that are adjacent to a target space with respect to TP. In some embodiments, sensor data relating to TP for a first area and any adjacent areas, along with fume hood sensor data indicating a state (e.g., open or closed, flow rate, flow rate setpoint), is used to execute the predictive model.

In some embodiments, the sensor data may include ambient temperature, pressure, or humidity information. In some embodiments, the ambient temperature, pressure, or humidity information is received from a weather station located at the building or remotely (e.g., a remote weather service). The predictive model engine 816 receives the ambient information and predicts an impact of the ambient information on the TP within the target space. For example, if the ambient conditions predict a heat spike in the afternoon, the predictive model engine 816 is able to predict the effect of the ambient conditions and control the HVAC equipment to successfully avoid TP issues caused by changing ambient conditions.

The memory 812 is also shown to include a TP manager 818. The TP manager 818 is generally configured to generate parameters and make control decisions for controlling HVAC equipment in order to maintain or adjust TP within one or more areas of the building. Additionally, the memory 812 may include a pressure analyzer 820 configured to monitor pressure within an area of between adjoining areas of a building, and to adjust pressure within an area. In some embodiments, the memory 812 may include a temperature analyzer 822 configured to monitor temperature within an area between adjoining areas of a building, and to adjust temperature within an area. In some embodiments, the TP manager 818, the pressure analyzer 820, and the temperature analyzer 822 are integrated to accurately monitor TP within an area and/or pressure between adjacent areas, and/or to generate control decisions to maintain TP based on a control schedule for the building.

In some embodiments, the TP manager 818, temperature analyzer 822, and/or the pressure analyzer 820 are configured to adjust parameters of HVAC equipment (e.g., of the HVAC subsystem 440) in response to the detection of TP issues, or the prediction of future TP issues, by the TP manager 818. Accordingly, the TP manager 818 and/or the pressure analyzer 280 can control the HVAC equipment to adjust any of the TP parameters within an area to maintain compliance, or to bring the TP of the area back into compliance. For example, if the TP manager 818 determines that the pressure of a room may become non-compliant within a future time interval (e.g., based on the predictive model), one of the TP manager 818 and/or the pressure analyzer 820 may operate HVAC equipment (e.g., an AHU) to increase the pressure in the room to maintain compliance.

The TP manager 818 is generally configured to identify TP issues (e.g., deviant temperature and/or pressure values) and compare information received from the sensors 608 to standards, rules, user preferences, or regulations which dictate a set of threshold values or other criteria for the building. In some embodiments, the TP manager 818 is generally configured to ensure a temperature or pressure setpoint and/or measurement is compliant with one or more rules. In some embodiments, the TP manager 818 can query a remote database or server to retrieve stored compliance rules. In some such embodiments, the TP manager 818 may query a third party system in order to receive the most up-to-date compliance rules. In some embodiments, the TP manager 818 may query an external system or database at a regular time interval, to maintain accurate compliance rules. As such, the TP manager 818 may provide enhanced compliance analysis over other systems and methods by avoiding out-of-date standards. However, in certain other embodiments, compliance standards may be manually entered (e.g., by a user).

In some embodiments, the TP manager 818 is configured to identify future TP compliance issues based on predictions generated by the predictive model engine 816. For example, the TP manager 818 can compare predicted future TP for a target space by comparing the predictions to compliance standards. If compliance issues are predicted, the TP manager 818 can initiate preventative maintenance to correct or avoid the compliance issues.

In some embodiments, the TP manager 818 analyzes real-time or near real-time data received from the sensors 608 to detect compliance issues. In such embodiments, the TP manager 818 may compare the TP measurements to a range of acceptable TP values, as identified by the TP compliance standards or other criteria.

The memory 812 is also shown to include an architecture engine 824. The architecture engine 824 may be configured to identify how the structure of a building or room effects TP for the building or room. Accordingly, the architecture engine 824 may determine improvements to the layout of an area and/or to the design or structure of the building. For example, the architecture engine 824 may identify a non-optimal room design, layout, or construction that results in frequent compliance issues, or difficulty maintaining compliant TP. The architecture engine 824 may determine how the design, layout, or construction of the room may be improved (e.g., in new construction, with renovation) to increase efficiency and ability to maintain TP compliance.

The memory 812 is also shown to include a schedule manager 826. The schedule manager 826 may be configured to generate and/or implement equipment operating schedules and/or calibration schedules. For example, the schedule manager 826 may generate or determine operating schedules for various building equipment (e.g., HVAC equipment). In some embodiments, the schedule manager 826 generates a schedule for calibrating sensors 608. In such embodiments, the schedule manager 826 can generate and transmit a notification of upcoming calibration requirements to user device 806 or another system. In some embodiments, the schedule manager 826 can even initiate a routine calibration process based on the schedule. In some embodiments, a calibration schedule is determined by a manufacturer of a sensor or sensors (e.g., the sensors 608), and/or is determined by a manufacturer of a calibration unit.

In some embodiments, the schedule manager 826 also receives schedules associated with an area (e.g., a room) to improve predictions of future TP for the area. In a hospital, for example, the schedule manager 826 may receive an indication of future occupancy in a patient room or operating room, and the predictive model engine 816 may utilize this indication in generating a TP prediction for the room. To continue this example, if a surgeon requests particular TP settings in an operating room at a particular time, the TP of the operating room and adjacent rooms may be affected. In some embodiments, the schedule manager 826 may interface with an external scheduling system to receive such indications.

Figure 9:
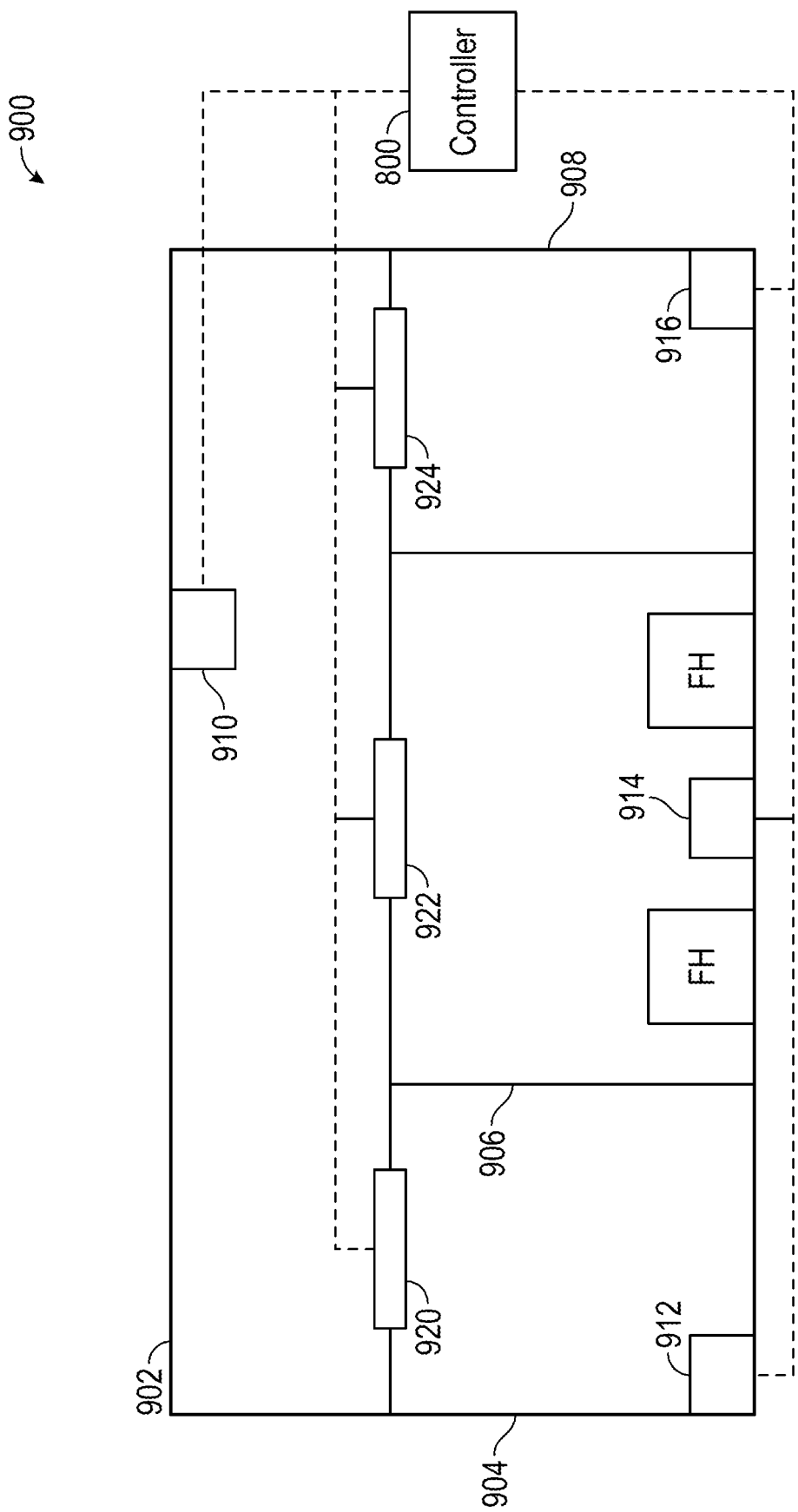
FIG. 9 is a block diagram of a system including the controller of FIG. 8 and a portion of the building of FIG. 1, according to some embodiments.

Referring now to FIG. 9, a system 900 for climate control of one or more areas of a building (e.g., building 10) is shown, according to some embodiments. FIG. 9 may illustrate, for example, at least a portion of a building that includes the BMS 400 and/or 500, as described above, and the controller 800, also described above. In one example, FIG. 9 is an example of a rooms and a hallway within a hospital. The system 900 may be configured to monitor data from various sensors (e.g., sensors 608) and access control sensors, in order to determine control decisions for various other systems of the building. Further, the system 900 may determine how areas (e.g., rooms) within a building affect TP in other, adjacent rooms.

The system 900 is shown to include a hallway 902 and spaces (e.g., rooms, etc.) 904-906. The hallway 902 and the rooms 904-908 can represent any similar areas of a building, and are used here to represent various types of spaces that may be included in a building such as a hospital. In one example, each of rooms 904-908 may be patient rooms and/or operating rooms in a hospital. Similarly, hallway 902 may represent a hallway or a common area in the hospital. In any case, each of the hallway 902 and the rooms 904-908 are distinct spaces within a building that are separated by walls, doors, windows, etc.

Each of the rooms 904-908, along with the hallway 902, are shown to include a sensor array, shown as sensors 910-916. As described above with respect to FIG. 8, each of the sensors 910-916 can include any number of sensors for measuring any of a variety of parameters associated with an area (e.g., a room) within a building and/or the building subsystem devices associated with the area (e.g., HVAC equipment). In general, the sensors 910-916 may include humidity sensors, temperature sensors, pressure sensors, and other sensors for measuring TP within a corresponding room.

Each of the rooms 904-908 are also shown to include a door sensor, shown as door sensors 920-924. The door sensors 920-924 may be access control devices attached to a corresponding door and coupled to the security subsystem 438. The door sensors 920-924 may indicate a position of the correspond door (e.g., open or closed) and an open time indicating how long a door was in the open position. Each of the sensors 910-916 and the door sensors 920-924 are shown to be communicably coupled to the controller 800. Accordingly, the controller 800 may receive data from each of the sensors 910-916 and the door sensors 920-924. Sensor data received from the sensors 910-916 and the door sensors 920-924 can be utilized to predict future TP for any of the hallway 902 and/or the rooms 904-908.

Systems and Methods for HVAC Control Using Feedforward and Feedback Control

Figure 10:
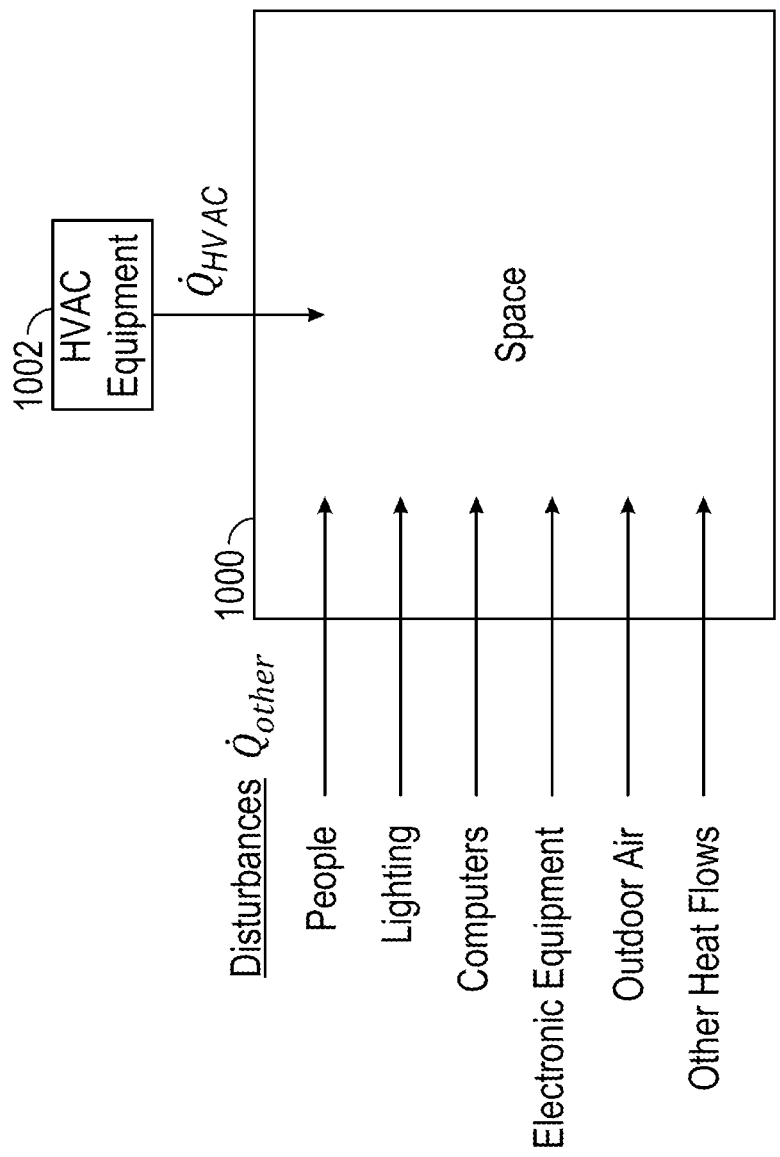
FIG. 10 is a block diagram of a portion of the building of FIG. 1, according to some embodiments.

Referring now to FIG. 10, a block diagram illustrating heat flows at the space 1000 is shown, according to an exemplary embodiment. The various heat flows described above are shown under the heading "disturbances," a term used herein to refer to the various heat flows to the space 1000 other than from the HVAC equipment 1002. That is, as illustrated in FIG. 10, people, lighting, computers, other electronic devices, solar radiation, outdoor air, and other heat flows (e.g., from neighboring spaces, from animals in the space) provide heat to the space 1000, the total of which is denoted as $\dot{Q}_{other}$. It should be understood that, depending on the relative values of the various heat flows, the net value of $\dot{Q}_{other}$ at any given point in time can be positive (indicating heating of the space 1000 by the disturbances) or negative (indicating cooling of the space 1000 by the disturbances). In some embodiments, weather, movement of people or equipment, use of kitchen equipment, appliances and fireplaces can be used in heat transfer and air quality estimations.

As shown in FIG. 10, HVAC equipment 1002 operates to provide heat $\dot{Q}_{HVAC}$ to the space 1000. When HVAC equipment 1002 is in a heating mode, $\dot{Q}_{HVAC}$ is greater than zero. When HVAC equipment 1002 is in a cooling mode, $\dot{Q}_{HVAC}$ is less than zero.

In the example of FIG. 10, the two values $\dot{Q}_{HVAC}$ and $\dot{Q}_{other}$ other characterize the total energy flow to the space 1000, $\dot{Q}_{total} = \dot{Q}_{HVAC} + \dot{Q}_{other}$. The indoor air temperature within the space 1000 changes based on the value of $\dot{Q}_{total}$. When $\dot{Q}_{total} > 0$, the temperature in the space 1000 increases. When $\dot{Q}_{total} < 0$, the temperature in the space 1000 decreases. When $\dot{Q}_{total} = 0$, the temperature in the space 1000 stays approximately constant. Accordingly, if the HVAC equipment 1002 is controlled to provide $\dot{Q}_{HVAC} = \dot{Q}_{other}$, the space 1000 is maintained approximately at an established temperature, for example a setpoint temperature selected by a user via setpoint adjustment interface of the user interface 806. However, $\dot{Q}_{other}$ cannot be measured directly. Accordingly, as described in detail below, the systems and methods described herein apply a combination of feedforward control and feedback control based on estimations of disturbance heat flows and estimated disturbance mass flows to control $\dot{Q}_{HVAC}$ to manage the total heat flow and resulting temperature and pressure of the space 1000.

Figure 11:
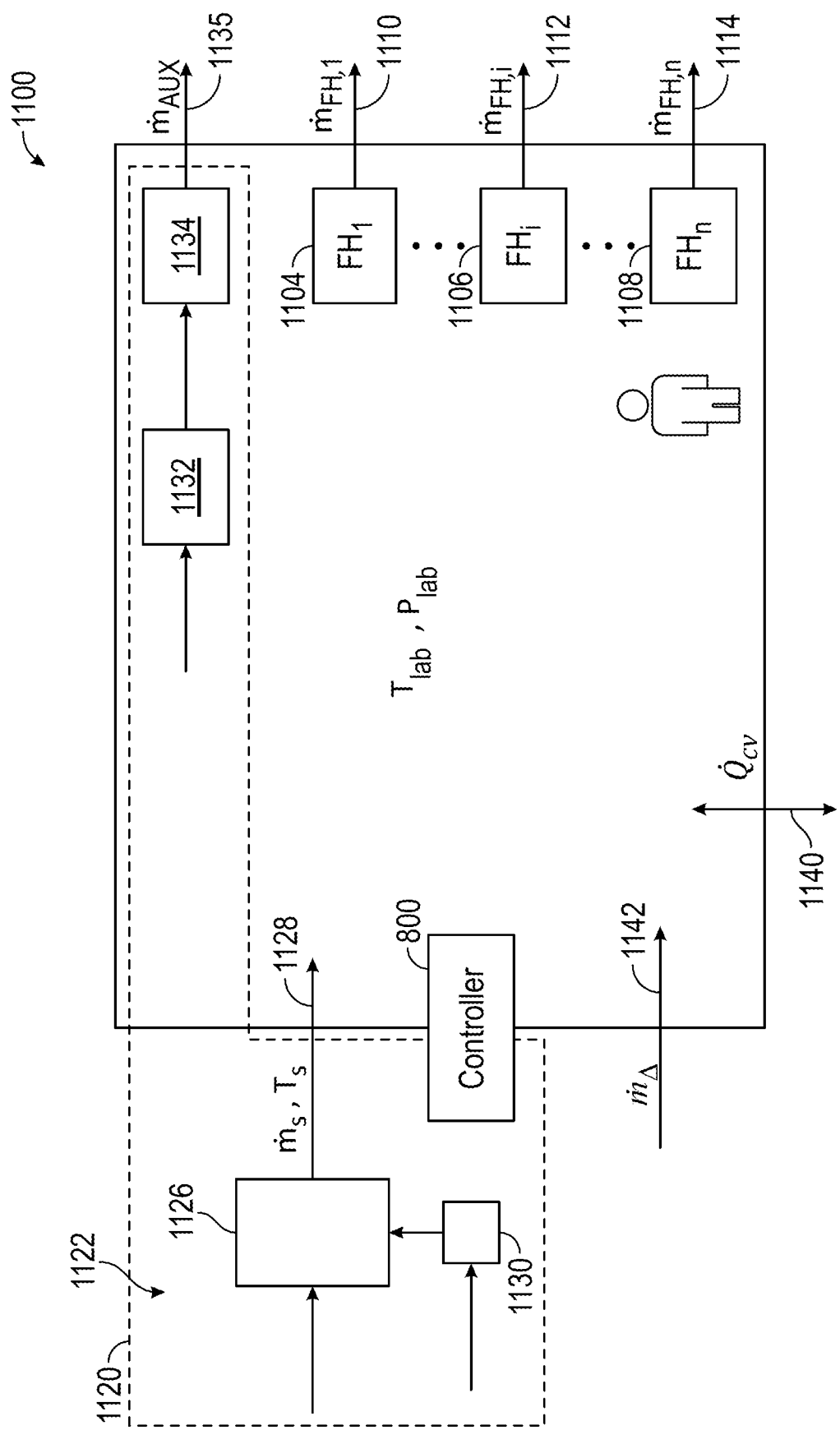
FIG. 11 is a block diagram of a system including the controller of FIG. 8 and portion of the building of FIG. 1, according to some embodiments.

Referring now to FIG. 11, a system 1100 is shown, according to some embodiments. In some embodiments, system 1100 includes HVAC equipment 1120. HVAC equipment 1120 may be similar to or the same as the HVAC equipment described above. In some embodiments, HVAC equipment 1120 is configured to maintain one or more characteristics (e.g., temperature, pressure, humidity, etc.) of the space 1102. In some embodiments, the space 1102 is a laboratory. However, in other embodiments, the space 1102 may be any type of space (e.g., hallway, zone, floor, building, room, etc.). The HVAC equipment 1120 is shown to include a supply system, shown as supply air system 1122, an exhaust system, shown as exhaust air system 1124, and controller 800. In some embodiments, the supply air system 1122 is configured to supply a flow of energy to the space 1102, and the exhaust air system 1124 is configured to exhaust energy from the space 1102. As shown in FIG. 11, the supply air system 1122 includes a heating device, shown as reheat coil 1126, and a flow control device, shown as control valve 1130. The control valve 1130 may be configured to control the flow of energy (e.g., a flow of heated fluid) into the reheat coil 1126 and thereby control the amount of energy introduced into a flow of fluid proximate the reheat coil 1126. For example, the control valve 1130 may be configured to control the flow of heated fluid into the reheat coil 1126 to thereby control the amount of energy introduced into an airflow directed into the space 1102.

As shown in FIG. 11, the supply air system 1122 is configured to generate flow 1128, characterized by, for example, a mass flow rate, denoted $\dot{m}_s$, at a temperature, denoted $T_s$. In some embodiments, the supply air system 1122 is or includes a constant air volume (CAV) system or a variable air volume (VAV) system. For example, the mass flow rate, $\dot{m}_s$, may be variable (e.g., by varying the density, humidity, composition, volumetric flow rate, etc. of the flow 1128) while the temperature, $T_s$, is controlled to a setpoint value. In other embodiments, the mass flow rate, $\dot{m}_s$, is controlled to a constant value, while the temperature, $T_s$, is varied (e.g., by manipulating the control valve 1130.). In such embodiments, the energy associated with flow 1128 is varied by selectively enabling the flow 1128 (e.g., by generating the constant $\dot{m}_s$) and by varying the temperature of the fluid (e.g., by adjusting the control valve 1130).

In some embodiments, the exhaust air system 1124 is configured to facilitate flow 1135, characterized by, for example, a mass flow rate, denoted $\dot{m}_{AUX}$. As shown, the exhaust air system 1124 includes an exhaust air intake 1132, and a flow control device (e.g., valve, venturi valve, damper, etc.), shown as damper 1134. The exhaust air intake 1132 may be or include a flow inducing device (e.g., a fan, a blower, etc.) in a conduit fluidly connected with the damper 1134. The exhaust air intake 1132 may be configured to selectively generate a flow of air through damper 1134. Damper 1134 may be configured to regulate a characteristic (e.g., flow rate) of fluid exiting the space 1102 through the exhaust air system 1124. For example, the controller 800 may generate command signals for the exhaust air system 1124 to achieve and maintain a flow rate setpoint (e.g., a setpoint value for $\dot{m}_{AUX}$). The damper 1134 and/or the exhaust air intake 1132 may be configured to receive command signals from the controller 800 and/or apply the command signals to achieve a setpoint from the controller 800. For example, the controller 800 may determine a volumetric flow rate setpoint, a mass flow rate setpoint, a valve position, a valve setting, a fan duty cycle, etc., to cause the damper 1134 and/or the exhaust air intake 1132 to achieve the mass flow rate setpoint.

Still referring to FIG. 11, the system 1100 includes a flow 1140, characterized by, for example, a heat flow rate, denoted $\dot{Q}_{CV}$. The heat flow rate, $\dot{Q}_{CV}$, may represent the heat transfer rate across the boundary of the space 1102 (e.g., the walls, surfaces, floor, ceiling, tangible boundaries, intangible boundaries, exterior surfaces of occupants, etc.) the inside of which may be defined to have a constant volume. The heat flow rate, $\dot{Q}_{CV}$, includes heat exchanged with the outdoors, adjacent spaces, and convention from occupants, electronic devices, and other items located within the space. In some embodiments, the flow 1140 is the disturbance heat flow and may be the same as or similar to $\dot{Q}_{other}$, described above. In most cases, the time rate of change of $\dot{Q}_{CV}$ is typically small because the heat gains or losses are often primarily driven by diurnal variations in factors such as outdoor air temperature, solar intensity, and occupancy.

Additionally, the space 1102 may be continuously controlled to approximately a constant temperature setpoint, in which case the rate of heat exchanged with objects proximate or disposed within the space 1102 is often small and is therefore usually relatively insignificant from a TP building control perspective. Although the time rate of change of $\dot{Q}_{CV}$ is typically small, in some embodiments, the controller 800 is configured to determine an estimated value of $\dot{Q}_{CV}$ which can be applied in a feedforward or feedback approach to accommodate the disturbance caused by $\dot{Q}_{CV}$.

In some embodiments, the system 1100 includes a flow 1142, characterized by, for example, a mass flow rate, denoted $\dot{m}_\Delta$. The mass flow rate, $\dot{m}_\Delta$, may represent a flow of mass into or out of the space 1102. For example, $\dot{m}_\Delta$, may be a mass flow rate induced by a pressure differential between the interior of the space 1102 and the exterior of the space 1102. For example, the controller 800 and HVAC equipment 1120 may be configured to maintain a static pressure within the space 1102 by regulating the rate of mass entering the space 1102 (e.g., $\dot{m}_s$) and the rate of mass exiting the space 1102 (e.g., $\dot{m}_{AUX}$, $\dot{m}_{FH,1}$, $\dot{m}_{FH,i}$, $\dot{m}_{FH,n}$). The static pressure within the space 1102 may be different than that of an ambient environment (e.g., an adjacent space, the outdoors, etc.) which may induce or cause mass to be transported across the boundary of the space 1102. For example, the pressure difference may cause air to leak into or out of the space 1102 through a cracked window, through a doorway, though a wall, through a ceiling, through a floor, or other boundary of the space 1102. In some embodiments, a negative static pressure is used to prevent air from the space 1102 from leaking into a nearby environment (e.g., an adjacent space, an adjacent laboratory, a hallway, etc.).

In some embodiments, the controller 800 evaluates a mass balance of the space 1102 to make control decisions. The mass balance can take the form of the equation:

$$\dot{m}_s = \sum_{i=1}^{n} \dot{m}_{FH,i} + \dot{m}_{AUX} - \dot{m}_\Delta$$

where $\sum_{i=1}^{n} \dot{m}_{FH,i}$ is the sum of the mass flow rates of the fume hoods (e.g., fume hoods 1104, 1106, 1108) and $\dot{m}_s$, $\dot{m}_{AUX}$, and $\dot{m}_\Delta$, are as defined above. According to the mass balance above, if $\dot{m}_\Delta$ is greater than zero, the space 1102 may be negatively pressurized, and if $\dot{m}_\Delta$ is less than zero, the laboratory may be positively pressurized. In some embodiments, $\dot{m}_{AUX}$ is approximately equal to zero, $\dot{m}_s$ is large enough to sustain a cooling load for the space 1102, and supplemental heating from the reheat coil 1126 may be used to achieve a temperature setpoint. In some embodiments, when $\sum_{i=1}^{n} \dot{m}_{FH,i}$ is small and the cooling load is large (e.g., fume hoods 1104, 1106, 1108 are closed and $\dot{Q}_{CV}$ is large), the control valve 1130 may be fully closed and the mass flow rates $\dot{m}_s$ and $\dot{m}_{AUX}$ may be increased to provide a required energy flow to satisfy the cooling load of the space 1102.

In some embodiments, the controller 800 evaluates an energy balance of the space 1102. The energy balance can take the form of the equation:

$$\frac{\dot{Q}_{CV}}{\rho_{air} c_{p,air}} + \dot{V}_s T_s + \dot{V}_\Delta \bar{T}_{sur} - \sum_{i=1}^{n} \dot{V}_{FH,i} T_{lab} - \dot{V}_{AUX} T_{lab} = V_{lab} \frac{dT_{lab}}{dt}$$

where $c_{p,air}$ is the specific heat of air, $\rho_{air}$, is the air density, $T_s$ is the supply air temperature, $T_{lab}$ is the laboratory temperature, $\bar{T}_{sur}$ is the average air temperature of the space(s) surrounding the space 1102 (for $\dot{m}_\Delta > 0$), $V_{lab}$ is the volume of the air enclosed within the laboratory and $\dot{V}_s$, $\dot{V}_\Delta$, $\dot{V}_{FH,i}$, $\dot{V}_{AUX}$, are the volumetric flow rates of: the flow 1125 (e.g., supply air), flow 1142 (e.g., differential air), the flows 1110, 1112, 1114 (e.g., fume hood air), and flow 1134 (e.g., exhaust air), respectively. A person having ordinary skill in the art will appreciate that the energy balance above relies on a number of simplifications (e.g., generalizations, assumptions, etc.) about the thermodynamic environment of the space 1102. For example, the energy balance above assumes a lumped parameter system with a constant air density, $\rho_{air}$, constant specific heats, $c_{p,air}$, and adequacy of a first order model (e.g., that the solid objects have a very high thermal capacitance such that the flow(s) associated with the stored energy of the objects within the space 1102 is negligible). Accordingly, other terms and representations of the flows of the system 1100 may be used to express the energy balance of the space 1102. For example, a mass flow rate may be related to a volumetric flowrate, each of which can be used to represent the energy balance of the space 1102.

In some embodiments, at least a portion of the energy balance utilized by the controller 800 is expressed using known variables (e.g., a specific heat of air, a gas constant, a gravitational constant, etc.), and variables representing measurable or measured characteristics of the system 1100 (e.g., a temperature, a pressure, a volumetric flow rate, an actuator position, an actuator setpoint, etc.). For example, in the energy balance shown, the volumetric flow rates, $\dot{V}_s$, $\dot{V}_\Delta$, $\dot{V}_{FH,i}$, $\dot{V}_{AUX}$ and temperature values, $T_s$, $\bar{T}_{sur}$, $T_{lab}$ may be measurable values associated with one or more sensors (e.g., a flow sensor, temperature sensor, sensors 608, etc.) of the system 1100.

In some embodiments, the space 1102 may be controlled within a close tolerance to the setpoint which allows the non-steady terms in the energy balance equation above to be dropped. Combining the mass balance and the energy balance under the steady assumption yields:

$$\rho_{air} c_{p,air} \dot{V}_s (\tilde{T}_{lab} - T_s) = \dot{Q}_{CV} + \rho_{air} c_{p,air} \dot{V}_\Delta (T_{sur} - \tilde{T}_{lab})$$

where $\tilde{T}_{lab}$ is the laboratory setpoint temperature, and the other variables are as defined above. The terms on the right hand side of the equation are the external forcing functions which determine how much energy is advected into the space 1102 to maintain the temperature setpoint, according to some embodiments. In some embodiments, the energy balance above can be rewritten as:

$$\dot{Q}_{adv} = \dot{Q}_{CV} + \dot{m}_\Delta c_{p,air} (T_{sur} - \tilde{T}_{lab})$$

where $\dot{Q}_{adv}$, is the advected energy. According to some embodiments, the forcing functions which dictate the value of $\dot{Q}_{adv}$ are not a function of the volumetric flow rate of the supply air, $\dot{V}_s$. Accordingly, if $\dot{Q}_{adv}$ is available (e.g., known, estimated, etc.), it may be used by the controller 800 to determine a supply air temperature, according to the equation:

$$\tilde{T}_s = \tilde{T}_{lab} - \left(\frac{\dot{Q}_{adv}}{\rho_{air} c_{p,air} \dot{V}_s}\right)$$

where $\tilde{T}_s$ is the supply air temperature setpoint, according to some embodiments. According to the equation above, if the supply air temperature setpoint, $\tilde{T}_s$, is adjusted at the onset of a volumetric flow rate disturbance (e.g., due to the operation or opening of a fume hood 1104, 1106, 1108, a door opening, etc.), the disturbance will be rejected.

In some embodiments, the exhaust air system 1124 is operated to satisfy a cooling load when the supply air temperature is controlled to a minimum value (e.g., when the control valve 1130 for the reheat coil 1126 is closed). The volumetric flow rate of the flow 1134 that corresponds to maintaining thermodynamic equilibrium can take the form of the equation:

$$\dot{V}_{AUX} = \max\left\{0, \frac{\dot{Q}_{adv}}{\rho_{air}c_{p,air}(\tilde{T}_{lab} - T_s^*)} - \left(\sum_{i=1}^{n} \dot{V}_{FH,i} - \dot{V}_\Delta\right)\right\}$$

where $T_s^*$, is the minimum temperature of the supply air. For example, $T_s^*$, may correspond to the air supply temperature, $T_s$, when the control valve 1130 is closed, according to some embodiments. In some embodiments, the controller 800 is configured to increase the flow rate of the supply air, $\dot{V}_s$, a same or similar amount as $\dot{V}_{AUX}$, to simultaneously drive the laboratory temperature, $T_{lab}$, and laboratory pressure, $P_{lab}$, toward the laboratory temperature setpoint, $\tilde{T}_{lab}$, and pressure setpoint, $\tilde{P}_{lab}$.

Traditional control systems for TP environments often use independent control strategies to maintain the temperature, static pressure, and other characteristics (e.g., fume hood face velocity, etc.) at pre-established setpoints. Often, the control strategies use feedback control to control temperature to a pre-established temperature setpoint (e.g., $\tilde{T}_{lab}$). However, processes with large time constants (e.g., in laboratory) and large and/or frequent disturbances (e.g., fume hood disturbance, a supply air disturbance, etc.), the process may operate continually in a transient state and may not attain the steady state setpoint, and/or may fail to achieve the setpoint in a suitable amount of time. Further, disturbances which may be predictable, measurable, or otherwise known (e.g., a controlled change in a supply air flow rate), are not predictively compensated for using traditional control strategies. Instead of using isolated control strategies for controlling temperature and pressure, the systems and methods described herein utilize an integrated temperature and pressure control strategy based on a combination of feedback and feedforward control techniques. Advantageously, the systems and methods described herein compensate for predictable disturbances in the system (e.g., flow rates associated with fume hood operation, changes in supply air flow rates, etc.) and may reduce the time required for the system to enter into or remain within a predefined error band. The systems and methods described herein may improve the responsiveness, accuracy, and efficiency of control systems, and may improve the adaptability of temperature and pressure controllers for deployment in a wide range of TP environments and applications.

Figure 12:
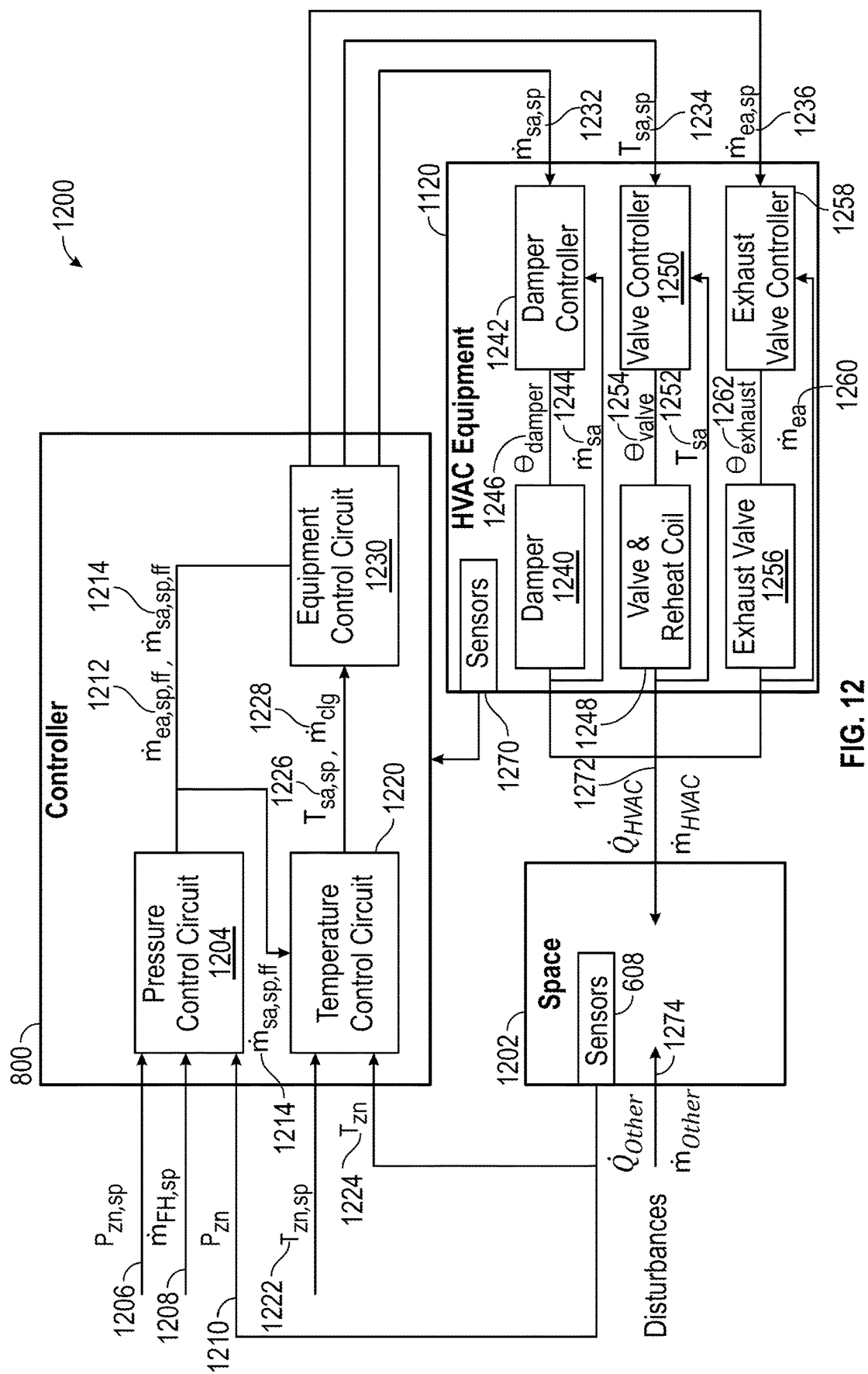
FIG. 12 is a block diagram of a system including the controller of FIG. 8 and portion of the building of FIG. 1, according to some embodiments.

As shown in FIG. 12, system 1200 is shown, according to some embodiments. System 1200 may include some or all of the elements of system 1100. The system 1200 includes the controller 800, the HVAC equipment 1120, and a space 1202. The space 1202 may have some or all of the functionality and components of space 1102.

In some embodiments, the controller 800 includes a pressure control circuit 1204 configured to receive one or more input signals and provide one or more output signals. The pressure control circuit 1204 may receive, retrieve, and/or determine a zone pressure setpoint 1206, denoted $P_{zone,sp}$, a flow rate setpoint of a disturbance source (e.g., a disturbance source such as a fume hood 1104) shown as fume hood mass flow rate setpoint 1208, denoted $\dot{m}_{FH,sp}$, and a pressure value, shown as zone pressure 1210 of the space 1202, denoted $P_{zn}$. The pressure control circuit 1204 may use the zone pressure setpoint 1206, the fume hood mass flow rate setpoint 1208, and/or the zone pressure 1210 to determine one or more setpoint values for the HVAC equipment 1120. As shown, the pressure control circuit 1204 is configured to determine a flow rate setpoint, shown as exhaust air mass flow rate setpoint 1212, denoted $\dot{m}_{ea,sp,ff}$, and a second flow rate setpoint, shown as supply air mass flow rate setpoint 1214, denoted $\dot{m}_{sa,sp,ff}$. In some embodiments, the pressure control circuit 1204 utilizes a feedforward control process to determine the one or more output values. In other embodiments, the pressure control circuit 1204 may utilize other control processes (e.g., feedback control, etc.) to determine the one or more output values. In some embodiments, the pressure control circuit 1204 is configured to supply one or more output values (e.g., the supply air mass flow rate setpoint 1214) to a temperature control circuit 1220. The pressure control circuit 1204 may be implemented in the controller 800 as a portion of the memory 812 (e.g., as part of the TP manager 818), or may be or include a separate processing circuit (e.g., a memory and processor) communicably connected to the processing circuit 808.

In some embodiments, the controller 800 includes a temperature control circuit 1220. The temperature control circuit 1220 may receive, retrieve, and/or determine a zone temperature setpoint 1222, denoted $T_{zn,sp}$, a temperature value 1224, denoted $T_{zn}$, and/or the supply air mass flow rate setpoint 1214. The temperature control circuit 1220 may utilize the zone temperature setpoint 1222, the temperature value 1224, and/or the supply air mass flow rate setpoint 1214 to determine one or more setpoint values for the HVAC equipment 1120. As shown, the temperature control circuit 1220 is configured to determine a supply air temperature setpoint 1226, denoted $T_{sa,sp}$, and a cooling load mass flow rate 1228, denoted $\dot{m}_{clg}$. In some embodiments, the temperature control circuit 1220 utilizes a feedback control process to determine the one or more output values. For example, the temperature control circuit 1220 may utilize the zone temperature 1224 signal to adjust the supply air temperature setpoint 1226 and/or the cooling load mass flow rate 1228. In other embodiments, the temperature control circuit 1220 may utilize other control processes (e.g., feedforward control, etc.) to determine the one or more output values. The temperature control circuit 1220 may be implemented in the controller 800 as a portion of the memory 812 (e.g., as part of the TP manager 818), or may be or include a separate processing circuit (e.g., a memory and processor) communicably connected to the processing circuit 808.

In some embodiments, the controller 800 includes an equipment control circuit 1230. The equipment control circuit 1230 may receive one or more signals from the pressure control circuit 1204, and one or more signals from the temperature control circuit 1220. As shown, the equipment control circuit 1230 receives and uses the supply air temperature setpoint 1226, the cooling load mass flow rate 1228, the exhaust air mass flow rate setpoint 1212, and the supply air mass flow rate setpoint 1214 to determine one or more control values (e.g., control signals) for the HVAC equipment 1120. In some embodiments, the equipment control circuit 1230 is configured to determine a supply air mass flow rate setpoint 1232, denoted $\dot{m}_{sa,sp}$, a supply air temperature setpoint 1234, denoted $T_{sa,sp}$, and an exhaust air mass flow rate setpoint 1236. The equipment control circuit 1230 may be configured to output any combination of setpoint values (e.g., temperature setpoint, pressure setpoint, humidity setpoint, position setpoint, fan speed setpoint, pump speed setpoint, window position setpoint, window shade position setpoint, fume hood sash position lock setpoint, etc.) for controlling equipment (e.g., HVAC equipment 1120) based on the one or more input values. In some embodiments, the equipment control circuit 1230 is configured to determine the configuration and control architecture(s) of connected equipment (e.g., the HVAC equipment 1120) and manipulate one or more setpoint values that correspond to the particular configuration of the HVAC equipment 1120. For example, the equipment control circuit 1230 may determine that HVAC equipment 1120 is configured to receive a mass flow rate setpoint (e.g., kg/s) instead of a valve position setpoint (e.g., 5 degrees open, etc.) and adjust the received or determined setpoint value(s) (e.g., supply air mass flow rate setpoint 1214) to correspond to the configuration of the HVAC equipment 1120. The equipment control circuit 1230 may be implemented in the controller 800 as a portion of the memory 812 (e.g., as part of the TP manager 818), or may be or include a separate processing circuit (e.g., a memory and processor) communicably connected to the processing circuit 808.

In some embodiments, the HVAC equipment 1120 includes a flow control device (e.g., valve, fan, diverter, gate, vent, etc.), shown as damper 1240, controlled by a control system, shown as damper controller 1242. The damper may include some or all of the functionality and components of the damper 1134. The damper controller 1242 may receive a setpoint value from the equipment control circuit 1230. In some embodiments, the damper controller 1242 receives the supply air mass flow rate setpoint 1232 and obtains a measured and/or determined value of the output from the damper 1240, shown as supply air mass flow rate 1244, denoted $\dot{m}_{sa}$. The damper controller 1242 may compare the supply air mass flow rate setpoint 1232 and supply air mass flow rate 1244 to determine or control a position of the damper 1240, shown as damper position setpoint 1246, denoted $\theta_{damper}$.

In some embodiments, the HVAC equipment 1120 includes a flow control device (e.g., valve, pump, diverter, gate, vent, etc.), shown as valve and reheat coil 1248, controlled by a control system, shown as valve controller 1250. The valve and reheat coil 1248 may include some or all of the functionality of the valve 1130 and reheat coil 1126. The valve controller 1250 may receive a setpoint value from the equipment control circuit 1230. In some embodiments, the valve controller 1250 receives the supply air temperature setpoint 1234 and obtains a measured and/or determined value of the output from the valve and reheat coil 1248, shown as supply air temperature 1252, denoted $T_{sa}$. The valve controller 1250 may compare the supply air temperature setpoint 1234 to the supply air temperature 1252 to determine or control a position of the valve and reheat coil 1248, shown as valve position setpoint 1254, denoted $\theta_{valve}$.

In some embodiments, the HVAC equipment 1120 includes a flow control device (e.g., valve, pump, diverter, gate, vent, etc.), shown as exhaust valve 1256, controlled by a control system, shown as exhaust valve controller 1258.

The exhaust valve controller 1258 may receive a setpoint value from the equipment control circuit 1230. In some embodiments, the exhaust valve controller 1258 receives the exhaust air mass flow rate setpoint 1236 and obtains a measured and/or determined value of the output from the exhaust valve 1256, shown exhaust air mass flow rate 1260, denoted $\dot{m}_{ea}$. The exhaust valve controller 1258 may compare the exhaust air mass flow rate setpoint 1236 to the exhaust air mass flow rate 1260 to determine or control a position of the exhaust valve 1256, shown as exhaust valve position setpoint 1262, denoted $\theta_{exhaust}$.

In some embodiments, the HVAC equipment 1120 supplies a flow 1272, characterized by an energy flow rate, denoted $\dot{E}_{HVAC}$, to the space 1202. As shown, the flow 1272 is indicated as flowing into the space 1202 across the boundary, however, in operation, the direction and magnitude of flow 1272 may be controlled depending on other flows across the boundary of the space 1202, shown as other flow 1274, characterized by an energy flow rate, denoted $\dot{E}_{Other}$.

The damper 1240, damper controller 1242, valve and reheat coil 1248 and valve controller 1250 may be or include the supply air system 1122 shown in FIG. 11. For example, the damper 1240, damper controller 1242, valve and reheat coil 1248, and/or valve controller 1250 may provide the flow 1128 characterized by $\dot{m}_s$ and $T_s$ described above. The exhaust valve 1256 and exhaust valve controller 1258 may be or include the exhaust air system 1124 shown in FIG. 11. For example, the exhaust valve 1256 and exhaust valve controller 1258 may provide the flow 1134 characterized by $\dot{m}_{AUX}$ described above. The controller 800 may control the HVAC equipment 1120 to adjust the flow 1128 and flow 1134 which yields flow 1272.

In some embodiments, each or any of the damper controller 1242, valve controller 1250, and exhaust valve controller 1258, may be integrated into the controller 800. For example, the damper controller 1242 may be a module of the equipment control circuit 1230, and the damper may provide the supply air mass flow rate 1244 to the equipment control circuit 1230. In other embodiments, the damper controller 1242, valve controller 1250, and exhaust valve controller 1258 are supplied by a manufacturer of the HVAC equipment 1120 (e.g., a manufacturer of the damper 1240). The controller 800 may be configured to communicably connect with and control some or all of the available HVAC equipment 1120, or other building equipment or building subsystems (e.g., lighting, security systems, etc.). It is important to note that although only one damper 1240, one valve and reheat coil 1248, and one exhaust valve 1256 are shown, each of the damper 1240, valve and reheat coil 1248, and exhaust valve 1256 may be or include a system of flow control devices (e.g., air conduits, dampers, blowers, etc.) that are configured to influence a flow (e.g., flow 1128, flow 1134, etc.). For example, the exhaust valve 1256 may include two exhaust valves that are independently positionable, and each valve may control a respective exhaust air mass flow rate, and may be controlled by a shared exhaust valve controller 1258. Continuing this example, the exhaust valve controller 1258 may be configured to receive respective measured exhaust air mass flow rates, and provide the exhaust valve position setpoint 1262 addressed to each respective exhaust valve.

Although the flow 1272 is shown as being characterized by a general energy flow, $\dot{E}_{HVAC}$, a person having ordinary skill in the art will appreciate that the flow 1272, $\dot{E}_{HVAC}$, is representative of the net energy flow across the boundary of the space 1202 attributed to the HVAC equipment 1120. For example, $\dot{E}_{HVAC}$ may be the difference between heat (e.g., thermal energy) entering the space 1202, (e.g., $\dot{Q}_{in}$, flow 1128) and heat exiting the space 1202 (e.g., $\dot{Q}_{out}$, flow 1134) attributed to the HVAC equipment 1120. Similarly, flow 1274, $\dot{E}_{other}$, is representative of the net energy flow across the boundary of the space 1202 attributed to factors external to the HVAC equipment 1120. For example, $\dot{E}_{other}$ may be or include $\dot{Q}_{other}$ (e.g., energy flows associated with people, lighting, computers, electronic equipment, etc. within the space 1202) as shown in FIG. 10. In some embodiments, $\dot{E}_{other}$ may be the net energy flow attributed to flow 1140 (e.g., $\dot{Q}_{CV}$), flow 1142 (e.g., $\dot{m}_A$), flow 1110 (e.g., $\dot{m}_{FH,1}$), flow 1112 (e.g., $\dot{m}_{FH,2}$), and/or flow 1114 (e.g., $\dot{m}_{FH,n}$) described above. Assuming that the Law of Conservation of Mass is held within the space 1202, flow 1272 and flow 1274 are related according to the equation:

$$\dot{E}_{HVAC} - \dot{E}_{other} = \dot{E}_{space}$$

where $\dot{E}_{space}$ represents the time rate of change of the energy of the space 1202. As utilized herein, variables with an over-dot indicate a time derivative of the variable (Newton's notation). Under the assumptions described with respect to FIG. 11, the energy balance above can be rewritten as:

$$\frac{\dot{Q}_{CV}}{\rho_{air} c_{p,air}} + \dot{V}_s T_s + \dot{V}_\Delta T_{sur} - \sum_{i=1}^{n} \dot{V}_{FH,i} T_{lab} - \dot{V}_{AUX} T_{lab} = V_{lab} \frac{dT_{lab}}{dt}$$

where all variables are as defined previously.

As shown in FIG. 12, the HVAC equipment 1120 may include sensors 1270 which may be similar to or the same as sensors 608. The sensors 1270 may include flow rate sensors, temperature sensors, position sensors, pressure sensors, humidity sensors, and other suitable sensors for monitoring and determining a state of the HVAC equipment 1120. The sensors 1270 may detect and/or determine the supply air mass flow rate 1244, the supply air temperature 1252, the exhaust air mass flow rate 1260, and other values for determining a state of the HVAC equipment 1120. In some embodiments, the sensors 1270 may transmit data to the controller 800 which may be used for fault detection and diagnostics, predictive modeling, feedback control, feedforward control, cost estimation techniques, efficiency calculations, and other available control functions of the controller 800.

In some embodiments, the space 1202 includes sensors 608. Sensors 608 may detect characteristics of the space 1202, such as the zone temperature 1224 and the zone pressure 1210 which can be utilized by the controller 800 to make control decisions (e.g., determine a setpoint, determine a setpoint change, etc.). In some embodiments, the sensors 608 include a user interface (e.g., a touch-screen, button, control panel, dial, thermostat, camera, microphone, etc.) configured to receive a user input regarding a setpoint for one or more of the zone pressure setpoint 1206, the zone temperature setpoint 1222, and the fume hood mass flow rate setpoint 1208. In such embodiments, the sensors 608 may communicate the zone pressure setpoint 1206, the zone temperature setpoint 1222, and/or the fume hood mass flow rate setpoint 1208 directly to the controller 800. In some embodiments, the zone pressure setpoint 1206, the zone temperature setpoint 1222, and/or the fume hood mass flow rate setpoint 1208 are provided by a building administrator, governmental agency, regulatory authority, policy maker, etc., and may be set according to a set of rules (e.g., within a threshold value, according to a dynamic control algorithm, etc.). In some embodiments, the zone pressure setpoint 1206, the zone temperature setpoint 1222, and the fume hood mass flow rate setpoint 1208 are provided based on a setpoint trajectory dictated by a cloud-based building control service or algorithm.

Figure 13:
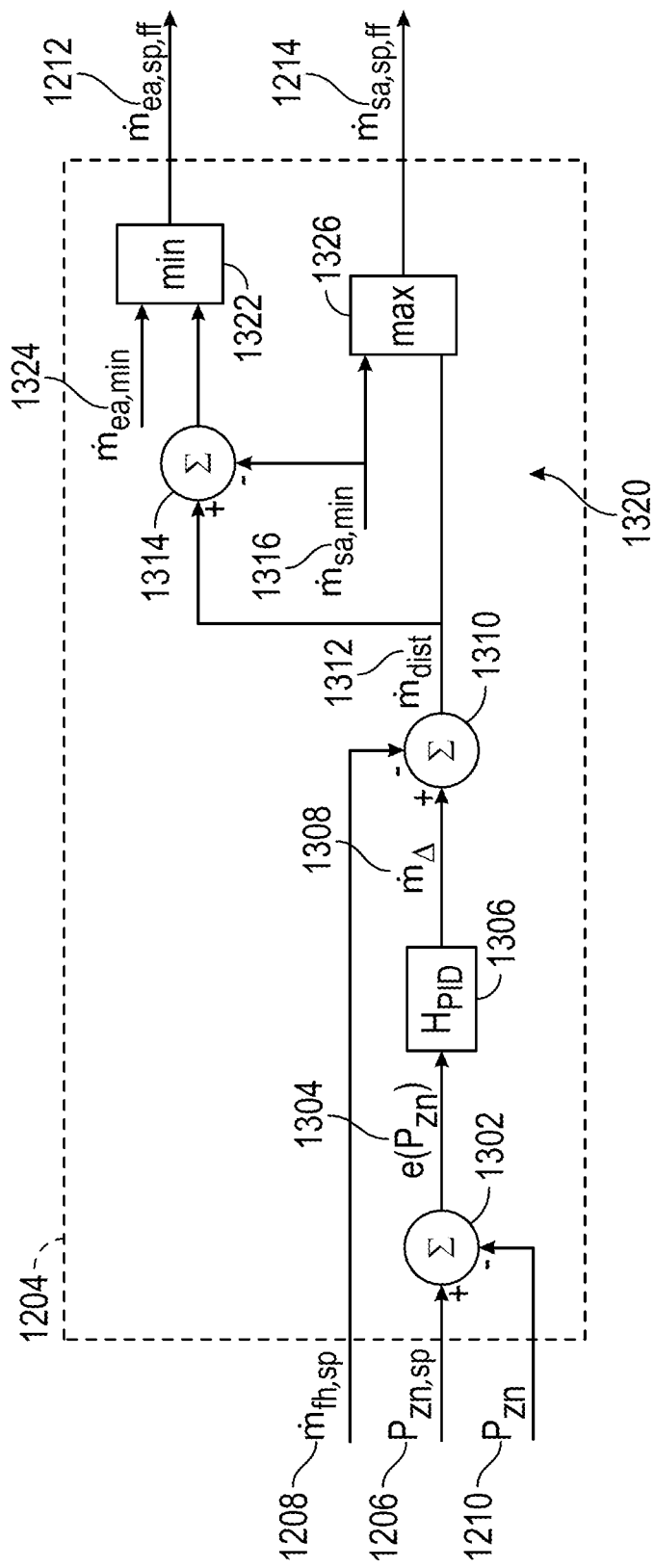
FIG. 13 is a block diagram of a portion of the controller of FIG. 8, according to some embodiments.

Referring now to FIG. 13, the pressure control circuit 1204 is shown in greater detail, according to some embodiments. The pressure control circuit 1204 may include a comparator, shown as error estimator 1302, configured to compare a first signal and a second signal to yield a signal representing a comparison between the first signal and the second signal. For example, the error estimator 1302 may calculate the difference between the zone pressure signal 1210 and the zone pressure setpoint 1206 to yield an error signal, shown as pressure error 1304, denoted $e(P_{zn})$. In some embodiments, the pressure error 1304 is provided to a controller, shown as pressure error controller 1306. The pressure error controller 1306 may use the pressure error 1304 to determine a control variable, shown as pressure error mass flow rate signal 1308, denoted $\dot{m}_\Delta$. The controller 1306 may be or include a proportional integral derivative (PID) controller. For example, the pressure error controller 1306 may receive the pressure error 1304 as a function of time (or in the Laplace domain) and generate a control signal (e.g., control variable, etc.) having the same or different units (e.g., a mass flow rate) according to the equation:

$$\dot{m}_\Delta = K_p * e(P_{zn}) + K_i \int e(P_{zn}) dt + K_d \frac{de(P_{zn})}{dt}$$

where $K_p$ is the proportional gain, $K_i$ is the integral gain, $K_d$ is the derivative gain, and t is time. As shown, $\dot{m}_\Delta$ and $e(P_{zn})$ are functions evaluable with respect to time, t. The values of the gains, $K_p$, $K_i$, $K_d$, can be adjusted and tuned to achieve a desired response of the pressure error controller 1306. For example, the gains can be adjusted to affect rise time, settling time, overshoot, and steady state error, as is known in conventional control theory. Although a particular controller (e.g., PID) is described, it is contemplated that the pressure error controller 1306 may have other control structure, such as proportional (P) control, integral (I) control, derivative (D) control, proportional integral (PI) control, proportional derivative (PD) control, integral derivative (ID) control, etc., for determining the control variable $\dot{m}_\Delta$. Controller 1306 may include a conversion module for converting the pressure error 1304 (e.g., 0.02 inches water) into a mass flow rate (e.g., kg/s). For example, the controller 1306 may use parameters of the air in the space 1202 to determine an estimated mass flow rate (e.g., leak rate), which may be an estimation of the flow 1142, according to some embodiments. In some embodiments, the pressure error controller 1306 functions within a closed loop formed by the zone pressure 1210 as the feedback signal.

In some embodiments, the pressure control circuit 1204 includes a comparator, shown as pressure disturbance estimator 1310, configured to compare a first signal and a second signal and yield a signal representing a comparison between the first signal and the second signal. For example the pressure disturbance estimator 1310 may function similarly or the same as the error estimator 1302. The disturbance estimator 1310 may calculate the difference between the pressure error mass flow rate signal 1308 and the fume hood mass flow rate setpoint 1208 to yield an output signal, shown as disturbance mass flow rate 1312, denoted $\dot{m}_{dist}$. In some embodiments, the disturbance mass flow rate 1312 is provided to a comparator, shown as exhaust air estimator 1314, configured to compare the disturbance mass flow rate 1312 to a lower limit value of the supply air mass flow rate $\dot{m}_{sa}$, shown as supply air mass flow rate limit 1316, denoted $\dot{m}_{sa,min}$, and yield a output signal representing the difference between the disturbance mass flow rate 1312 and the supply air mass flow rate limit 1316, shown as exhaust air mass flow rate 1318.

In some embodiments, the disturbance mass flow rate 1312 and the exhaust air mass flow rate 1318 are sent to a compliance manager, shown as operational compliance manager 1320. The operational compliance manager 1320 may include a comparator, shown as exhaust air compliance manager 1322 which compares the exhaust air mass flow rate 1318 to a limit of the exhaust air mass flow rate (e.g., a minimum mass flow rate based on the configuration of the exhaust air system 1124), shown as exhaust air mass flow rate limit 1324, denoted $\dot{m}_{ea,min}$. The exhaust air compliance manager 1322 may output the lowest (e.g., minimum) value of the input values (e.g., exhaust air mass flow rate limit 1324 and the exhaust air mass flow rate 1318) to the equipment control circuit 1230. Advantageously, the operational compliance manager 1320 causes the pressure control circuit 1204 to output an exhaust air mass flow rate setpoint 1212 that is within the operational range of the exhaust air system 1124.

The operational compliance manager 1320 may include a comparator, shown as supply air compliance manager 1326 which compares the disturbance mass flow rate 1312 to the supply air mass flow rate limit 1316. The exhaust air compliance manager 1322 may output the highest (e.g., maximum) value of the input values (e.g., disturbance mass flow rate 1312 and the supply air mass flow rate limit 1316) to the equipment control circuit 1230. Advantageously, the supply air compliance manager 1326 causes the pressure control circuit 1204 to output a supply air mass flow rate setpoint 1214 that is within the operational range of the supply air system 1122.

Figure 14:
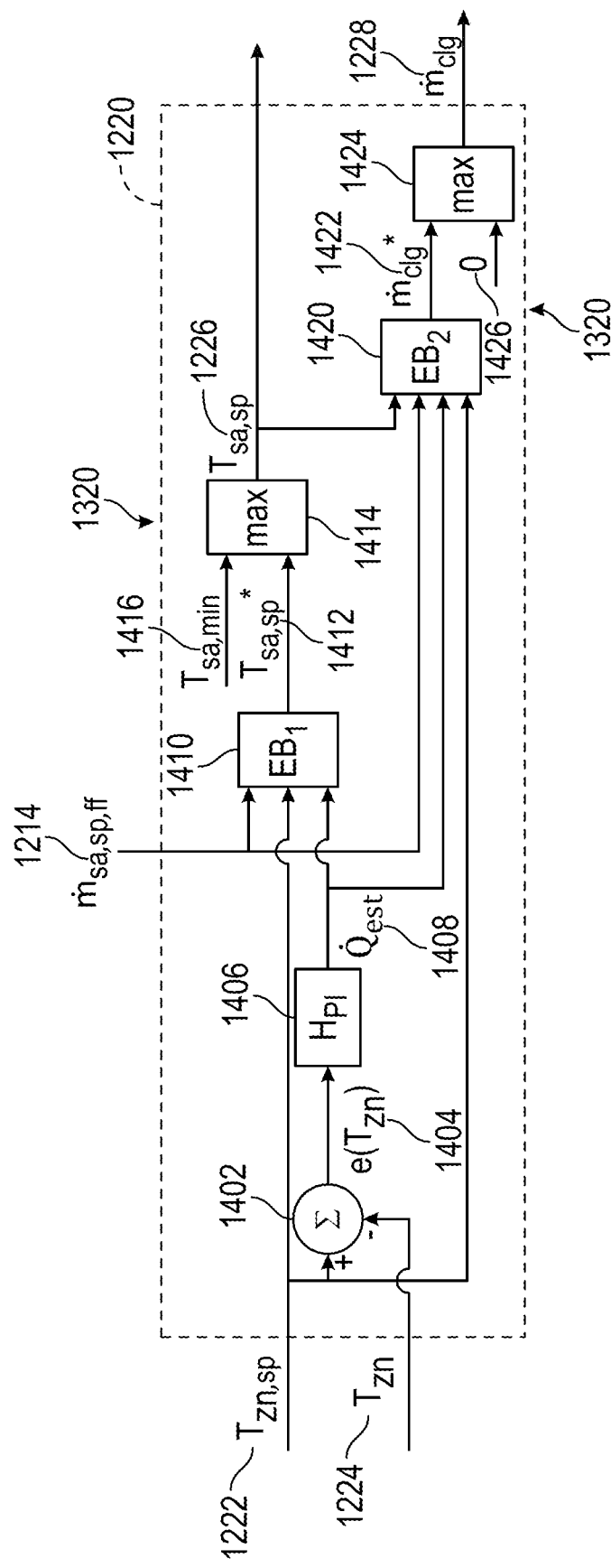
FIG. 14 is a block diagram of a portion of the controller of FIG. 8, according to some embodiments.

Referring now to FIG. 14, the temperature control circuit 1220 is shown in greater detail, according to some embodiments. The temperature control circuit 1220 may include a comparator, shown as temperature error estimator 1402, configured to compare a first signal and a second signal and yield a signal representing a comparison between the first signal and the second signal. For example, the temperature error estimator 1402 may calculate the difference between the zone temperature setpoint 1222 and the zone temperature setpoint 1222 to yield an error signal, shown as temperature error 1404, denoted $e(T_{zn})$. In some embodiments, the temperature error 1404 is provided to a controller, shown as temperature error controller 1406. The temperature error controller 1406 may use the temperature error 1404 to determine a control variable, shown as temperature error heat flow rate 1408, denoted $\dot{Q}_{est}$. The temperature error controller 1406 may use a proportional integral derivative (PI) controller. For example, the pressure error controller 1306 may receive the pressure error 1304 as a function of time (or in the Laplace domain) and generate a control signal (e.g., control variable, etc.) according to the equation:

$$\dot{Q}_{est}=K_p*e(T_{zn})+K_i\int e(T_{zn})dt$$

where $\dot{Q}_{est}$ is an estimated heat flow (e.g., an estimation of flow 1140, an estimation of $\dot{Q}_{adv}$) and the other variables are as defined previously. Advantageously, by determining the temperature error heat flow rate 1408, $\dot{Q}_{est}$, the temperature control circuit 1220 can compensate for the temperature error heat flow rate 1408 and adjust the HVAC equipment 1120 accordingly. The values of the gains, $K_p$, $K_i$ can be adjusted or tuned to achieve a desired response of the temperature error controller 1406. For example, the gains $K_p$, $K_i$ can be adjusted to affect rise time, settling time, overshoot, and steady state error, as is known in control theory. Although a particular controller (e.g., PI) is shown, it is contemplated that the pressure error controller 1306 may have other control structure (e.g., P, I, PID, etc.).

In some embodiments, the temperature error controller 1406 is tuned less aggressively than the pressure error controller 1306. For example, the gains, e.g., $K_p$, $K_i$ of the temperature error controller 1406 may be tuned to achieve a slower rise time, which may reduce the likelihood of overshooting the zone temperature setpoint 1222 and straining the HVAC equipment 1120. In other words, the pressure error controller 1306 may be relatively aggressive (e.g., have a large integral gain, $K_i$) to force the pressure control circuit 1204 to respond rapidly to rapid changes in the zone pressure 1210 (e.g., due to a fume hood being operated). By comparison, the temperature error controller 1406 may be configured to behave relatively slowly due to the comparatively slower temperature disturbances (e.g., due to the thermal capacitance of the space 1202), which may control the HVAC equipment 1120 to respond more efficiently (e.g., avoiding overshoot, slower heating/cooling demands, etc.). Advantageously, the pressure error controller 1306 is configured to quickly respond to rapid changes in the zone pressure 1210, and the temperature error controller 1406 is configured to efficiently respond to changes in the zone temperature $T_{zn}$, which can facilitate an improved efficiency and performance of a building control system of a building.

In some embodiments, the temperature control circuit 1220 includes an evaluator, shown as balance 1410, configured to apply one or more inputs to a set of rules representing a relationship between the inputs and provide one or more outputs based on the one or more inputs. For example, the balance 1410 may receive the supply air mass flow rate setpoint 1214, the zone temperature setpoint 1222, and the temperature error heat flow rate 1408 to determine an estimated supply air temperature setpoint 1412, denoted $T_{sa,sp}^*$. In some embodiments, the balance 1410 calculates the estimated supply air temperature setpoint 1412 according to the equation:

$$T_{sa,sp}^* = T_{zn,sp} - \left(\frac{\dot{Q}_{est}}{c_p \dot{m}_{sa,sp,ff}}\right)$$

where all variables are as defined previously. In some embodiments, the estimated supply air temperature setpoint 1412 is provided to the operational compliance manager 1320. The operational compliance manager 1320 may include a comparator, shown as supply air temperature compliance manager 1414, configured to compare the estimated supply air temperature setpoint 1412 and a threshold value of the supply air temperature (e.g., a lower limit of the configuration of the supply air system 1122, a predetermined lower limit, etc.), shown as supply air temperature limit 1416. The supply air temperature compliance manager 1414 may output the highest (e.g., maximum) value of the input values (e.g., the estimated supply air temperature set setpoint 1412 and the supply air temperature limit 1416) to the equipment control circuit 1230. Advantageously, the supply air temperature compliance manager 1414 causes the temperature control circuit 1220 to output a supply air temperature setpoint 1226 that is within the operational range of the supply air system 1122.

In some embodiments, the temperature control circuit includes an evaluator, shown as balance 1420, configured to apply one or more inputs to a set of rules representing a relationship between the inputs and provide one or more outputs based on the one or more inputs. For example, the balance 1420 may receive the zone temperature setpoint 1222, the temperature error heat flow rate 1408, and the supply air temperature setpoint 1226 to determine an estimated cooling load mass flow rate 1422, denoted $\dot{m}_{clg}^*$. In some embodiments, the balance 1420 calculates the estimated cooling load mass flow rate 1422 according to the equation:

$$\dot{m}_{clg}^* = \left( \frac{\dot{Q}_{est}}{c_p(T_{zn,sp} - T_{sa,sp})} \right) - \dot{m}_{sa,sp,ff}$$

where all variables are as defined previously. In some embodiments, the estimated cooling load mass flow rate 1422 is provided to the operational compliance manager 1320. The operational compliance manager 1320 may include a comparator, shown as cooling load compliance manager 1424, configured to compare the estimated cooling load mass flow rate 1422 and a threshold value of the HVAC equipment (e.g., a cooling limit of the configuration of the supply air system 1122, a predetermined lower limit, etc.), shown as minimum cooling load mass flow rate limit 1426. The cooling load compliance manager 1424 may output the highest (e.g., maximum) value of the input values (e.g., the estimated cooling load mass flow rate 1422 and the minimum cooling load mass flow rate limit 1426) to the equipment control circuit 1230. Advantageously, the cooling load compliance manager 1424 causes the temperature control circuit 1220 to output a cooling load mass flow rate 1228 that is within the operational range of the HVAC equipment 1120. In some embodiments, the minimum cooling load mass flow rate limit 1426 is zero. In other words, the cooling load compliance manager 1424 is configured to ensure that the cooling load mass flow rate 1228 is non-negative. In such embodiments, when the estimated supply air temperature setpoint 1412 is less than the supply air temperature limit 1416, the supply air temperature setpoint 1226 is set to the supply air temperature limit 1416, and the balance 1420 determines the estimated cooling load mass flow rate 1422 required at the supply air temperature setpoint 1226 to achieve the zone temperature setpoint 1222. In other words, once the supply air temperature setpoint 1226 is at the lowest available temperature, the cooling load mass flow rate 1228 is non-zero to increase the amount of air flow at the minimum temperature to achieve the zone temperature setpoint 1222.

In some embodiments, the operational compliance manager 1320 is at least partially included in the equipment control circuit 1230. For example, the cooling load compliance manager 1424, supply air temperature compliance manager 1414, supply air mass flow rate compliance manager 1326, and/or exhaust air mass flow rate compliance manager 1322 may be integrated into the equipment control circuit 1230. In such embodiments, the pressure control circuit 1204 and temperature control circuit 1220 may output one or more inputs of the operational compliance manager 1320 to the equipment control circuit 1230.

Figure 15:
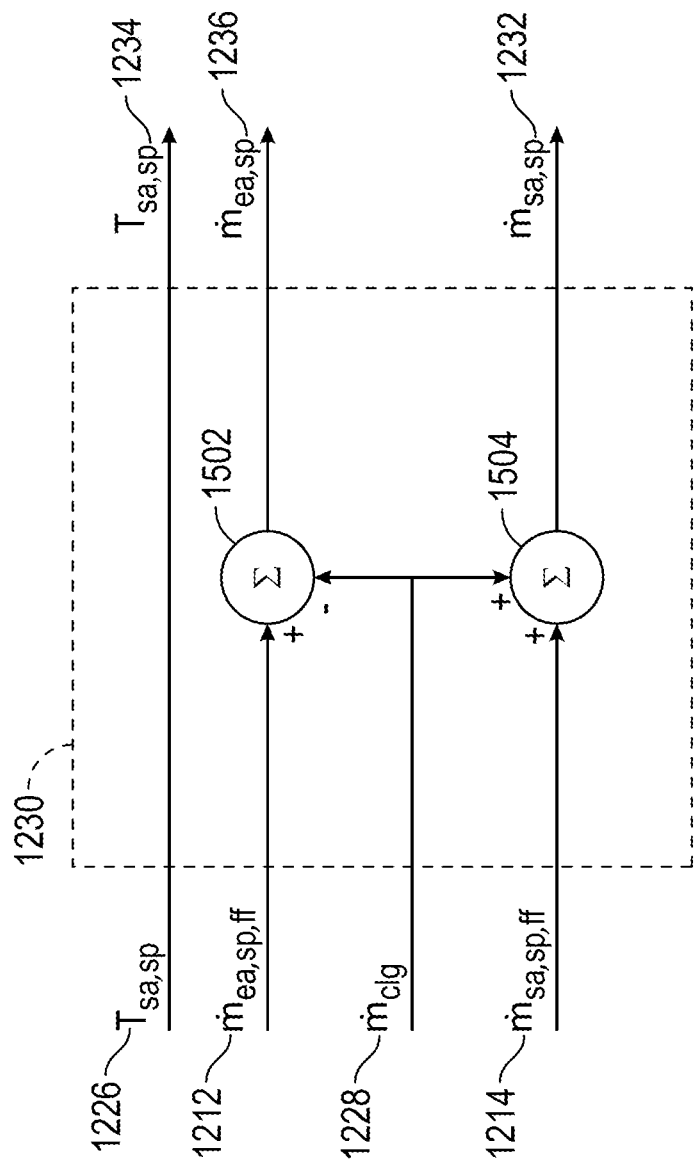
FIG. 15 is a block diagram of a portion of the controller of FIG. 8, according to some embodiments.

Referring now to FIG. 15, the equipment control circuit 1230 is shown in greater detail, according to some embodiments. The equipment control circuit 1230 may include a comparator, shown as exhaust air adjuster 1502, configured to compare a first signal and a second signal and yield a signal representing a comparison between the first signal and the second signal. For example, the exhaust air adjuster 1502 may calculate the difference between the exhaust air mass flow rate setpoint 1212 and the cooling load mass flow rate 1228 to determine the exhaust air mass flow rate setpoint 1236. In some embodiments, the equipment control circuit 1230 may include a comparator, shown as supply air adjuster 1504, configured to compare a first signal and a second signal and yield a signal representing a comparison between the first signal and the second signal. For example, the supply air adjuster 1504 may calculate the superposition of the supply air mass flow rate setpoint 1214 and the cooling load mass flow rate 1228. In this way, the magnitude of the exhaust air mass flow rate setpoint 1212 and the supply air mass flow rate setpoint 1214 are increased proportionally to accommodate the cooling load mass flow rate 1228 while maintaining the pressure of the space (e.g., $P_{zn}$). In other words, by proportionately increasing the exhaust air mass flow rate (e.g., $\dot{m}_{ea}$) and the supply air mass flow rate (e.g., $\dot{m}_{sa}$), the controller 800 commands the HVAC equipment 1120 to move more mass (e.g., air) through the space 1202 to satisfy the temperature setpoint (e.g., $T_{zn,sp}$), while the control of the pressure within the space is undisturbed (e.g., $P_{zn,sp}$).

Advantageously, the pressure control circuit 1204, temperature control circuit 1220, and equipment control circuit 1230 provide for efficient and adaptive of building control system for operating conditioned spaces. Additionally, the pressure control circuit 1204, temperature control circuit 1220, and equipment control circuit 1230 require fewer computational resources than certain building control systems. For example, the pressure control circuit 1204, temperature control circuit 1220, and equipment control circuit 1230 do not utilize a state machine, and are capable of providing integrated temperature control, including heating and cooling, and/or pressure control, according to some embodiments. Additionally, the pressure control circuit 1204, temperature control circuit 1220, and equipment control circuit 1230 can be implemented on a controller 800 that can be mass produced and applied to a variety of building control systems and HVAC equipment with minimal software modifications (e.g., setting values based on the particular HVAC equipment to be controlled).

Figure 16:
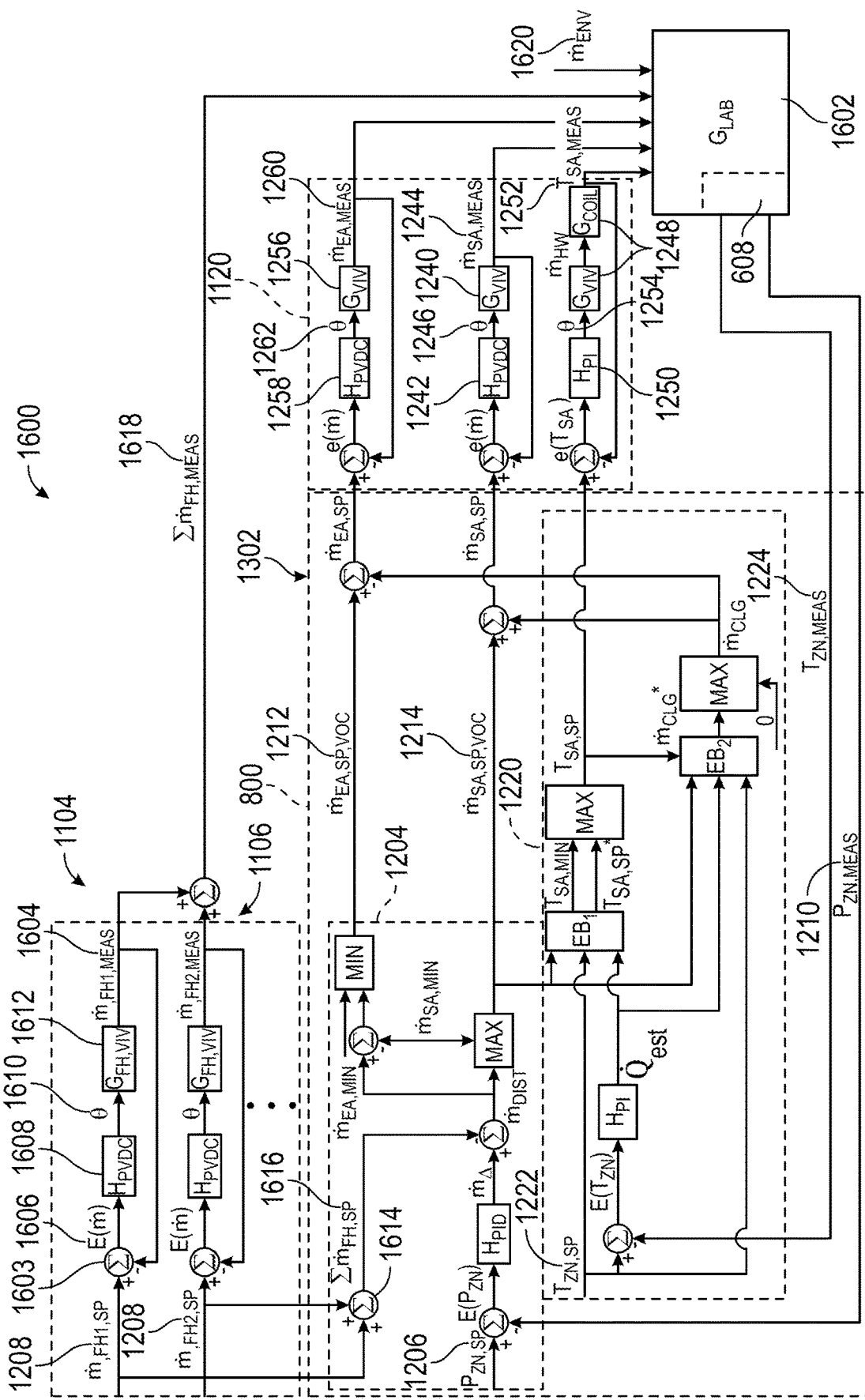
FIG. 16 is a block diagram of the system of FIG. 12, according to some embodiments.

Referring now to FIG. 16, system 1600 illustrates a feedback-feedforward control system including the functionality and components of the system 1200, according to some embodiments. Specifically, the feedforward-feedback control system 1600 includes the pressure control circuit 1204, temperature control circuit 1220, equipment control circuit 1230, and HVAC equipment 1120. The system 1600 may also include one or more fume hoods (e.g., fume hoods 1104, 1106, 1108 shown in FIG. 11). Each fume hood, e.g., fume hood 1104, and fume hood 1106, may use feedback control to achieve a desired output characteristic (e.g., mass flow rate) from the fume hood 1104. For example, the fume hood 1104 may include a comparator, shown as fume hood mass flow rate error estimator 1603, configured to compare a fume hood mass flow rate setpoint 1208 to a measured or determined fume hood mass flow rate 1604, denoted $\dot{m}_{fh,1,meas}$ to yield an error signal, shown as fume hood mass flow rate error signal 1606, denoted $e(\dot{m})$. The fume hood mass flow rate error signal 1606 may be received by a controller, shown as fume hood mass flow rate error controller 1608, to generate a control variable, shown as position setpoint 1610, denoted θ. The fume hood mass flow rate error controller 1608 may be configured to perform proportional varying deadzone control (PVDC) also known as proportional variable deadband control, PID control, PI control, and/or other forms of control to drive the fume hood mass flow rate error signal 1606 toward zero (e.g., such that the fume hood mass flow rate setpoint 1208 equals the measured fume hood mass flow rate 1604) by selectively adjusting the position setpoint 1610. The position setpoint 1610 may be sent to an actuator, shown as valve 1612. In some embodiments, valve 1612 may be a linear positon valve, diverter, butterfly valve, or other suitable controllable flow control device. In some embodiments, the fume hood 1104 is configured to provide pressure independent flow control and maintain the set fume hood mass flow rate setpoint 1208 during operation of the fume hood 1104. In some embodiments, the fume hood mass flow rate setpoint 1208 has the same or similar engineering units as the pressure error mass flow rate signal 1308 and can be directly compared by the pressure disturbance estimator 1310 to determine a disturbance mass flow rate 1312.

In some embodiments, the pressure control circuit 1204 may include a comparator, shown as fume hood mass flow rate estimator 1614 which may determine a superposition of the one or more fume hood mass flow rate setpoint 1208, shown as cumulative fume hood mass flow rate setpoint 1616. The cumulative fume hood mass flow rate setpoint 1616 may be sent to the pressure disturbance estimator 1310 which may be combined with the pressure error mass flow rate signal 1308 to determine the disturbance mass flow rate 1312. The cumulative fume hood mass flow rate setpoint 1616 may be used as a feedforward signal which the pressure control circuit 1204 and temperature control circuit 1220 can compensate for to reduce the system lag (e.g., delay, response time, etc.) for controlling the system during operation of a fume hood. For example, cumulative fume hood mass flow rate setpoint 1616 may be non-zero when the fume hoods are set to a non-zero mass flow rate setpoint (e.g., during operation, when the fume hoods are powered on, etc.), which may allow the pressure control circuit 1204 and temperature control circuit 1220 to respond more quickly than a pure feedback system where the mass flow rate is (i) unknown to the controller 800, and (ii) is slowly detected as part of the zone pressure signal 1210 and temperature signal 1222. Advantageously, the pressure control circuit 1204 facilitates receiving the fume hood mass flow rate setpoint 1208 (or cumulative fume hood mass flow rate setpoint 1616) and can proactively adjust the HVAC equipment for the (often tightly controlled) operation of the known disturbances (e.g., fume hoods, windows, doorways, etc.), which can reduce pressure and temperature fluctuations in the space.

Referring to FIG. 16, the pressure control circuit 1204 may determine the exhaust air mass flow rate setpoint 1212 as a function of the zone pressure setpoint 1206, the zone pressure 1210, and the cumulative fume hood mass flow rate setpoint 1616 according to the equation:

$$\dot{m}_{ea,sp,ff} = \min\left\{\dot{m}_{ea,min}, K_p(P_{zn,sp} - P_{zn,meas}) + K_i \int_0^t (P_{zn,sp} - P_{zn,meas})dt + K_d \frac{d(P_{zn,sp} - P_{zn,meas})}{dt} - \sum \dot{m}_{fh,sp} - \dot{m}_{sa,min}\right\}$$

where all variables are as defined previously.

In some embodiments, the pressure control circuit 1204 may determine the supply air mass flow rate setpoint 1214 as a function of the zone pressure setpoint 1206, the zone pressure 1210, and the cumulative fume hood mass flow rate setpoint 1616 according to the equation:

$$\dot{m}_{sa,sp,ff} = \max\left\{\dot{m}_{sa,min}, K_p(P_{zn,sp} - P_{zn,meas}) + K_i \int_0^t (P_{zn,sp} - P_{zn,meas})dt + K_d \frac{d(P_{zn,sp} - P_{zn,meas})}{dt} - \sum \dot{m}_{fh,sp}\right\}$$

where all variables are as defined previously.

In some embodiments, the temperature control circuit 1220 may determine the supply air temperature setpoint 1226 as a function of the zone temperature setpoint 1222, zone temperature 1224, and supply air mass flow rate setpoint 1214 according to the equation:

$$T_{sa,sp} = \max\left\{T_{sa,min}, T_{zn,sp} - \frac{K_p(T_{zn,sp} - T_{zn,meas}) + K_i \int_0^t (T_{zn,sp} - T_{zn,meas})dt}{c_p \dot{m}_{sa,sp,ff}}\right\}$$

where all variables are as defined previously. As shown in the equations above, the supply air mass flow rate setpoint 1214 may be a function of the zone pressure setpoint 1206, the zone pressure 1210, and the cumulative fume hood mass flow rate setpoint 1616.

In some embodiments, the temperature control circuit 1220 may determine the cooling load mass flow rate 1228 as a function of the zone temperature setpoint, zone temperature 1224, supply air mass flow rate setpoint 1214, and supply air temperature setpoint 1226 according to the equation:

$$\dot{m}_{clg} = \max\left\{0, \frac{K_p(T_{zn,sp} - T_{zn,meas}) + K_i \int_0^t (T_{zn,sp} - T_{zn,meas})dt}{c_p(T_{zn,sp} - T_{sa,sp})} - \dot{m}_{sa,sp,ff}\right\}$$

where all variables are as defined previously. As shown in the equations above, the supply air mass flow rate setpoint 1214 may be a function of the zone pressure setpoint 1206, the zone pressure 1210, and the cumulative fume hood mass flow rate setpoint 1616. Additionally shown in the equations above, the supply air temperature setpoint. The fume hood 1106 may have some or all of the features described with respect to the fume hood 1104.

In some embodiments, the equipment control circuit 1230 determines the exhaust air mass flow rate setpoint 1236 as a function of the exhaust air mass flow rate setpoint 1212 and the cooling load mass flow rate 1228 according to the equation:

$$\dot{m}_{ea,sp} = \dot{m}_{ea,sp,ff} - \dot{m}_{clg}$$

where all variables are as defined previously.

In some embodiments, the equipment control circuit 1230 determines the supply air mass flow rate setpoint 1232 as a function of the supply air mass flow rate setpoint 1214 and the cooling load mass flow rate 1228 according to the equation:

$$\dot{m}_{sa,sp} = \dot{m}_{sa,sp,ff} - \dot{m}_{clg}$$

where all variables are as defined previously. It is important to note that although various setpoint values are described as being mass flow rates, other flows based on related extensive properties (e.g., volumetric flow rates, etc.) may be used as one or more of the setpoints setpoints. For example, in some embodiments, the balance 1410 and 1420 are modified to accommodate the pressure control circuit 1204, temperature control circuit 1220, and equipment control circuit 1230 operating on one or more volumetric flow rates instead of mass flow rates.

In some embodiments, the equipment control circuit 1230 determines the supply air temperature setpoint 1234 based on the supply air temperature setpoint 1226. In some embodiments, the equipment control circuit 1230 sets the supply air temperature setpoint 1234 the same as the supply air temperature setpoint 1226. In other words, the equipment control circuit 1230 may transmit the supply air temperature setpoint 1226 to the HVAC equipment. In some embodiments, the equipment control circuit 1230 may modify the supply air temperature setpoint 1226 to determine the supply air temperature setpoint 1234 by applying a different unit system (e.g., Celsius into Fahrenheit), network protocol (e.g., BACnet, Modbus, etc.), or other compliance modification to accommodate the configuration of the HVAC equipment 1120 (e.g., the input protocol and unit system of the valve controller 1250, a pressure independent valve, a reheat coil, etc.) and particular configuration of controlled environment (e.g., space 1202, space 1102, etc.). Similarly, the equipment control circuit 1230 may modify the exhaust air mass flow rate setpoint 1212, the supply air mass flow rate setpoint 1214, and/or the cooling load mass flow rate 1228, to accommodate the HVAC equipment 1120 and controlled environment, according to some embodiments.

In some embodiments, the controller 800 is configured to measure and/or determine a cumulative fume hood mass flow rate 1618, denoted $\Sigma\dot{m}_{fh,meas}$. The controller 800 may monitor and store the cumulative fume hood mass flow rate 1618 (and any of the other variables of the system 1600), and may use the cumulative fume hood mass flow rate 1618 for various control functions, e.g., feedback control, fault detection and diagnostics, building energy optimization, etc., according to some embodiments. In FIG. 16, the flow 1142 (e.g., the leak rate) is illustrated as the environment mass flow rate 1620, denoted $\dot{m}_{env}$. In some embodiments, a mass balance of the space 1602 takes the form of the equation below:

$$\dot{m}_{ea,meas} + \dot{m}_{sa,meas} + \Sigma\dot{m}_{fh,meas} + \dot{m}_{env} = 0$$

where all variables are as defined previously.

Figure 17:
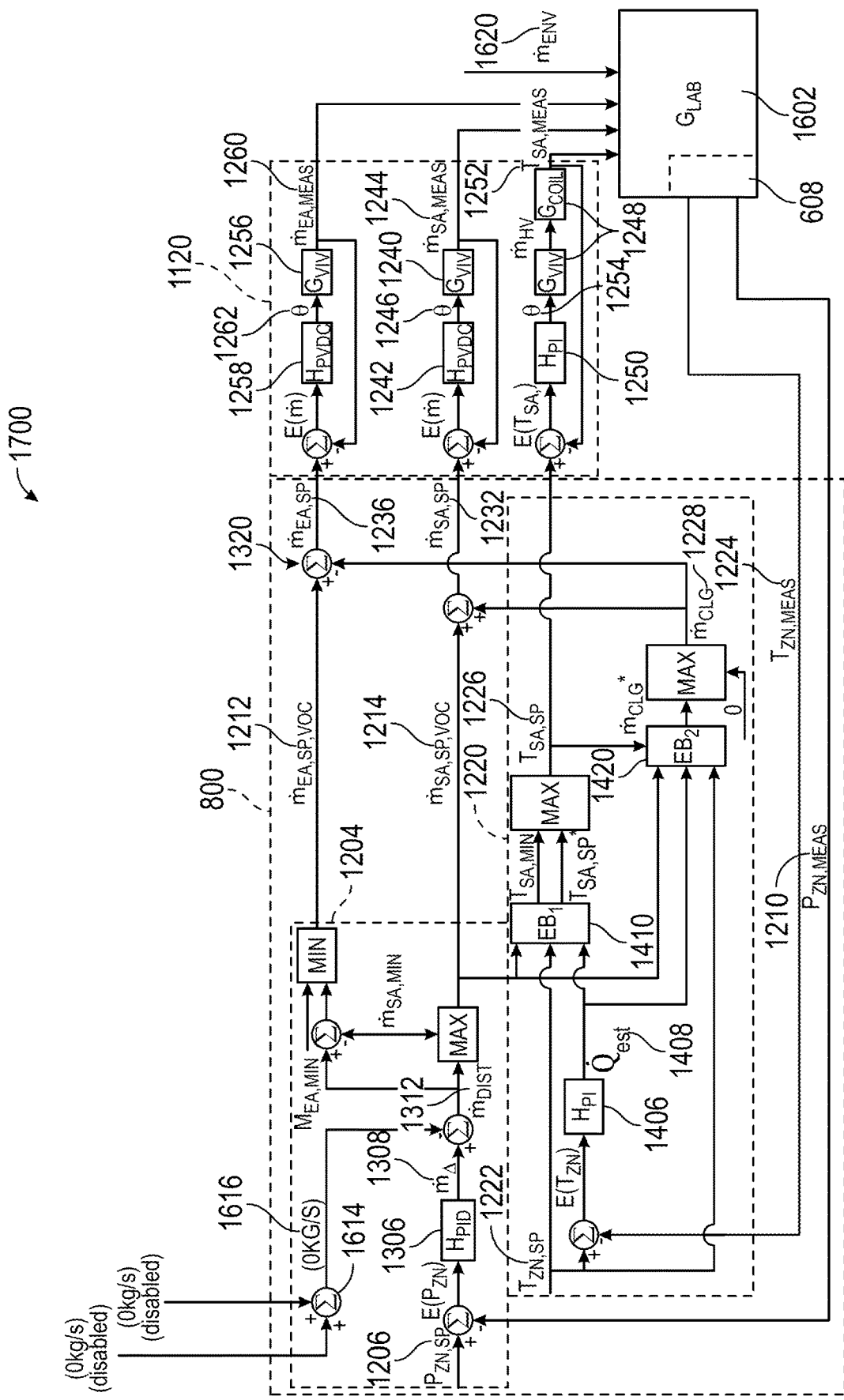
FIG. 17 is a block diagram of the system of FIG. 12, according to some embodiments.

Referring now to FIGS. 16-17, the inputs to the pressure control circuit 1204, temperature control circuit 1220, and the equipment control circuit 1230 are configured to accommodate various control environments. For example, the pressure control circuit 1204, temperature control circuit 1220, and the equipment control circuit 1230 can function without a zone pressure setpoint 1206, and zone pressure 1210 (e.g., in a control environment where only temperature is controlled). Continuing this example, the disturbance mass flow rate 1312 can be equal to the cumulative fume hood mass flow rate setpoint 1616 (e.g., zero or a non-zero number), which can generate the exhaust air mass flow rate setpoint 1212 and the supply air mass flow rate setpoint 1214. In such example, the exhaust air mass flow rate setpoint 1212 would be either be the cumulative fume hood mass flow rate setpoint 1616 or the exhaust air mass flow rate limit 1324, and the supply air mass flow rate setpoint 1214 would either be the cumulative fume hood mass flow rate setpoint 1616 or the supply air mass flow rate limit 1316. In other words, the exhaust air mass flow rate setpoint 1212 and the supply air mass flow rate setpoint 1214 can be set to their respective limit values until the cumulative fume hood mass flow rate setpoint 1616 exceeds the limit value (e.g., during operation of a fume hood). Continuing this example, the temperature control circuit 1220 receives the value of the supply air mass flow rate setpoint 1214 and determines the supply air temperature setpoint 1226 and the cooling load mass flow rate 1228. In such example, the supply air mass flow rate limit 1316 is a non-zero value. Continuing this example, the exhaust air mass flow rate setpoint 1212 is zero and the cooling load mass flow rate 1228 is added to the exhaust air mass flow rate setpoint 1212 which causes the exhaust air mass flow rate setpoint 1236 to be zero. Continuing this example, the supply air mass flow rate setpoint 1214 (the supply air mass flow rate limit 1316 or the sum of the supply air mass flow rate limit 1316 and the cumulative fume hood mass flow rate setpoint 1616) is added to the cooling load mass flow rate 1228, and subsequently applied to the HVAC equipment 1120. Continuing this example, the supply air temperature setpoint 1226 can be applied to the HVAC equipment 1120. As illustrated by the this example, the pressure control circuit 1204, temperature control circuit 1220, and equipment control circuit 1230 can operate with or without a pressure setpoint and a zone pressure 1210, according to some embodiments.

In another example, the pressure control circuit 1204, temperature control circuit 1220, and the equipment control circuit 1230 can function without a zone temperature setpoint 1222, and zone pressure 1210 (e.g., in a control environment where only pressure is controlled). The pressure control circuit may 1204 may determine the exhaust air mass flow rate setpoint 1212 and the supply air mass flow rate setpoint 1214 as described above. The temperature control circuit 1220 may determine the supply air temperature setpoint 1226 using the supply air mass flow rate setpoint 1214. In such example, the supply air temperature limit 1416 may be larger than the estimated supply air temperature setpoint 1412, and the supply air temperature setpoint 1226 may then be the supply air temperature limit 1416.

Referring now to FIG. 17, a feedback-feedforward control system 1700 is shown, according to some embodiments. The system 1700 may include some or all of the functionality and components of the system 1600. For example, the system 1700 includes the pressure control circuit 1204, temperature control circuit 1220, equipment control circuit 1230, and HVAC equipment 1120. The system 1700 illustrates a controller 800 applied to control environment where fume hoods 1104, 1106, 1108, are not active (e.g., disabled, unavailable, broken, uninstalled, turned off, etc.). For example, the system 1700 may illustrate the controller 800 applied to a pressure and temperature critical environment (e.g., a negatively pressurized hospital room, paint shop, etc.) where rapid and unpredictable forced exhaust devices (e.g., fume hoods 1104, 1106, 1108) are not generating a signal for the pressure control circuit 1204. The pressure control circuit 1204 and temperature control circuit 1220 may generate control signals for the HVAC equipment 1120 as described above, with the cumulative fume hood mass flow rate setpoint 1616 being set to zero. As illustrated by FIG. 17, the pressure control circuit 1204, temperature control circuit 1220, and equipment control circuit 1230 are configured to control the HVAC equipment 1120 with or without a signal from a fume hood (e.g., fume hood mass flow rate setpoint 1208).

Figure 18:
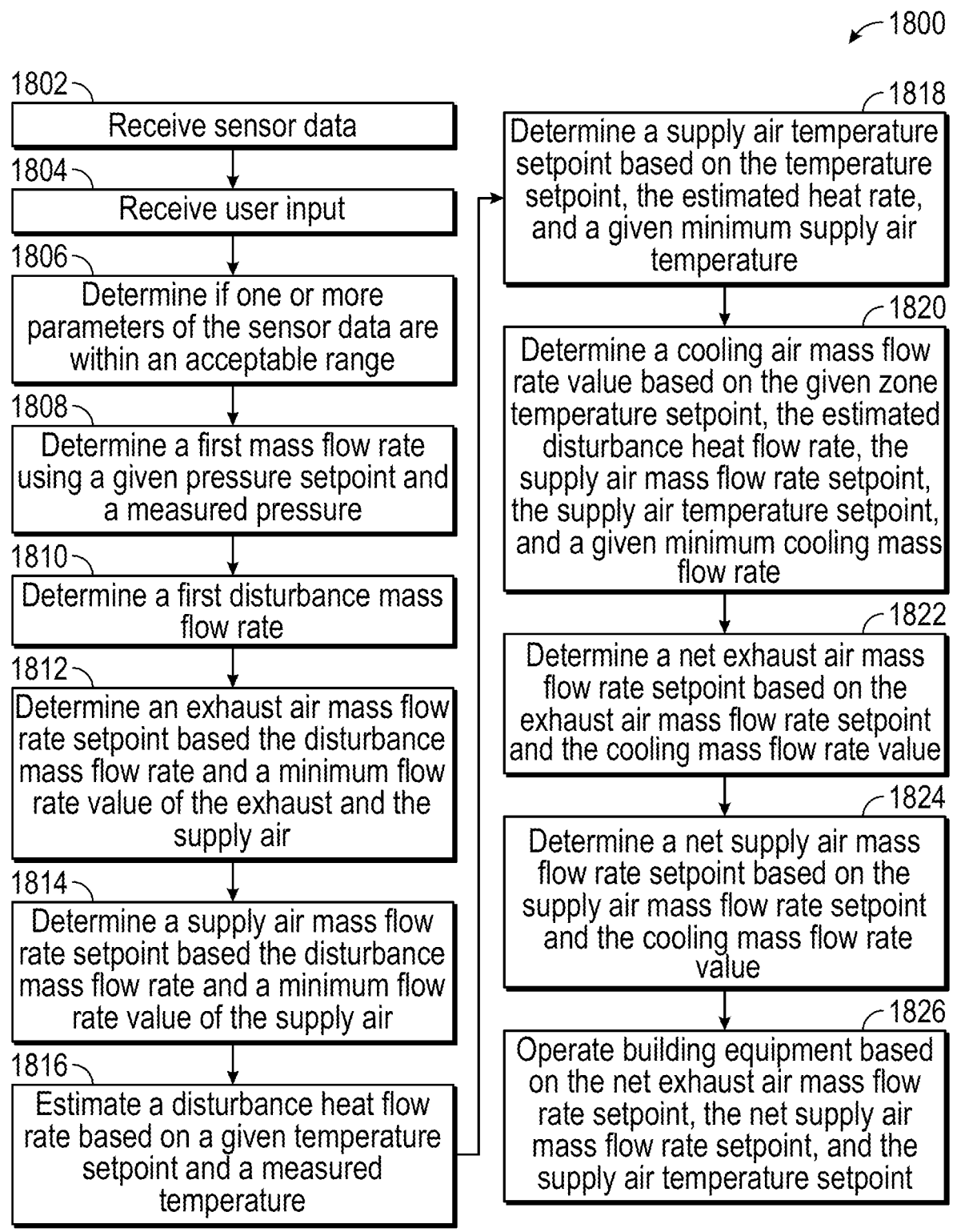
FIG. 18 is a flow diagram of a process for performing feedforward-feedback control using the controller of FIG. 8, according to some embodiments.

Referring particularly to FIG. 18, a process 1800 for adaptively controlling building equipment using a feedforward-feedback control system is shown, according to some embodiments. Process 1800 includes steps 1802-1826 and can be performed by controller 800, according to some embodiments.

Process 1800 includes obtaining one or more values of sensor data (step 1802). For example, the data manager 814 of memory 812 may obtain the zone pressure 1210 and zone temperature 1224 from the sensors 608 and provide the values to the pressure control circuit 1204 and temperature control circuit 1220. In some embodiments, step 1802 can include obtaining and storing one or more objects and attributes of the HVAC equipment 1120.

Process 1800 includes obtaining user input regarding the setpoint values of the building equipment (step 1804), according to some embodiments. For example, a user may enter a zone temperature setpoint 1222, zone pressure setpoint 1206, exhaust air mass flow rate limit 1324, supply air mass flow rate limit 1316, supply air temperature limit 1416, minimum cooling load mass flow rate limit 1426, and/or other values of the system. In some embodiments, the step 1804 may include retrieving one or more setpoint values from the TP manager 818, predictive model engine 816, and or schedule manager 826. For example, the zone pressure setpoint 1206 and/or zone temperature setpoint 1222 may change over time to accommodate a schedule for the building independent of user input. The setpoint values and/or sensor values may be applied to a mathematical model and may define one or more states of the system.

Process 1800 includes determining whether the sensor data are within a predetermined range (step 1806), according to some embodiments. For example, the signals received by sensors 608 (e.g., the zone pressure 1210, the zone temperature 1224, etc.) may be compared to threshold values for the sensors (e.g., an expected temperature range, a deadband, etc.). In some embodiments, the sensor values (e.g., the zone pressure 1210, the zone temperature 1224, etc.) may be filtered by a filtering device (e.g., a low pass filter, a high pass filter, etc.) or processed using other signal processing techniques to ensure a reliable measurement of the sensor values.

Process 1800 includes determining a first mass flow rate using a pressure setpoint and a measured pressure (step 1808), according to some embodiments. For example, the pressure error controller 1306 may determine the pressure error mass flow rate 1308 based on the zone pressure setpoint 1206 and zone pressure 1210, as described in detail above.

Process 1800 includes determining a first disturbance mass flow rate (step 1810), according to some embodiments. For example, the estimator 1310 of the TP manager 818 of the memory 812 may determine the disturbance mass flow rate 1312 using the fume hood mass flow rate setpoint 1208 and mass flow rate 1308, as described in detail above.

Process 1800 includes determining an exhaust air mass flow rate setpoint (step 1812), according to some embodiments. For example, the estimator 1314 and manager 1322 may determine the exhaust air mass flow rate setpoint 1212 based on the disturbance mass flow rate 1312, supply air mass flow rate limit 1316, and exhaust air mass flow rate limit 1324, as described in detail above.

Process 1800 includes determining a supply air mass flow rate setpoint (step 1814), according to some embodiments. For example, the manager 1326 may determine the supply air mass flow rate setpoint 1214 based on the supply air mass flow rate limit 1316 and disturbance mass flow rate 1312, as described in detail above.

Process 1800 includes estimating a disturbance heat flow rate based on a given temperature setpoint and a measured temperature (step 1816), according to some embodiments. For example, the temperature error controller 1406 may determine the temperature error heat flow rate 1408 based on the zone temperature setpoint 1222 and the zone temperature 1224, as described in detail above.

Process 1800 includes determining a supply air temperature setpoint based on the temperature setpoint, the estimated heat flow rate, and a supply air temperature limit (step 1818), according to some embodiments. For example, the balance 1410 and manager 1414 may determine the supply air temperature setpoint 1226 based on the supply air mass flow rate setpoint 1214, zone temperature setpoint 1222, supply air temperature limit 1416, and temperature error heat flow rate 1408, as described in detail above.

Process 1800 includes determining a cooling load mass flow rate (step 1820), according to some embodiments. For example, the balance 1420 and manager 1424 may determine the cooling load mass flow rate 1228 using the zone temperature setpoint 1222, temperature error heat flow rate 1408, supply air mass flow rate setpoint 1214, supply air temperature setpoint 1226, and the minimum cooling load mass flow rate limit 1426, as described in detail above.

Process 1800 includes determining a net exhaust air mass flow rate setpoint (step 1822), according to some embodiments. For example, the adjuster 1502 may determine the exhaust air mass flow rate setpoint 1236 by combining the cooling load mass flow rate 1228 with the exhaust air mass flow rate setpoint 1212, as described in detail above.

Process 1800 includes determining a net supply air mass flow rate setpoint (step 1824), according to some embodiments. For example, the adjuster 1504 may determine the supply air mass flow rate setpoint 1232 by combining the supply air mass flow rate setpoint 1214 with the cooling load mass flow rate 1228, as described in detail above.

Process 1800 may include operating equipment (step 1826), according to some embodiments. For example, the TP manager 818 of the memory 812 may output the supply air temperature setpoint 1234, exhaust air mass flow rate setpoint 1236, and/or supply air mass flow rate setpoint 1232 to the building subsystems 428 (e.g., HVAC equipment 1120) using the communications interface 802, as described in detail above.

Test Results

Figure 19:
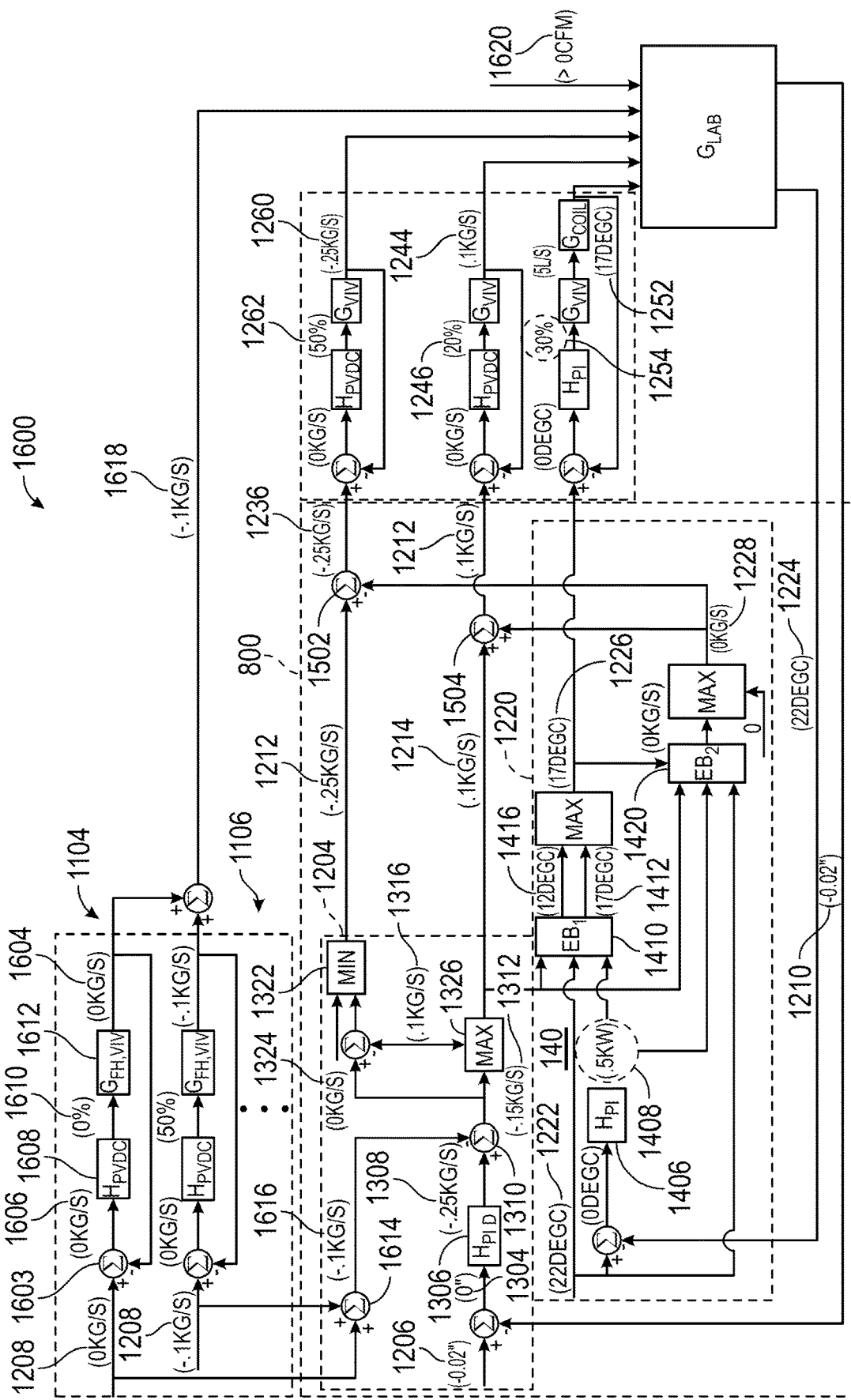
FIG. 19 is a block diagram of the system of FIG. 12 showing variable values according to a simulation of the system of FIG. 12, according to some embodiments.

Referring particularly to FIG. 19, a state of system 1600 with illustrative process variable values is shown, according to some embodiments. In FIG. 19, negative values indicate a flow out (mass flowing out, energy flowing out, etc.) of the space 1602 through the boundary of the space 1602 toward the ambient environment (e.g., outside, a neighboring space, etc.). For example, a negative mass flow rate (e.g., −0.5 kg/s) indicates 0.5 kg of mass flowing out of the space 1602 (e.g., air flowing out of a window, air leaking through a wall of the space 1602, etc.) in one second of time. FIG. 19 illustrates a situation where the space 1602 requires heating. As shown, the fume hood mass flow rate setpoint 1208 of the fume hood 1104 is 0 kg/s, and the fume hood mass flow rate setpoint 1208 of the fume hood 1106 is set to −0.1 kg/s. The cumulative fume hood mass flow rate setpoint 1616 is −0.1 kg/s. The zone pressure setpoint 1206 is set to −0.02 inches of mercury (or water, etc.) and the zone temperature setpoint 1222 is set to 22 degrees Celsius. The zone pressure 1210 is −0.02 inches of mercury (or water, etc.), and the zone temperature 1224 is 22 degrees Celsius. The pressure error signal 1304 and the temperature error signal 1404 are zero. The mass flow rate 1308 is −0.25 kg/s. The disturbance mass flow rate 1312 is −0.15 kg/s. The exhaust air mass flow rate limit 1324 is set to zero kg/s. The supply air mass flow rate limit 1316 is set to 0.1 kg/s. The exhaust air mass flow rate setpoint 1212 is −0.25 kg/s. The supply air mass flow rate setpoint 1214 is 0.1 kg/s.

Still referring to FIG. 19, the heat flow rate 1408 is 0.5 kW (kilowatts). The estimated supply air temperature setpoint 1412 is 17 degrees Celsius. The supply air temperature limit 1416 is set to 12 degrees Celsius. The supply air temperature setpoint 1226 is 17 degrees Celsius. The estimated cooling load mass flow rate 1422 is 0 kg/s. The minimum cooling load mass flow rate is set to 0 kg/s. The cooling load mass flow rate 1228 is 0 kg/s.

Still referring to FIG. 19, the exhaust air mass flow rate setpoint 1212 is −0.25 kg/s. The supply air mass flow rate setpoint 1214 is 0.1 kg/s. The supply air temperature setpoint 1226 is 17 degrees Celsius. The HVAC equipment 1120 receives the setpoints 1212, 1214, 1226. The exhaust valve position setpoint 1262 is 50% open. The valve position setpoint 1254 is 30% open and 5 liters/s (volumetric flow rate of the fluid flow through the reheat coil). The damper position setpoint 1246 is 20% open. The exhaust air mass flow rate 1260 is −0.25 kg/s. The supply air mass flow rate 1244 is 0.1 kg/s. The supply air temperature 1252 is 17 degrees Celsius.

Figure 20:
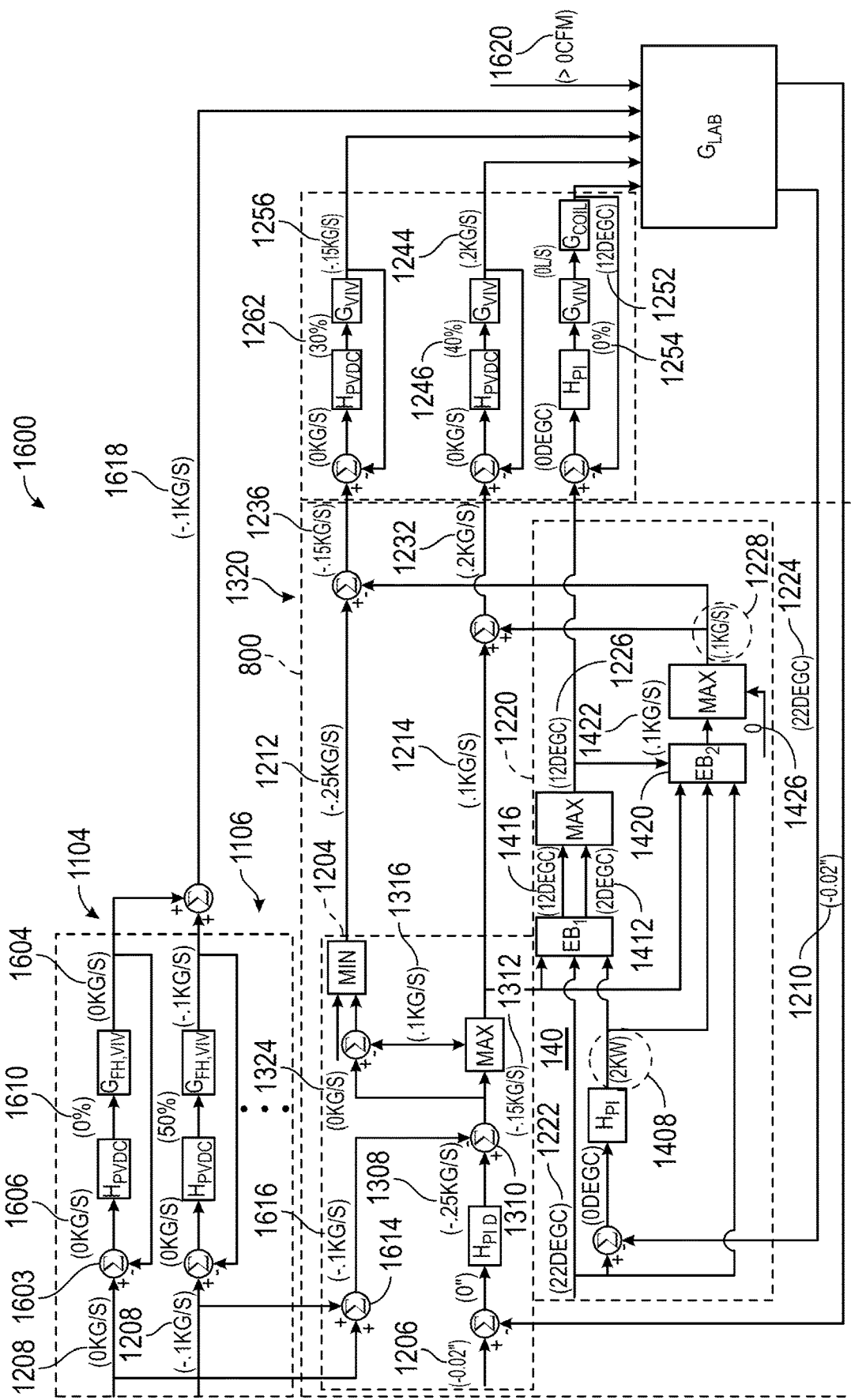
FIG. 20 is a block diagram of the system of FIG. 12 showing variable values according to a simulation of the system of FIG. 12, according to some embodiments.

Referring particularly to FIG. 20, a state of system 1600 with illustrative process variable values is shown, according to some embodiments. In FIG. 19, negative values indicate a flow out (mass flowing out, energy flowing out, etc.) of the space 1602 through the boundary of the space 1602 toward the ambient environment (e.g., outside, a neighboring space, etc.). For example, a negative mass flow rate (e.g., −0.5 kg/s) indicates 0.5 kg of mass flowing out of the space 1602 (e.g., air flowing out of a window, air leaking through a wall of the space 1602, etc.) in one second of time. FIG. 20 illustrates a situation where the space 1602 requires cooling. As shown, the fume hood mass flow rate setpoint 1208 of the fume hood 1104 is 0 kg/s, and the fume hood mass flow rate setpoint 1208 of the fume hood 1106 is set to −0.1 kg/s. The cumulative fume hood mass flow rate setpoint 1616 is −0.1 kg/s. The zone pressure setpoint 1206 is set to −0.02 inches of mercury (or water, etc.), indicating that the space 1602 is set to be negatively pressurized (i.e., air leaks into the space 1602) and the zone temperature setpoint 1222 is set to 22 degrees Celsius. The zone pressure 1210 is −0.02 inches of mercury (or water, etc.), and the zone temperature 1224 is 22 degrees Celsius. The pressure error signal 1304 and the temperature error signal 1404 are zero. The mass flow rate 1308 is −0.25 kg/s. The disturbance mass flow rate 1312 is −0.15 kg/s. The exhaust air mass flow rate limit 1324 is set to 0 kg/s. The supply air mass flow rate limit 1316 is set to 0.1 kg/s. The exhaust air mass flow rate setpoint 1212 is −0.25 kg/s. The supply air mass flow rate setpoint 1214 is 0.1 kg/s.

Still referring to FIG. 20, the heat flow rate 1408 is 2 kW (kilowatts). The estimated supply air temperature setpoint 1412 is 2 degrees Celsius. The supply air temperature limit 1416 is set to 12 degrees Celsius. The supply air temperature setpoint 1226 is 12 degrees Celsius. The estimated cooling load mass flow rate 1422 is 0.1 kg/s. The minimum cooling load mass flow rate is set to 0 kg/s. The cooling load mass flow rate 1228 is 0.1 kg/s.

Still referring to FIG. 20, the exhaust air mass flow rate setpoint 1212 is −0.15 kg/s. The supply air mass flow rate setpoint 1214 is 0.2 kg/s. The supply air temperature setpoint 1226 is 12 degrees Celsius. The HVAC equipment 1120 receives the setpoints 1212, 1214, 1226. The exhaust valve position setpoint 1262 is 50% open. The valve position setpoint 1254 is 0% open and 0 liters/s (no volumetric flow rate of the heated fluid flow through the reheat coil). The damper position setpoint 1246 is 40% open. The exhaust air mass flow rate 1260 is −0.15 kg/s. The supply air mass flow rate 1244 is 0.2 kg/s. The supply air temperature 1252 is 12 degrees Celsius.

Referring particularly to FIGS. 21-24, various graphs show test results of the feedback-feedforward control system of FIG. 16. FIGS. 21-24 show simulation results for the feedback-feedforward control system of FIG. 16. In the simulation, the space 1602 was modeled as a non-steady thermodynamic system according to energy balances described with respect to FIGS. 11 and 16. The first order systems of this sort may be typical in real-world HVAC systems where the structure and furnishings of the space 1602 have a very high thermal capacitance and are observed for the timescale of the simulation shown in FIGS. 21-24.

Figure 21:
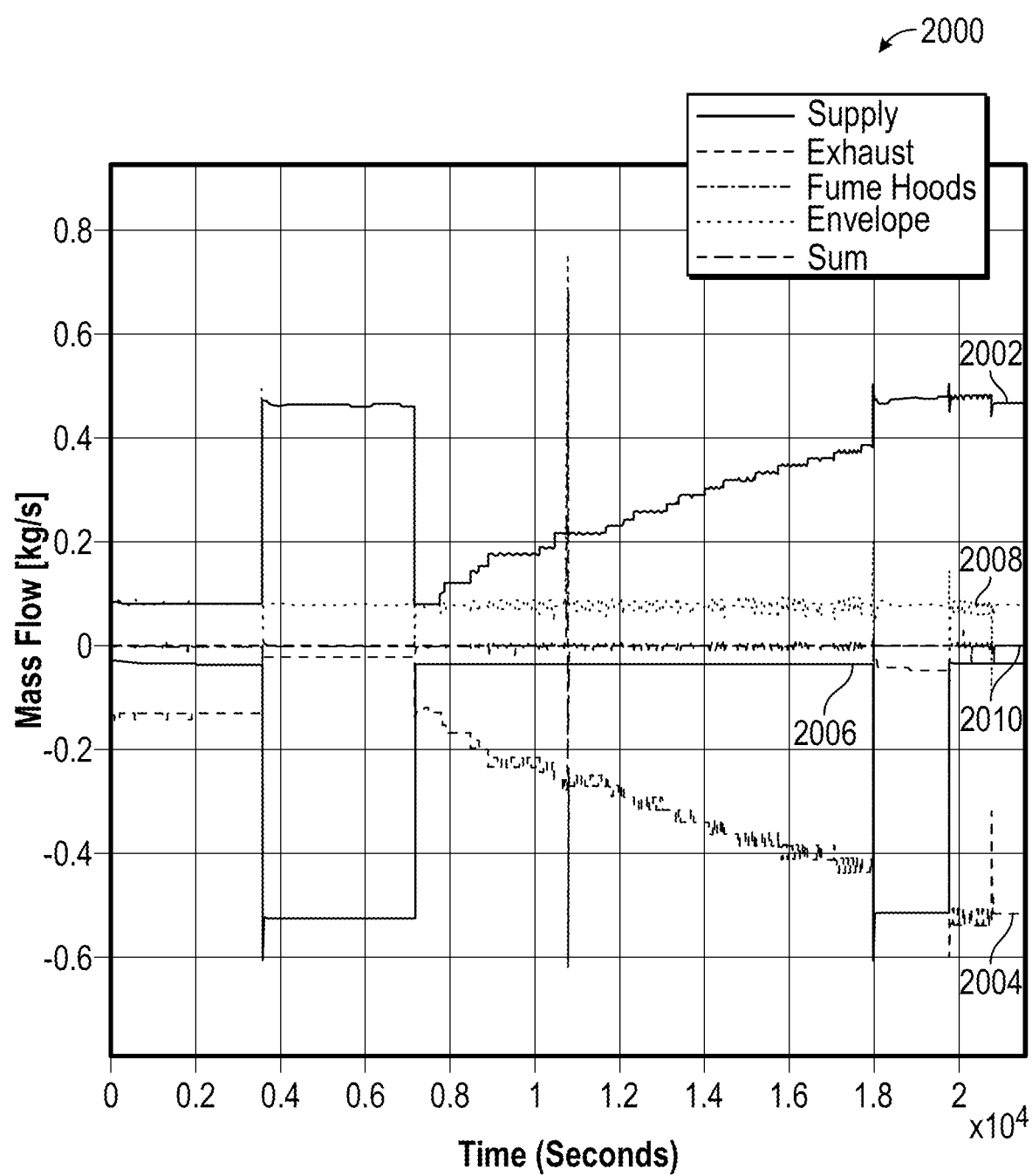
FIG. 21 is a graph showing various mass flow rates of the system of FIG. 16 over a time period of a simulation of the system of FIG. 16, according to some embodiments.

Referring particularly to FIG. 21, graph 2000 shows various mass flows of the system 1600 with respect to time. Graph 2000 includes series 2002 which illustrates the supply air mass flow rate 1244. Graph 2000 includes series 2004 which illustrates the exhaust air mass flow rate 1260. Graph 2000 includes series 2006 which illustrates the cumulative fume hood mass flow rate 1618. Graph 2000 includes series 2006 which illustrates the cumulative fume hood mass flow rate 1618. Graph 2000 includes series 2008 which illustrates the environmental mass flow rate 1620. Graph 2000 includes series 2010 which illustrates the sum of the mass flows 1618, 1260, 1244, 1620. In other words, series 2010 represents the sum of the series 2002, 2004, 2006, 2008 according to the mass balance equation described with respect to FIG. 16.

As shown, series 2006 (the cumulative fume hood mass flow rate 1618) is stepped from approximately −0.1 kg/s to approximately −0.5 kg/s at approximately 3500 seconds, and is held at −0.5 kg/s until approximately 7000 seconds, where it is stepped back down to approximately −0.1 kg/s until a period between 18000 seconds and 19500 seconds where it is stepped to −0.5 kg/s.

Between 0 seconds and 3500 seconds, series 2002 (the supply air mass flow rate 1244) and series 2004 (the exhaust air mass flow rate 1260) maintain approximately constant values. At 3500 seconds until approximately 7000 seconds, series 2002 steps to approximately 0.4 kg/s, and exhaust steps to approximately −0.1 kg/s, which illustrates that the supply air mass flow rate 1244 and exhaust air mass flow rate 1260 are adjusted to accommodate the 0.5 kg/s flow rate of the series 2006 (cumulative fume hood mass flow rate 1618). Between 7000 seconds to 18000 seconds, series 2002 and series 2004 gradually increase in magnitude which illustrates an increase in airflow through the space 1602. Between 18000 seconds and 19500 seconds, the series 2002 and series 2004 respond to the step in the series 2006. At 19500 seconds, the series 2002 and 2004 continue to increase in magnitude and maintain the level until the end of the time horizon.

Figure 22:
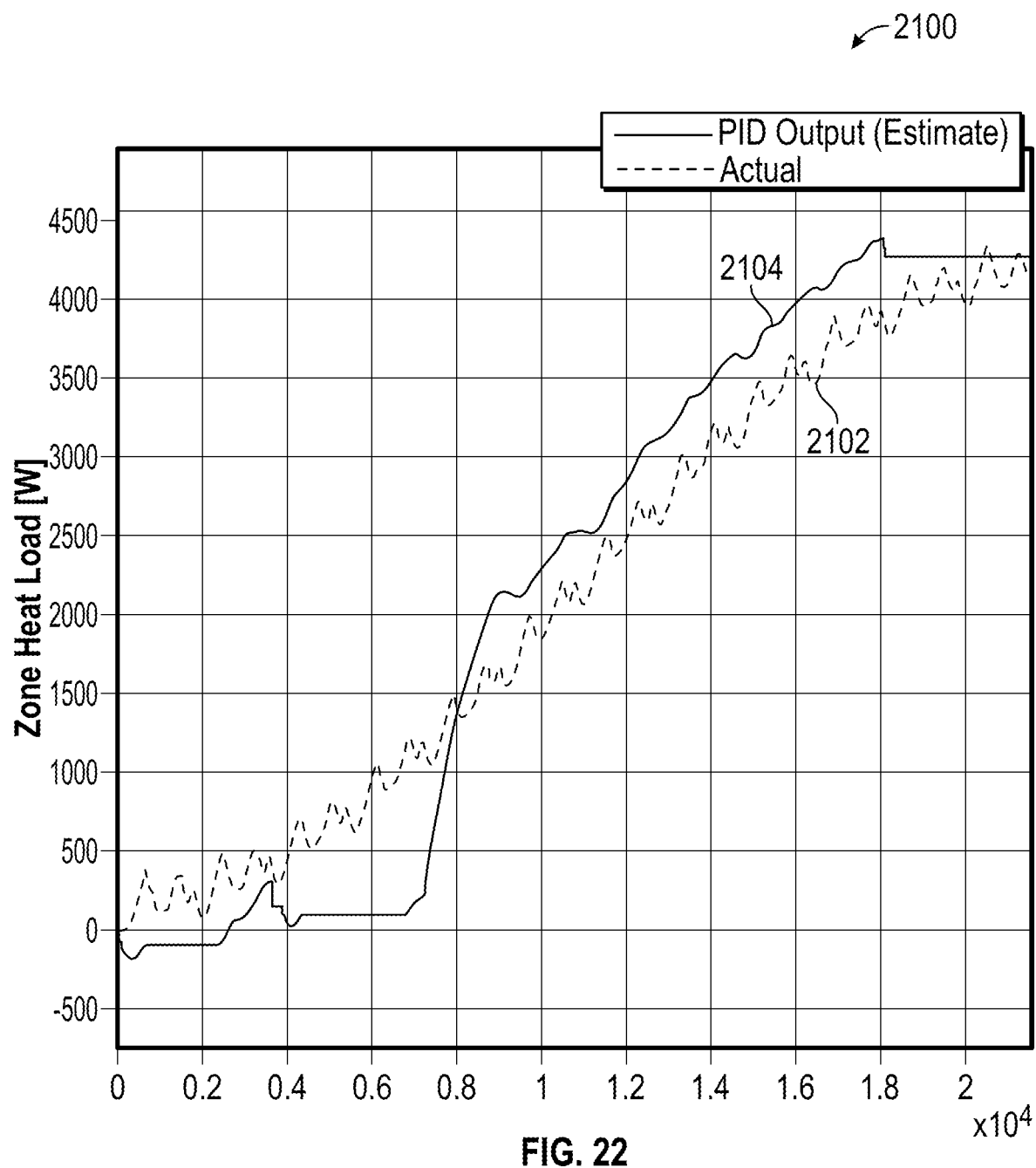
FIG. 22 is a graph showing the simulated heat load and estimated heat load of the system of FIG. 16 over a time period of a simulation of the system of FIG. 16, according to some embodiments.

Referring particularly to FIG. 22, graph 2100 shows the heat load (in Watts) with respect to time. Graph 2100 includes series 2102 which illustrates the simulated heat load (e.g., a simulated flow 1140) applied to the space 1602. Graph 2100 includes series 2104 which illustrates the temperature error heat flow rate 1408. As shown, series 2102 generally increases over the time horizon. Series 2104 behaves similarly as the series 2102 which illustrates that the temperature error controller 1406 is configured to estimate flow 1142, Q. Referring again to FIG. 20, the behavior of the series 2002 and series 2004 can be better understood by considering the increase in the heat load illustrated by the series 2102. Over time, the heat load increases, thereby demanding a larger cooling load. To accommodate the larger cooling load, the system 1600 increases the airflow through the space 1202 to accommodate the increased heat load illustrated by series 2102 while maintaining the temperature setpoint (e.g., zone temperature setpoint 1222).

Figure 23:
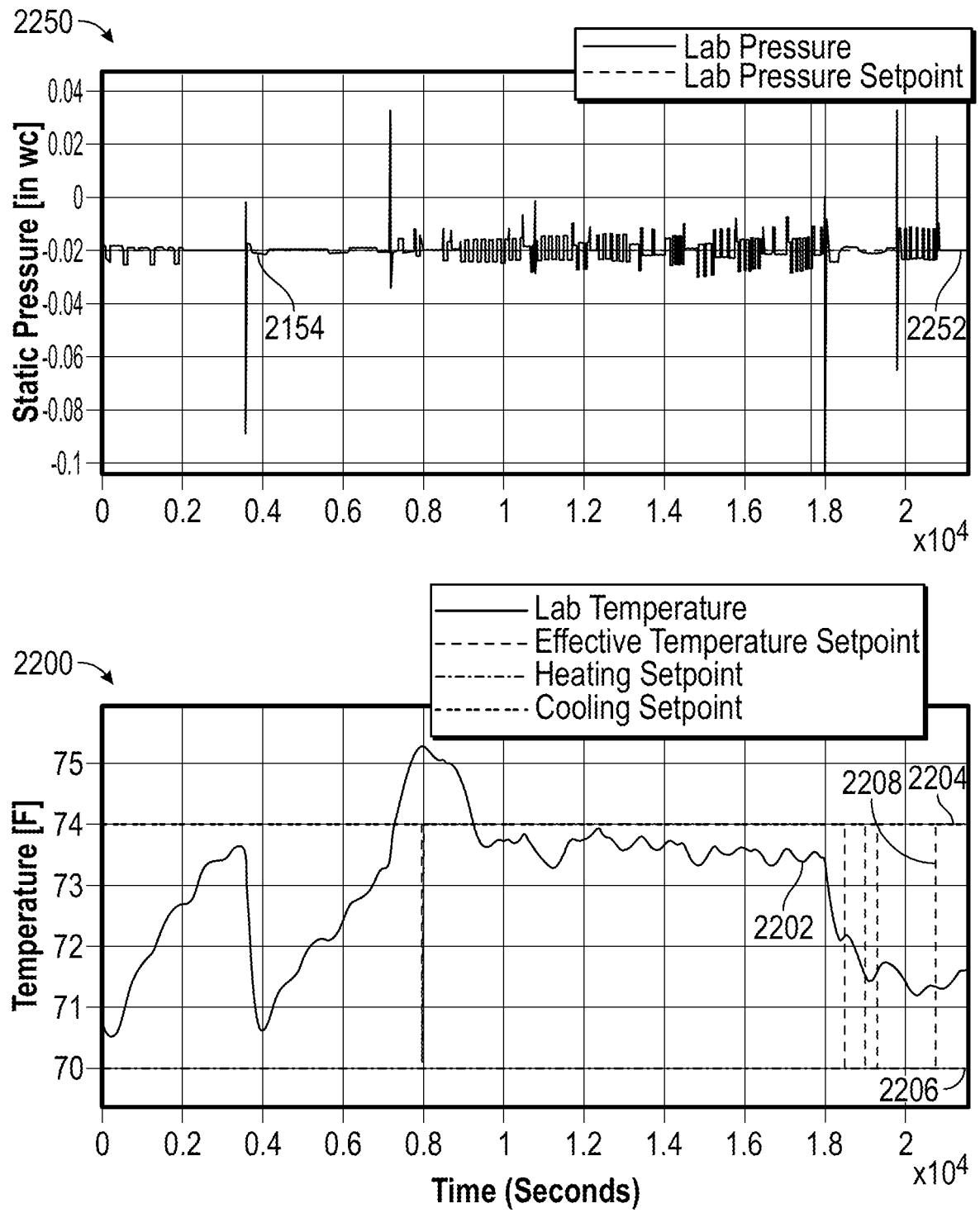
FIG. 23 is a graph showing temperature control of the system of FIG. 16, and a graph showing pressure control of the system of FIG. 16, over a time period of a simulation of the system of FIG. 16, according to some embodiments.

Referring particularly to FIG. 23, graph 2200 shows temperature control with respect to time. Graph 2200 includes series 2202 which illustrates the zone temperature 1224. Graph 2200 includes series 2204 and series 2206 which illustrate upper and lower threshold values for the zone temperature 1224, respectively. As shown, series 2204 is set to 74 degrees Fahrenheit and series 2206 is set to 70 degrees Fahrenheit. In the simulation, the effective zone temperature setpoint 1222 switches between the value of the series 2204 and the series 2206 and is illustrated by series 2208. The system is configured to achieve the zone temperature setpoint 1222 and the pressure setpoint 1206, so instead of allowing large temperature fluctuations in the space while adjusting for the rapid pressure changes caused by the series 2006, the system attempts to hold the zone temperature 1224 within the temperature threshold and increases the rate of mass flowing through the space 1602. The increase in the rate of mass flowing through the space 1602 is illustrated by the increasing magnitudes of series 2002 and series 2004 between 7500 seconds and 18000 seconds in FIG. 20.

Referring particularly to FIG. 23, graph 2250 shows pressure control with respect to time. Graph 2250 includes series 2252 which illustrates the zone pressure 1210. Graph 2250 includes series 2254 which illustrates the zone pressure setpoint 1206. The series 2252 closely follows the series 2252 due to the relatively aggressive turning of the pressure error controller 1306.

Figure 24:
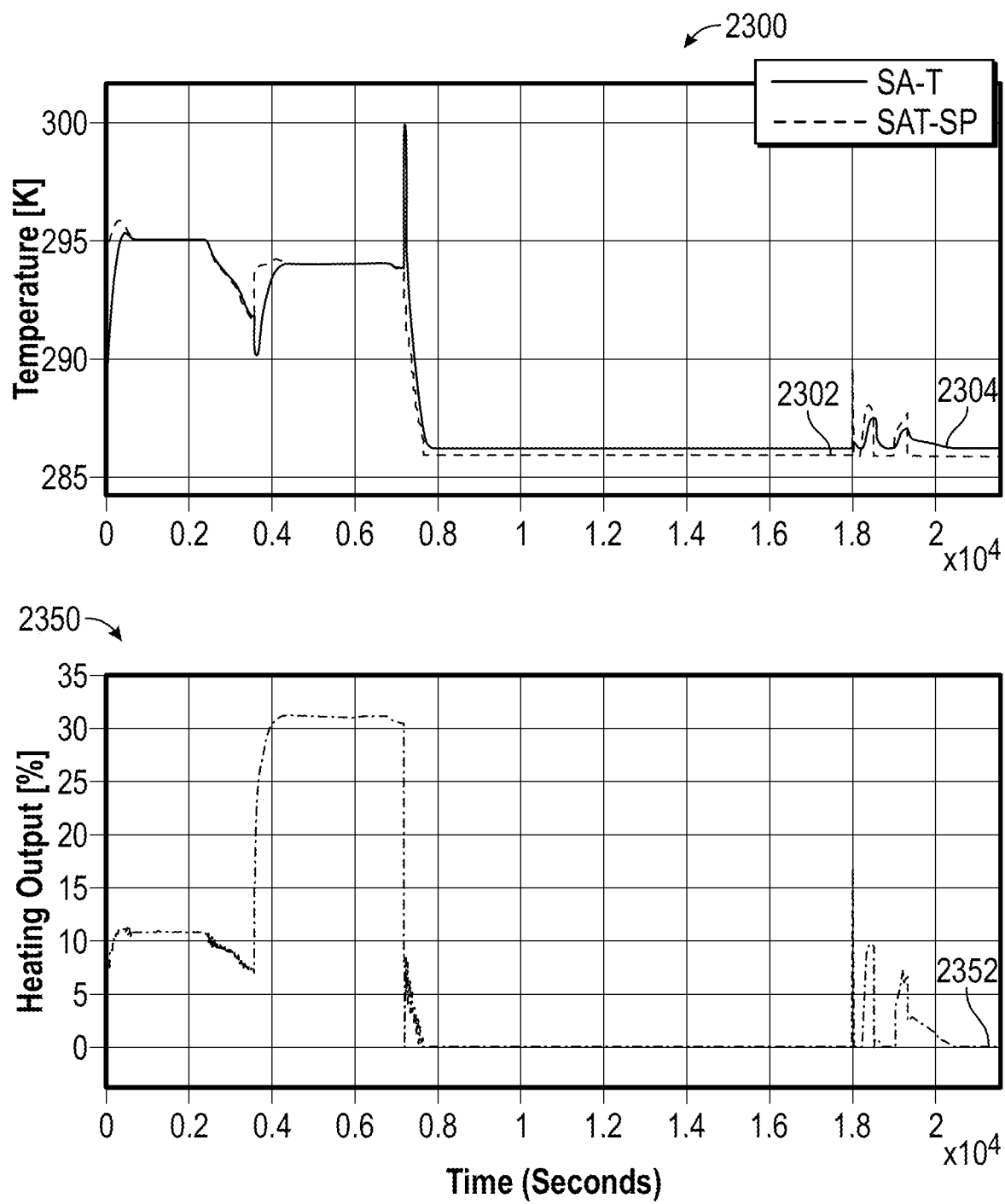
FIG. 24 is a graph showing temperature control of the system of FIG. 16, and a graph showing heating output of the system of FIG. 16, over a time period of a simulation of the system of FIG. 16, according to some embodiments.

Referring particularly to FIG. 24, graph 2300 shows temperature control with respect to time. Graph 2300 includes series 2302 which illustrates the supply air temperature setpoint 1226. Graph 2300 includes series 2304 which illustrates the supply air temperature 1252. Graph 2350 shows the heating output percentage which illustrates the percentage of the heating capacity of the HVAC equipment 1120 utilized by the controller 800. Graph 2350 includes series 2352 which illustrates the operation of the valve and reheat coil 1250.

Configuration of Exemplary Embodiments

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

As used herein, the term "circuit" may include hardware structured to execute the functions described herein. A "controller" may include one or more circuits. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations. The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A feedforward-feedback controller for integrated temperature and pressure control of a building space, the controller comprising one or more processing circuits configured to:
generate a supply air flow rate setpoint using a combined feedforward-feedback control process that (i) proactively compensates for a feedforward air flow disturbance in the building space and (ii) reactively compensates for a feedback air pressure error in the building space;
generate a supply air temperature setpoint using, as inputs, a zone temperature setpoint and the supply air flow rate setpoint;
modify the supply air flow rate setpoint in response to the supply air temperature setpoint violating a supply air temperature limit; and
operate building equipment to provide the supply air to the building space at the supply air flow rate setpoint and the supply air temperature setpoint.

2. The feedforward-feedback controller of claim 1, wherein the one or more processing circuits are configured to modify the supply air temperature setpoint in response to the supply air temperature setpoint violating the supply air temperature limit by setting the supply air temperature setpoint to the supply air temperature limit.

3. The feedforward-feedback controller of claim 1, wherein generating the supply air flow rate setpoint comprises:
determining a feedforward air flow rate required to proactively compensate for the feedforward air flow disturbance in the building space;
determining a feedback air flow rate required to reactively compensate for the feedback air pressure error in the building space; and
combining the feedforward air flow rate and the feedback air flow rate to determine a net air flow rate predicted to achieve a pressure setpoint for the building space.

4. The feedforward-feedback controller of claim 1, wherein generating the supply air temperature setpoint comprises:
determining a feedback air temperature error in the building space;
determining a heat flow rate estimated to correct the feedback air temperature error; and
using a predictive temperature model to determine the supply air temperature setpoint that achieves the heat flow rate when the supply air is provided to the building space at the supply air flow rate setpoint and the supply air temperature setpoint.

5. The feedforward-feedback controller of claim 1, wherein the one or more processing circuits are configured to:
determine an exhaust air flow rate setpoint indicating a flow rate at which air is to be exhausted from the building space by the building equipment to achieve a pressure setpoint for the building space, wherein a difference between the supply air flow rate setpoint and the exhaust air flow rate setpoint defines a net air flow rate setpoint; and
increase or decrease both the supply air flow rate setpoint and the exhaust air flow rate setpoint by equivalent amounts to achieve the zone temperature setpoint for the building space without affecting the net air flow rate setpoint.

6. The feedforward-feedback controller of claim 1, wherein the one or more processing circuits are configured to:
determine one or more flow rate setpoints associated with exhaust devices separate from the building equipment that cause air to be removed from the building space; and
determine the feedforward air flow disturbance based on the one or more flow rate setpoints associated with the exhaust devices.

7. The feedforward-feedback controller of claim 1, wherein generating the supply air flow rate setpoint comprises:

determining whether the supply air flow rate setpoint exceeds a supply air flow rate limit representing a flow rate limit of the building equipment; and based on a determination that the supply air flow rate setpoint violates the supply air flow rate limit, using the supply air flow rate limit as the supply air flow rate setpoint.

8. The feedforward-feedback controller of claim 1, wherein the one or more processing circuits are configured to:
determine a feedback air temperature error in the building space;
determine a heat flow rate estimated to correct the feedback air temperature error;
determine a feedforward heat flow disturbance;
combine the heat flow rate and the feedforward heat flow disturbance to proactively compensate for the feedforward heat flow disturbance; and
use a predictive temperature model to determine the supply air temperature setpoint that achieves the heat flow rate when the supply air is provided to the building space at the supply air flow rate setpoint and the supply air temperature setpoint.

9. A method for integrated temperature and pressure control of a building space, the method comprising:
generating a supply air flow rate setpoint using a combined feedforward-feedback control process that (i) proactively compensates for a feedforward air flow disturbance in the building space and (ii) reactively compensates for a feedback air pressure error in the building space;
generating a supply air temperature setpoint using, as inputs, a zone temperature and the supply air flow rate setpoint;
modify the supply air flow rate setpoint in response to the supply air temperature setpoint violating a supply air temperature limit of building equipment; and
operating the building equipment to provide the supply air to the building space at the supply air flow rate setpoint and the supply air temperature setpoint.

10. The method of claim 9, further comprising modifying the supply air temperature setpoint in response to the supply air temperature setpoint violating the supply air temperature limit by setting the supply air temperature setpoint to the supply air temperature limit.

11. The method of claim 9, wherein generating the supply air flow rate setpoint comprises:
determining a feedforward air flow rate required to proactively compensate for the feedforward air flow disturbance in the building space;
determining a feedback air flow rate required to reactively compensate for the feedback air pressure error in the building space; and
combining the feedforward air flow rate and the feedback air flow rate to determine a net air flow rate predicted to achieve a pressure setpoint for the building space.

12. The method of claim 9, wherein generating the supply air temperature setpoint comprises:
determining a feedback air temperature error in the building space;
determining a heat flow rate estimated to correct the feedback air temperature error; and
using the predictive temperature model to determine the supply air temperature setpoint that achieves the heat flow rate when the supply air is provided to the building space at the supply air flow rate setpoint and the supply air temperature setpoint.

13. The method of claim 9, further comprising:
determining an exhaust air flow rate setpoint indicating a flow rate at which air is to be exhausted from the building space by the building equipment to achieve a pressure setpoint for the building space, wherein a difference between the supply air flow rate setpoint and the exhaust air flow rate setpoint defines a net air flow rate setpoint; and
increasing or decreasing both the supply air flow rate setpoint and the exhaust air flow rate setpoint by equivalent amounts to achieve the zone temperature setpoint for the building space without affecting the net air flow rate setpoint.

14. The method of claim 9, further comprising:
determining one or more flow rate setpoints associated with exhaust devices separate from the building equipment that cause air to be removed from the building space; and
determining the feedforward air flow disturbance based on the one or more flow rate setpoints associated with the exhaust devices.

15. The method of claim 9, wherein generating the supply air flow rate setpoint comprises:
determining whether the supply air flow rate setpoint exceeds a supply air flow rate limit representing a flow rate limit of the building equipment; and
based on a determination that the supply air flow rate setpoint does not exceed the supply air flow rate limit, using the supply air flow rate limit as the supply air flow rate setpoint.

16. The method of claim 9, further comprising:
determining a feedback air temperature error in the building space;
determining a heat flow rate estimated to correct the feedback air temperature error;
determining a feedforward heat flow disturbance;
combining the heat flow rate and the feedforward heat flow disturbance to proactively compensate for the feedforward heat flow disturbance; and
using the predictive temperature model to determine the supply air temperature setpoint that achieves the heat flow rate when the supply air is provided to the building space at the supply air flow rate setpoint and the supply air temperature setpoint.

17. A feedforward-feedback controller for integrated two-characteristic control of a building space, the controller comprising one or more processing circuits configured to:
generate a first supply air setpoint using a combined feedforward-feedback control process that (i) proactively compensates for a feedforward air flow disturbance in the building space and (ii) reactively compensates for a feedback error of a second characteristic in the building space;
generate a second supply air setpoint using, as inputs, a zone characteristic setpoint for the building space and the first supply air setpoint;
modify the first supply air setpoint in response to the second supply air setpoint being outside of an operational range for supply air achievable by building equipment; and
operate the building equipment to provide the supply air to the building space at the first supply air setpoint and the second supply air setpoint.

18. The feedforward-feedback controller of claim 17, wherein the first supply air setpoint is a supply air flow rate setpoint and the second supply air setpoint is a supply air temperature setpoint.

19. The feedforward-feedback controller of claim 17, wherein the one or more processing circuits are configured to determine whether the building equipment are capable of achieving the first supply air setpoint and, in response to a determination that the building equipment are not capable of achieving the first supply air setpoint:
- modify the first supply air setpoint to generate a modified supply air setpoint that the building equipment are capable of achieving; and
- modify the first supply air setpoint using the modified supply air setpoint.

20. The feedforward-feedback controller of claim 17, wherein generating the supply air setpoint comprises:
- determining a feedback second characteristic error in the building space;
- determining a heat flow rate estimated to correct the feedback second characteristic error; and
- using the predictive model to determine the supply air setpoint that achieves the heat flow rate when the supply air is provided to the building space at the first supply air setpoint and the second supply air setpoint.

* * * * *